US012713174B2

(12) United States Patent
Xu et al.

(10) Patent No.: US 12,713,174 B2
(45) Date of Patent: Aug. 18, 2026

(54) EARPHONES

(71) Applicant: SHENZHEN SHOKZ CO., LTD., Guangdong (CN)

(72) Inventors: Jiang Xu, Shenzhen (CN); Zeying Zheng, Shenzhen (CN); Zeteng Yan, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 128 days.

(21) Appl. No.: 18/920,971

(22) Filed: Oct. 20, 2024

(65) Prior Publication Data

US 2025/0048015 A1 Feb. 6, 2025

Related U.S. Application Data

(63) Continuation of application No. PCT/CN2023/083708, filed on Mar. 24, 2023.

(30) Foreign Application Priority Data

Dec. 1, 2022 (CN) ........................ 202223239628.6

(51) Int. Cl.
*H04R 1/10* (2026.01)

(52) U.S. Cl.
CPC .......... *H04R 1/105* (2013.01); *H04R 1/1016* (2013.01)

(58) Field of Classification Search
CPC .... H04R 1/1008; H04R 1/1016; H04R 1/105; H04R 2201/10
See application file for complete search history.

(56) References Cited

U.S. PATENT DOCUMENTS 10,924,838 B1 2/2021 Graff et al.
2002/0041697 A1 4/2002 MacDonald et al.
(Continued)

FOREIGN PATENT DOCUMENTS

CN 106101900 A * 11/2016 .......... H04R 1/1008
CN 114286220 A 4/2022
CN 114286241 A 4/2022

OTHER PUBLICATIONS

International Search Report in PCT/CN2023/083708 mailed on Jul. 13, 2023, 6 pages.
(Continued)

*Primary Examiner* — Kile O Blair
(74) *Attorney, Agent, or Firm* — METIS IP LLC

(57) ABSTRACT

The present disclosure provides an earphone, comprising a core module and a hook structure. In a wearing state, the core module is disposed on a front side of the ear, and at least a portion of the hook structure is disposed at a rear side of the ear. Orthographic projections of the hook structure and the core module on a reference plane perpendicular to a thickness direction do not overlap. The hook structure includes a battery housing and a flexible coating. A battery coupled with the core module is disposed in the battery housing, and the battery housing includes a cover housing and a battery compartment connected with the cover housing. The flexible coating is configured to cover the cover housing. A first reference line segment with the shortest length is provided between the orthographic projection of the hook structure and the orthographic projection of the core module.

20 Claims, 26 Drawing Sheets

(56) References Cited

U.S. PATENT DOCUMENTS

| | | | |
|---|---|---|---|
| 2021/0368255 | A1 | 11/2021 | Lee |
| 2022/0124423 | A1 | 4/2022 | Zheng et al. |
| 2023/0179907 | A1 | 6/2023 | Zhang et al. |

OTHER PUBLICATIONS

Written Opinion in PCT/CN2023/083708 mailed on Jul. 13, 2023, 5 pages.

Ban, Kimin et al., Ear Shape Categorization for Ergonomic Product Design, International Journal of Industrial Ergonomics, 2020, 18 pages.

The Extended European Search Report in European Application No. 23895721.1 mailed on Jul. 24, 2025, 9 pages.

* cited by examiner

A3-A3

EARPHONES

CROSS-REFERENCE TO RELATED APPLICATIONS

This application is a Continuation of International Application No. PCT/CN2023/083708, filed on Mar. 24, 2023, which claims priority to Chinese Patent Application No. 202223239628.6, filed on Dec. 1, 2022, the entire contents of which are incorporated herein by reference.

TECHNICAL FIELD

The present application relates to the technical field of electronic devices, and in particular to an earphone.

BACKGROUND

With the increasing popularity of electronic devices, electronic devices have become indispensable social and entertainment tools in people's daily life, and their requirements for electronic devices are also increasing. Electronic devices such as earphones and smart glasses have also been widely used in people's daily life, which can be used with terminal devices such as mobile phones and computers to provide users with an auditory feast. For earphones, it is difficult to consider both stability and comfort in terms of wearing.

SUMMARY

The embodiments of the present disclosure provide an earphone. The earphone may include a core module and a hook structure connected with the core module. The core module may be disposed at a front side of an ear in a wearing state. At least a portion of the hook structure may be disposed at a rear side of the ear in the wearing state. An orthographic projection of the hook structure and an orthographic projection of the core module on a reference plane perpendicular to a thickness direction may not overlap. The thickness direction may be a direction in which the core module is close to or away from the ear in the wearing state. The hook structure may include a battery housing and a flexible coating. A battery coupled with the core module may be disposed in the battery housing. The battery housing may include a cover housing and a battery compartment connected with the cover housing. The flexible coating may cover the cover housing. A first reference line segment with the shortest length may be provided between the orthographic projection of the hook structure and the orthographic projection of the core module. A point at which the first reference line segment intersects with the orthographic projection of the hook structure may be located in a section where the flexible coating overlaps with the cover housing.

In some embodiments, the earphone may have a second reference line parallel to the first reference line segment on the reference plane. The second reference line may intersect with an orthographic projection of the battery housing and is farthest from the first reference line segment. An edge of one side of the orthographic projection of the hook structure toward the core module may have a maximum distance to the second reference line. The maximum distance may be in a range of 34 mm-52 mm.

In some embodiments, in the wearing state, a spacing between a free end of the hook structure not connected with the core module and an upper ear root of the ear on a vertical axis of a human body may be in a range of 37 mm-56 mm.

In some embodiments, in the wearing state, a spacing between the free end of the hook structure not connected with the core module and an edge of an earlobe of the ear on the vertical axis of the human body may be less than or equal to 10 mm.

In some embodiments, a length of the battery compartment in a length direction of the hook structure may be in a range of 10 mm-20 mm.

In some embodiments, one end of the battery compartment in the length direction of the hook structure may have an open end, the cover housing may be partially embedded in the open end of the battery compartment to cooperate with the battery compartment to form a cavity structure for accommodating the battery. An area of an outer surface of the cover housing on a reference cross-section perpendicular to the length direction of the hook structure may be less than an area of an outer surface of the battery compartment on the reference cross-section. The flexible coating may not cover the battery compartment.

In some embodiments, the hook structure may include an elastic metal wire configured to connect the core module and the cover housing. The area of the outer surface of the cover housing on the reference cross-section may be between a cross-sectional area of the elastic metal wire and the area of the outer surface of the battery compartment on the reference cross-section, and the area of the outer surface of the cover housing may gradually increase in a positive direction which is along the length direction of the hook structure and points from the cover housing to the battery compartment.

In some embodiments, a shape of the battery compartment may be a hollow cylinder. The area of the outer surface of the battery compartment on the reference cross-section may be in a range of 60 $mm^2$-100 $mm^2$.

In some embodiments, a diameter of the elastic metal wire may be in a range of 0.6 mm-0.8 mm.

In some embodiments, a free end of the core module not connected with the hook structure may extend into a cavity of auricular concha of the ear in the wearing state. The cover housing and the core module may jointly clamp an ear region corresponding to the cavity of auricular concha from a front side and a rear side of the ear region through the flexible coating.

In some embodiments, the core module may include an inner side surface facing the ear and an outer side surface away from the ear along the thickness direction in the wearing state. In a non-wearing state, at least a portion of the battery housing may be disposed between the inner side surface and the outer side surface in the thickness direction.

In some embodiments, the core module may include a core housing connected with the hook structure and a loudspeaker disposed in the core housing. One side of the core housing facing the ear in the wearing state may be provided with a sound outlet hole. A sound wave generated by the loudspeaker may be propagated through the sound outlet hole. The core module may cooperate with the cavity of auricular concha to form an auxiliary cavity communicated with an external ear canal of the ear in the wearing state. The sound outlet hole may be at least partially disposed in the auxiliary cavity.

In some embodiments, the auxiliary cavity may be semi-open.

The beneficial effects of the present disclosure include but not limited to the following content. According to the earphone provided by the present disclosure, the core module and at least a portion of the hook structure are respectively located on the front and rear sides of the ear in the wearing state, so as to allow the earphone to be worn on the ear. The hook structure contacts the rear side of the ear through the cover housing and the flexible coating thereon, and then jointly clamps the ear together with the core module, which is conducive to improving the wearing comfort of the earphone, thereby realizing both wearing stability and comfort.

BRIEF DESCRIPTION OF THE DRAWINGS

In order to further clearly illustrate the technical solutions of the embodiments of the present disclosure, the drawings required for use in the description of the embodiments will be briefly introduced below. Obviously, the drawings described below are only some embodiments of the present disclosure. For those having ordinary skills in the art, other drawings can be obtained based on these drawings without creative effort.

DETAILED DESCRIPTION

The present disclosure is further described in detail below with reference to the accompanying drawings and embodiments. It is particularly noted that the following embodiments are only used to illustrate the present disclosure, but do not limit the scope of the present disclosure. Similarly, the following embodiments are only some embodiments of the present disclosure rather than all embodiments. All other embodiments obtained by those having ordinary skills in the art without creative effort are within the scope of protection of the present disclosure.

Reference to "embodiments" the present disclosure means that a particular feature, structure, or characteristic described in conjunction with the embodiments may be included in at least one embodiment of the present disclosure. It is explicitly and implicitly understood by those skilled in the art that the embodiments described in the present disclosure may be combined with other embodiments.

Figure 1:
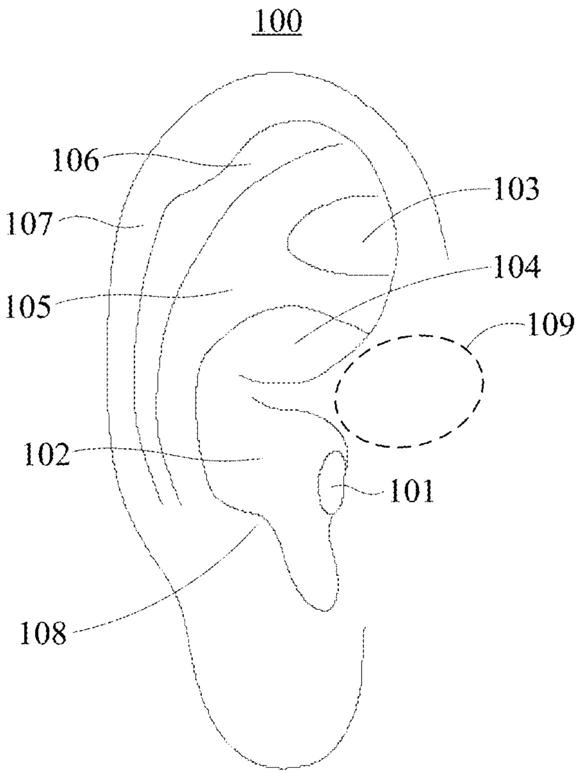
FIG. 1 is a schematic diagram illustrating a front side contour of an ear of a user according to some embodiments of the present disclosure.

Referring to FIG. 1, an ear 100 of a user includes physiological parts such as an external ear canal 101, a cavity of auricular concha 102, a cymba conchae 103, a triangular fossa 104, an antihelix 105, a scapha 106, a helix 107, an antitragus 108, etc. The external ear canal 101 has a certain depth and extends to the eardrum of the ear, for the ease of description, referring to FIG. 1, in the present disclosure, unless otherwise specified, the external ear canal 101 specifically refers to an inlet (i.e., an earhole) away from the eardrum. Further, each of the physiological parts such as the cavity of auricular concha 102, the cymba conchae 103, the triangular fossa 104, etc., has a certain volume and depth; and the cavity of auricular concha 102 is directly communicated with the external ear canal 101, i.e., it can be simply regarded as that the earhole is located at a bottom of the cavity of auricular concha 102.

In some embodiments, different users may have individual differences, resulting in different shapes, sizes, and other dimensional differences in the ears. For ease of description and reducing (or even eliminate) individual differences of different users, a simulator containing the head and (left and right) ears thereof prepared based on ANSI: S3.36, S3.25 and IEC: 60318-7 standards, such as GRAS 45BCKEMAR, HEAD Acoustics, B&K 4128 series, or B&K 5128 series, may be manufactured to present a situation that most users wear an earphone 10. Taking GRAS KEMAR as an example, an ear simulator may be any one of GRAS 45AC, GRAS 45BC, GRAS 45CC, or GRAS 43AG. Taking HEAD Acoustics as an example, an ear simulator may be any one of HMS II.3, HMS II.3 LN, or HMS II.3LN HEC. Therefore, in the present disclosure, descriptions such as "wearing by the user", "in the wearing state" and "in wearing" refer to that the earphone described in the present disclosure is worn on the ear of the simulator. Considering the individual differences of different users, there may be certain differences in case the earphone is worn by different users and the earphone is worn on the ear of the simulator. However, such differences are tolerable.

It should be noted that in the fields of medicine and anatomy, three basic planes including a sagittal plane, a coronal plane, and a horizontal plane, and three basic axes including a sagittal axis, a coronal axis, and a vertical axis of a human body may be defined. The sagittal plane refers to a section perpendicular to the ground along a front-back direction of the body, which divides the human body into left and right parts. The coronal plane refers to a section perpendicular to the ground along a left-right direction of the body, which divides the human body into front and rear parts. The horizontal plane refers to a section parallel to the ground along a vertical direction of the body, which divides the human body into upper and lower parts. Correspondingly, the sagittal axis refers to an axis that is along the front-back direction of the body and perpendicular to the coronal plane, the coronal axis refers to an axis that is along the left-right direction of the body and perpendicular to the sagittal plane, and the vertical axis refers to an axis that is along the vertical direction of the body and perpendicular to the horizontal plane. Further, the "front side of the ear" in the present disclosure is a concept relative to the "rear side of the ear". The "front side of the ear" refers to a side of the ear away from the head, and the "rear side of the ear" refers to a side of the ear facing the head. Both the "rear side of the ear" and the "front side of the ear" are directed to the ear of the user. A schematic diagram illustrating a front side contour of the ear as shown in FIG. 1 may be obtained by viewing the ear of the simulator along the coronal axis direction of the human body.

In some embodiments, referring to FIGS. 2-5, the earphone 10 may include a core module 11 and a hook structure 12 connected with the core module 11. In a wearing state, the core module 11 may be located on a front side of the ear, and at least a portion of the hook structure 12 may be located on a rear side of the ear, such that the earphone 10 may be hung on the ear. The core module 11 may include a connection end CE connected with the hook structure 12 and a free end FE not connected with the hook structure 12. In some embodiments, the core module 11 may be configured not to block an external ear canal in the wearing state, such that the earphone 10 may be regarded as an "open earphone". Due to individual differences of different users, when the earphone 10 is worn by different users, the core module 11 may partially cover the external ear canal without blocking the external ear canal.

In order to improve the stability of the earphone 10 in the wearing state, the earphone 10 may adopt any one of the following modes or a combination thereof. Firstly, at least a portion of the hook structure 12 may be configured as a conformal structure that fits at least one of the rear side of the ear and the head, so as to increase a contact area between the hook structure 12 and the ear and/or the head, thereby increasing the resistance of the earphone 10 to falling off from the ear. Secondly, at least a portion of the hook structure 12 may be configured as an elastic structure such that the hook structure 12 may have a certain amount of deformation in the wearing state, thereby increasing the positive pressure of the hook structure 12 on the ear and/or the head, and increasing the resistance of the earphone 10 to fall off the ear. Thirdly, at least a portion of the hook structure 12 may be configured to abut against the head in the wearing state, so as to form a reaction force that presses the ear to the core module 11 against the front side of the ear, thereby increasing the resistance of the earphone 10 to fall off the ear. Fourthly, the core module 11 and the hook structure 12 may be configured to clamp physiological parts such as an antihelix region, a region of the cavity of auricular concha, etc., from the front and rear sides of the ear in the wearing state, thereby increasing the resistance of the earphone 10 to fall off the ear. Fifthly, the core module 11 or an auxiliary structure connected therewith may be configured to at least partially extend into physiological parts such as the cavity of auricular concha, the cymba conchae, the triangular fossa, the scapha, etc., thereby increasing the resistance of the earphone 10 to fall off the ear.

Figure 3:
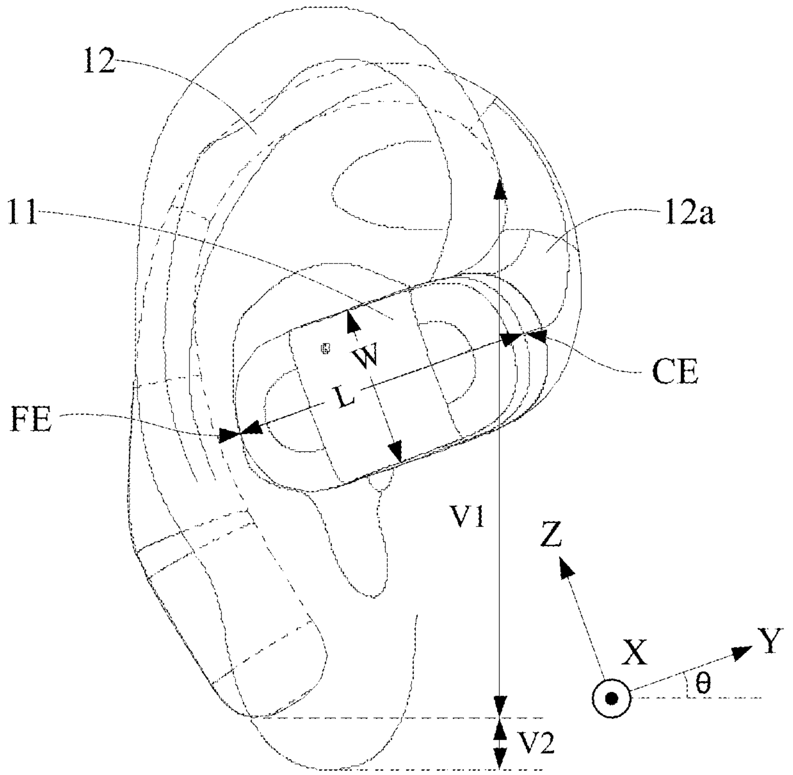
FIG. 3 is a schematic diagram illustrating an exemplary earphone in a wearing state according to some embodiments of the present disclosure.

In some embodiments, referring to FIG. 3, in a wearing state, the free end FE of the core module 11 may be configured to extend into the cavity of auricular concha. The core module 11 and the hook structure 12 may be configured to jointly clamp an ear region corresponding to the cavity of auricular concha from the front and rear sides of the ear region, thereby increasing the resistance of the earphone 10 to fall off the ear, and improving the stability of the earphone 10 in the wearing state. For example, the free end FE may be pressed in the cavity of auricular concha in a thickness direction X. As another example, the free end FE may abut against the cavity of auricular concha in a length direction Y and a width direction Z.

It should be noted that in the wearing state, the free end FE of the core module 11 may extend into the cavity of auricular concha, and an orthographic projection of the free end FE of the core module 11 may fall onto an antihelix or left and right sides of the head and located on a front side of the ear on the sagittal axis of the human body. In other words, the hook structure 12 may be configured to support the core module 11 to be worn to a wearing position such as the cavity of auricular concha, the antihelix, the front side of the ear, etc.

Figure 4:
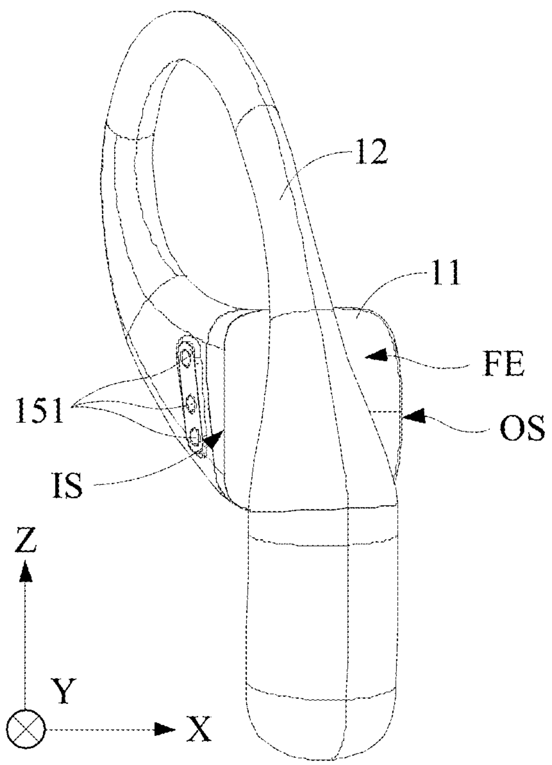
FIG. 4 is a schematic structural diagram illustrating an exemplary earphone according to some embodiments of the present disclosure.

In some embodiments, referring to FIGS. 3-4, the core module 11 may include an inner side surface IS facing the ear and an outer side surface OS away from the ear along the thickness direction X in the wearing state, and a connection surface configured to connect the inner side surface IS and the outer side surface OS. The thickness direction X is defined as a direction in which the core module 11 is close to or away from the ear in the wearing state. In some embodiments, at least a portion of the connection surface may be located in the cavity of auricular concha in the wearing state, and form a first contact region with the front side of the ear region. The hook structure 12 may form a second contact region with the rear side of the ear region in the wearing state. The second contact region and the first contact region may be at least partially overlapped in a thickness direction of the ear region. In this way, not only can the core module 11 and the hook structure 12 clamp the ear from the front and rear sides of the ear together, but a clamping force formed is mainly manifested as a compressive stress, which is conducive to improving the stability and comfort of the earphone 10 in the wearing state.

It should be noted that in the wearing state and viewed along the direction of the coronal axis, the core module 11 may be set as a circle, an ellipse, a rounded square, a rounded rectangle, or the like. When the core module 11 is set as a circle, an ellipse, or the like, the connection surface refers to an arc side surface of the core module 11; and when the core module 11 is set as a rounded square, a rounded rectangle, or the like, the connection surface may include a lower side surface LS, an upper side surface US, and a rear side surface RS described below. In some embodiments, the core module 11 may include the length direction Y and the width direction Z that are perpendicular to the thickness direction X and orthogonal to each other. The length direction Y is defined as a direction in which the core module 11 is close to or away from the back of the head of the user in the wearing state. The width direction Z is defined as a direction in which the core module 11 is close to or away from the top of the head of the user in the wearing state. Therefore, for the convenience of description, this embodiment takes the core module 11 as a rounded rectangle as an example for exemplary description. A length of the core module 11 in the length direction Y may be greater than a width of the core module 11 in the width direction Z.

Figure 2:
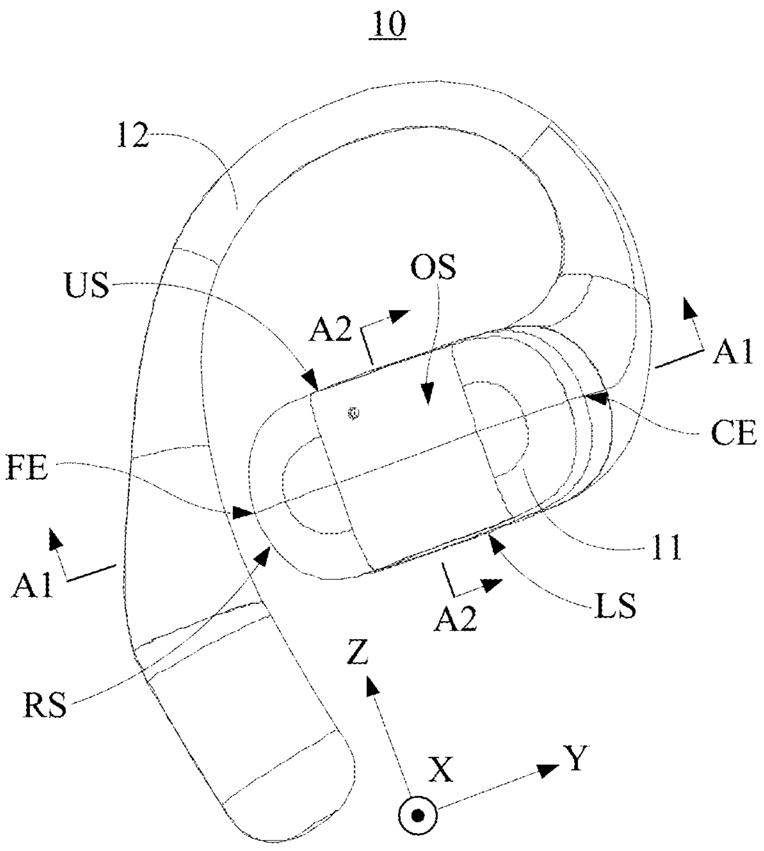
FIG. 2 is a schematic structural diagram illustrating an exemplary earphone according to some embodiments of the present disclosure.
Figure 5:
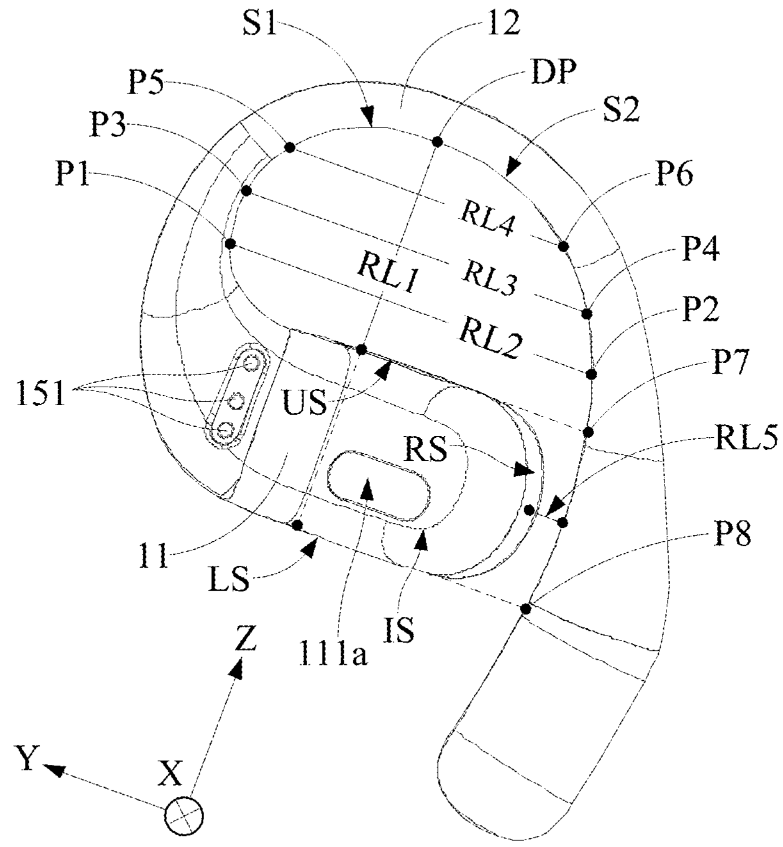
FIG. 5 is a schematic structural diagram illustrating an exemplary earphone according to some embodiments of the present disclosure.

In some embodiments, referring to FIGS. 2, 3, and 5, in the wearing state, and viewed along the direction of the coronal axis of the human body, a connection end CE may be closer to the top of the head than the free end FE, such that the free end FE may extend into the cavity of auricular concha. Accordingly, an angle between the length direction Y and the direction of the coronal axis of the human body may be in a range of 15°-60°. If the angle is too small, the free end FE may be unable to extend into the cavity of auricular concha, and a sound outlet hole 111*a* disposed on the core module 11 may be too far away from an external ear canal. If the angle is too large, it is also easy to cause the free end FE to be unable to extend into the cavity of auricular concha, and the external ear canal may be blocked by the core module 11. In other words, such configuration allows the free end FE to extend into the cavity of auricular concha, and the sound outlet hole 111*a* disposed on the core module 11 may have a suitable distance from the external ear canal, such that the user may receive more sound waves generated by the core module 11 without blocking the external ear canal.

In some embodiments, referring to FIG. 4, an orthographic projection of the hook structure 12 on a reference plane (e.g. an XZ plane in FIG. 4) that is perpendicular to the length direction Y may partially overlap with an orthographic projection of the free end FE on the same reference plane. An overlapping region formed by the orthographic projection of the hook structure 12 on the reference plane and the orthographic projection of the free end FE on the same reference plane may be located between the inner side surface IS and the outer side surface OS in the thickness direction X. In this way, not only can the core module 11 and the hook structure 12 clamp the ear from front and rear sides of the ear together, but a clamping force formed is mainly manifested as a compressive stress, which is conductive to improving the stability and comfort of the earphone 10 in the wearing state.

In some embodiments, referring to FIG. 2, FIG. 4, FIG. 5, and FIG. 9, the hook structure 12 may include an elastic metal wire 121 connected with the core module 11 and a battery housing 123 connected with one end of the elastic metal wire 121 away from the core module 11. A battery 14 coupled with the core module 11 may be disposed in the battery housing 123. An orthographic projection of the battery housing 123 on the reference plane may partially overlap with the orthographic projection of the free end FE on the same reference plane. In this way, when the free end FE abuts against the cavity of auricular concha, the battery housing 123 may support the ear from the rear side of the ear, which is conducive to improving the stability of the earphone 10 in the wearing state. The battery housing 123 may include a cover housing 1231 connected with the elastic metal wire 121 and a battery compartment 1232 connected with the cover housing 1231. The battery compartment 1232 may cooperate with the cover housing 1231 to form a cavity structure for accommodating the battery 14.

In some embodiments, referring to FIG. 5, in a wearing state, the core module 11 may include the upper side surface US away from the external ear canal along the width direction Z, the lower side surface LS facing the external ear canal, and a rear side surface RS configured to connect the upper side surface US and the lower side surface LS. The rear side surface RS may be located at one end facing the back of the head in the length direction Y in the wearing state, and at least partially located in the cavity of auricular concha. An edge of an orthographic projection of the hook structure 12 on a reference plane (e.g., a YZ plane in FIG. 5) perpendicular to the thickness direction X toward the side of the core module 11 may be divided into a first section S1 and a second section S2 with a continuous arc transition. A dividing point DP between the first section S1 and the second section S2 may be a position on the edge which is farthest from the upper side surface US along the width direction Z. In some embodiments, an overall curvature of the hook structure 12 in the first section S1 may be greater than an overall curvature of the hook structure 12 in the second section S2. In this way, the free end FE may be allowed to extend into the cavity of auricular concha, and the hook structure 12 may cooperate with the core module 11 to provide a suitable clamping force.

It should be noted that the above overall curvature may be used to qualitatively describe the curvature of different sections of the hook structure 12. A curvature radius of each of different sections may be a constant value or continuously variable. Therefore, there is at least one point in the first section S1 of which the curvature radius is less than the curvature radius of each point in the second section S2. In some embodiments, the above overall curvature may also be quantitatively characterized by an average curvature radius, i.e., the curvature radiuses of N points in each section may be obtained and then an average value of the curvature radiuses of N points may be obtained.

In some embodiments, in an extension direction of the hook structure 12, a length of the second section S2 may be greater than a length of the first section S1, such that the hook structure 12 and the core module 11 may clamp the ear together to increase a contact area between the hook structure 12 and the skin of the user, which is conducive to improving the stability of the earphone 10 in the wearing state.

In some embodiments, the earphone 10 may have a first reference line segment RL1 parallel to the width direction Z. A starting point of the first reference line segment RL1 may be a point where the first reference line segment RL1 intersects with the upper side surface US, and an end point of the first reference line segment RL1 may be the dividing point DP. A second reference line segment RL2, a third reference line segment RL3, and the fourth reference line segment RL4 described below are successively farther from the starting point of the first reference line segment RL1 in the width direction Z. In some embodiments, a length of the first reference line segment RL1 may be in a range of 13 mm-20 mm. If the length of the first reference line segment RL1 is too small, the free end FE may be unable to extend into the cavity of auricular concha, and the sound outlet hole 111*a* disposed on the core module 11 is too far away from the external ear canal. If the length of the first reference line segment RL1 is too large, it is also easy to cause the free end FE to be unable to extend into the cavity of auricular concha, and the external ear canal may be blocked by the core module 11. In other words, such configuration may allow the free end FE to extend into the cavity of auricular concha, while realizing that the sound outlet hole 111*a* disposed on the core module 11 has a suitable distance from the external ear canal, such that the user can receiving more sound waves generated by the core module 11 without blocking the external ear canal.

In some embodiments, the second reference line segment RL2 passing through ¼ of the first reference line segment RL1 and parallel to the length direction Y may intersect the first segment S1 and the second segment S2 at a first intersection point P1 and a second intersection point P2, respectively. A distance between the first intersection point P1 and the starting point of the first reference line segment RL1 may be in a range of 9 mm-15 mm, and a distance between the second intersection point P2 and the starting point of the first reference line segment RL1 may be in a range of 12 mm-19 mm. The third reference line segment RL3 passing through ½ of the first reference line segment RL1 and parallel to the length direction Y may intersect the first segment S1 and the second segment S2 at a third intersection point P3 and a fourth intersection point P4, respectively. A distance between the third intersection point P3 and the starting point of the first reference line segment RL1 may be in a range of 11 mm-18 mm, and a distance between the fourth intersection point P4 and the starting point of the first reference line segment RL1 may be in a range of 12 mm-19 mm. The fourth reference line segment RL4 passing through ¾ of the first reference line segment RL1 and parallel to the length direction Y may intersect the first segment S1 and the second segment S2 at a fifth intersection point P5 and a sixth intersection point P6, respectively. A distance between the fifth intersection point P5 and the starting point of the first reference line segment RL1 may be in a range of 12 mm-19 mm, and a distance between the sixth intersection point P6 and the starting point of the first reference line segment RL1 may be in a range of 12 mm-19 mm. In this way, when the free end FE extends into the cavity of auricular concha and the sound outlet 111*a* disposed on the core module 11 has a suitable distance from the external ear canal, the hook structure 12 can better fit the ear.

In some embodiments, the fifth reference line segment RL5 with the shortest spacing along the length direction Y may be disposed between the second section S2 and the rear side surface RS, and a length of the fifth reference line segment RL5 may be in a range of 2 mm-3 mm. If the length of the fifth reference line segment RL5 is too small, the clamping force of the core module 11 and the hook structure 12 on the ear may be too large, which may cause wearing discomfort; and if the length of the fifth reference line segment RL5 is too large, the clamping force of the core module 11 and the hook structure 12 on the ear may be too small, which may cause wearing instability. In other words, such configuration realizes both the stability and comfort of the earphone 10 in the wearing state.

In some embodiments, a point where the fifth reference line segment RL5 intersects with the rear side surface RS may be regarded as a starting point of the fifth reference line segment RL5, and a point where the fifth reference line segment RL5 intersects with the second section S2 may be regarded as an end point of the fifth reference line segment RL5. An orthographic projection of an intersection point of the first reference line segment RL1 and the upper side surface US along the length direction Y may intersect with the second section S2 at a seventh intersection point P7. An orthographic projection of an intersection point of an extension line of the first reference line segment RL1 and the lower side surface LS along the length direction Y may intersect with the second section S2 at an eighth intersection point P8. A distance between the seventh intersection point P7 and the starting point of the fifth reference line segment RL5 may be in a range of 5 mm-9 mm, and a distance between the eighth intersection point P8 and the starting point of the fifth reference line segment RL5 may be in a range of 5 mm-9 mm. In this way, the hook structure 12 can better fit the ear while realizing both the stability and comfort of the earphone 10 in the wearing state.

Figure 7:
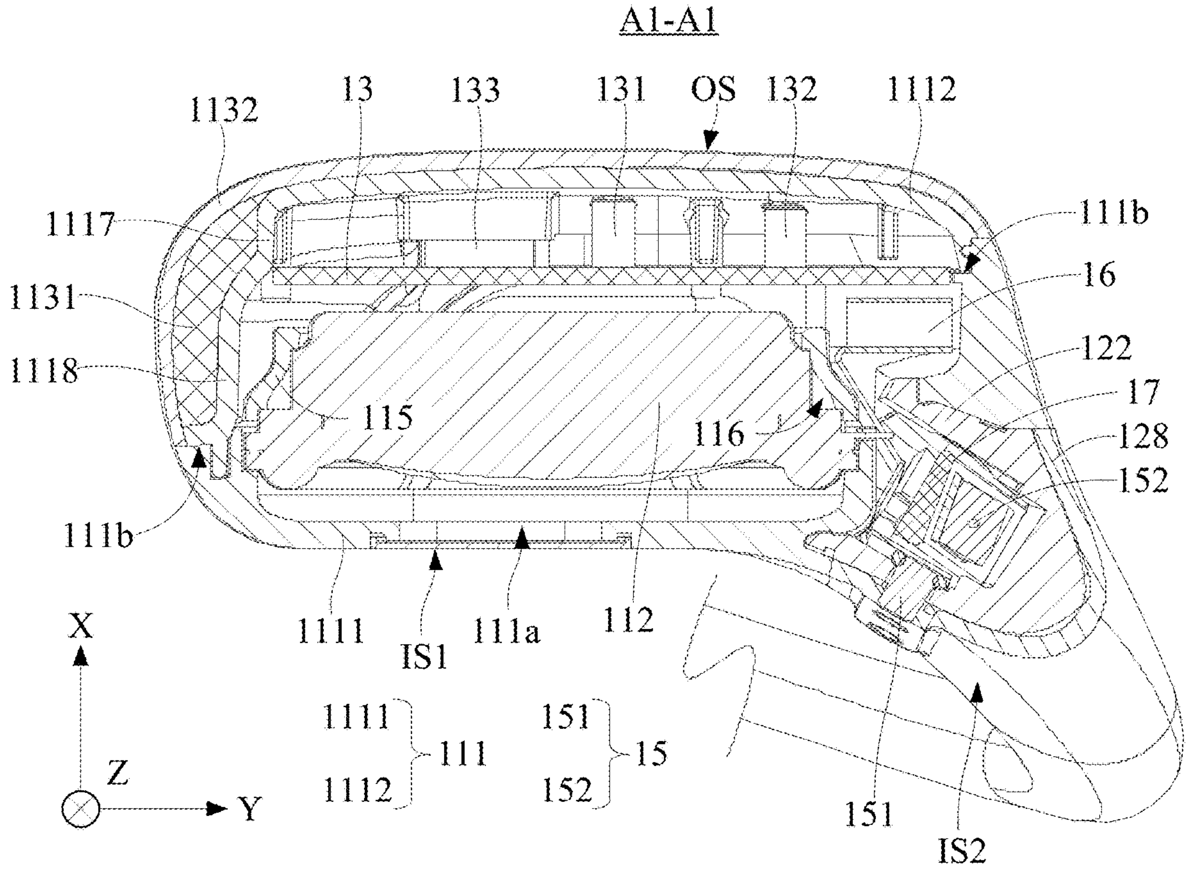
FIG. 7 is a schematic structural diagram illustrating a cross-section of the exemplary earphone in FIG. 2 along an A1-A1 cross-sectional direction.
Figure 8:
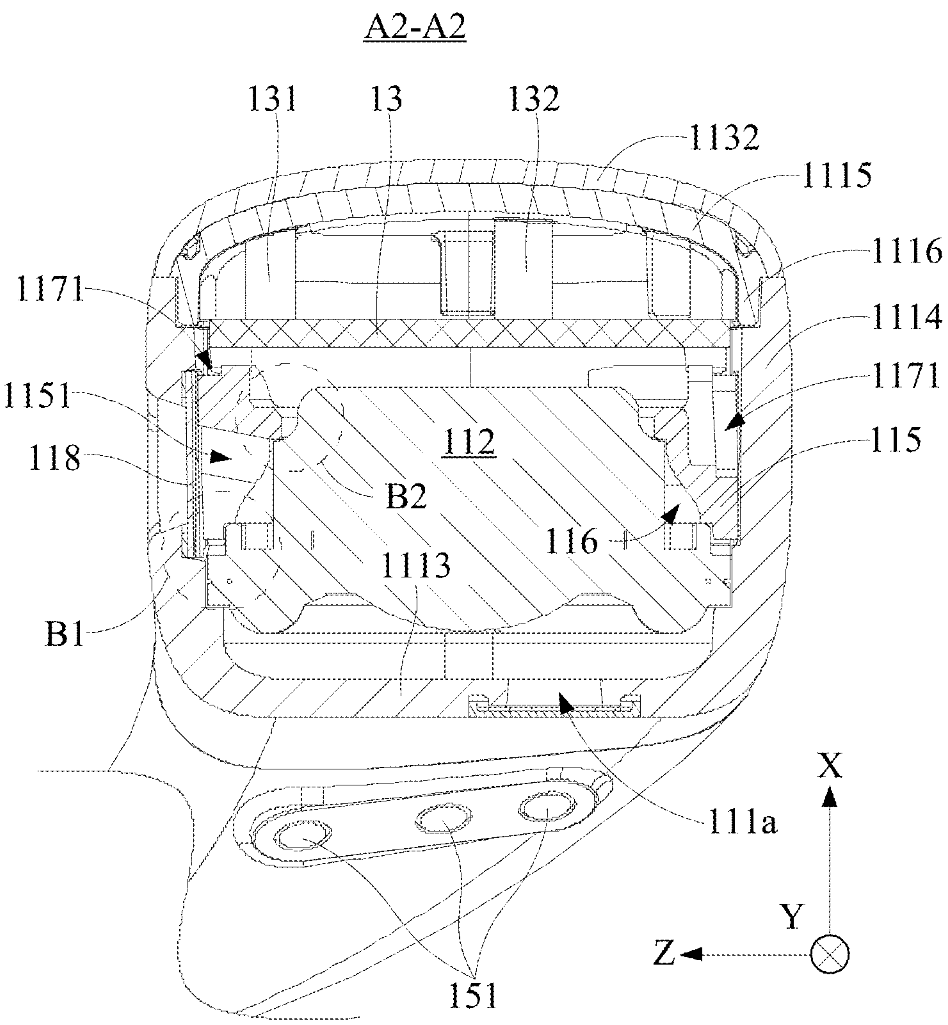
FIG. 8 is a schematic structural diagram illustrating a cross-section of the exemplary earphone in FIG. 2 along an A2-A2 cross-sectional direction.

In some embodiments, referring to FIG. 7, FIG. 8, and FIG. 5, the core module 11 may include a core housing 111 connected with the hook structure 12 and a loudspeaker 112 disposed in the core housing 111. An inner side surface (e.g., the inner side surface IS) of the core housing 111 facing the ear may be provided with the sound outlet hole 111*a* in a wearing state. A sound wave generated by the loudspeaker 112 may be propagated through the sound outlet hole 111*a* to facilitate transmission into the external ear canal. It should be noted that the sound outlet hole 111*a* may also be disposed on a side of the core housing 111 corresponding to the lower side surface LS, and may also be disposed at a corner between the inner side surface and the lower side surface LS. In some embodiments, the loudspeaker 112 may include a magnetic circuit system, a voice coil extending into the magnetic circuit system, and a diaphragm connected with the voice coil. A magnetic field generated by the voice coil after being energized may interact with a magnetic field generated by the magnetic circuit system, thereby driving the diaphragm to generate a mechanical vibration, and then generating a sound through the propagation of a medium such as air.

Figure 9:
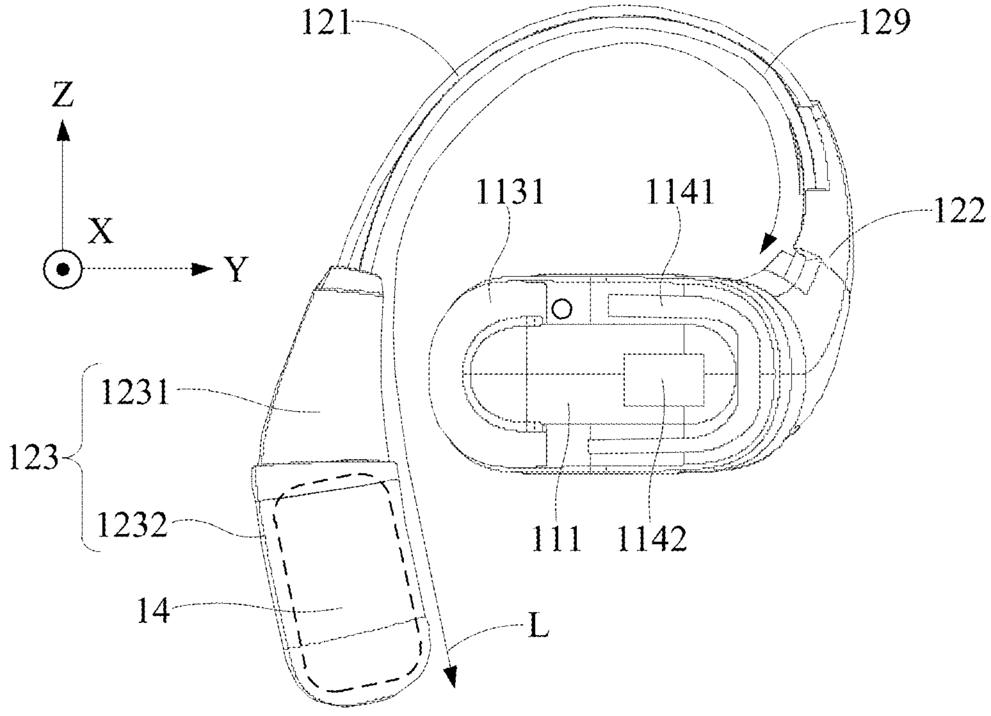
FIG. 9 is a schematic structural diagram illustrating an exemplary earphone according to some embodiments of the present disclosure.

In some embodiments, referring to FIGS. 7-9, the earphone 10 may include a main control circuit board 13 disposed in the core housing 111 and the battery 14 disposed at an end of the hook structure 12 away from the core module 11. The battery 14 and the loudspeaker 112 may be respectively coupled with the main control circuit board 13 to allow the battery 14 to power the loudspeaker 112 under the control of the main control circuit board 13. The battery 14 and the loudspeaker 112 may also be both disposed in the core housing 111, and the battery 14 may be closer to the connection end CE while the loudspeaker 112 may be closer to the free end FE.

In some embodiments, referring to FIG. 3 and FIG. 1, since the cavity of auricular concha has a certain volume and depth, after the free end FE extends into the cavity of auricular concha, there may be a certain distance between the inner side surface IS of the core housing 111 and the cavity of auricular concha. In other words, the core module 11 may cooperate with the cavity of auricular concha to form an auxiliary cavity connected with the external ear canal in the wearing state, and the sound outlet 111*a* may be at least partially located in the auxiliary cavity. In this way, in the wearing state, the sound waves generated by the loudspeaker 112 and propagated through the sound outlet hole 111*a* may be restricted by the auxiliary cavity, i.e., the auxiliary cavity may gather the sound waves, such that the sound waves may be transmitted more into the external ear canal, thereby increasing the volume and sound quality of the sound heard by the user in a near field, which is conducive to improving the acoustic effect of the earphone 10. In some embodiments, since the core module 11 may be configured not to block the external ear canal in the wearing state, the auxiliary cavity may be configured to be semi-open. In this way, most of the sound waves generated by the loudspeaker 112 and propagated through the sound outlet hole 111*a* may be transmitted to the external ear canal, while a small portion of the sound waves may be transmitted to the outside of the earphone 10 and the ear through a gap (e.g., a portion of the cavity of auricular concha not covered by the core module 11) between the core module 11 and the ear, thereby forming first sound leakage in a far field. Meanwhile, the core module 11 generally includes an acoustic hole (e.g., a pressure relief hole 111*c* described below), and the sound waves propagated through the acoustic hole may generally form second sound leakage in the far field. A phase of the first sound leakage and a phase of the second sound leakage may be (close to) opposite to each other, such that the first sound leakage and the second sound leakage may cancel each other in opposite phases in the far field, which is conducive to reducing the sound leakage of the earphone 10 in the far field.

In some embodiments, the earphone 10 may include an adjustment mechanism configured to connect the core module 11 and the hook structure 12. Different users may adjust a relative position of the core module 11 on the ear through the adjustment mechanism in the wearing state, such that the core module 11 may be located at a suitable position, and the core module 11 and the cavity of auricular concha may form the auxiliary cavity. In addition, due to the adjustment mechanism, the user may also adjust the earphone 10 to a more stable and comfortable position.

Figure 6:
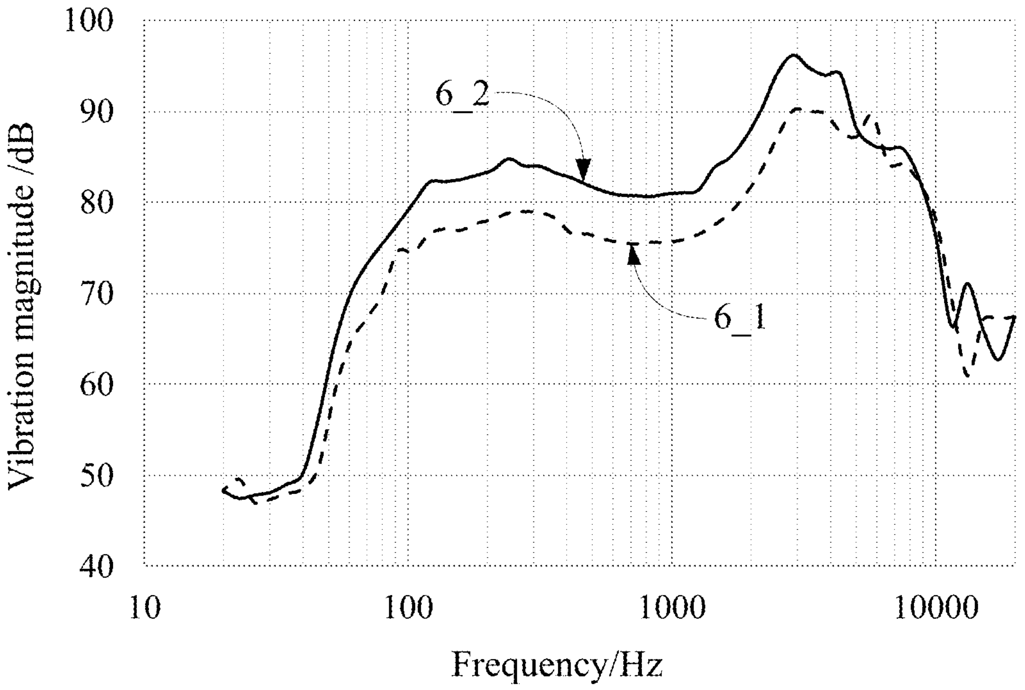
FIG. 6 is a schematic diagram illustrating a comparison of frequency response curves measured at the same listening position when a core module of an exemplary earphone is located at different positions of an ear according to some embodiments of the present disclosure.

In some embodiments, referring to FIG. 6, the earphone 10 may be first worn on the simulator, then the position of the core module 11 on the ear of the simulator may be adjusted, and a frequency response curve of the earphone 10 may be measured by a detector (e.g., a microphone) disposed in an external ear canal (e.g., the position of an eardrum, i.e., a listening position) of the simulator, thereby simulating the listening effect of the user wearing the earphone 10. The frequency response curve may be used to characterize a relationship between a vibration magnitude and a frequency. An abscissa of the frequency response curve represents the frequency in Hz; and an ordinate of the frequency response curve represents the vibration magnitude in dB. In FIG. 6, a curve 6_1 represents a frequency response curve when the core module 11 does not form an auxiliary cavity with the cavity of auricular concha in a wearing state, and a curve 6_2 represents a frequency response curve when the core module 11 cooperates with the cavity of auricular concha to form the auxiliary cavity in the wearing state. Accordingly, it can be directly and undoubtedly concluded from the comparison diagram of the frequency response curves shown in FIG. 6 that the curve 6_2 is generally located above the curve 6_1, i.e., compared with the situation that the core module 11 does not form the auxiliary cavity with the cavity of auricular concha in the wearing state, the situation that the core module 11 forms the auxiliary cavity with the cavity of auricular concha in the wearing state is more conducive to improving the acoustic effect of the earphone 10.

Figure 11:
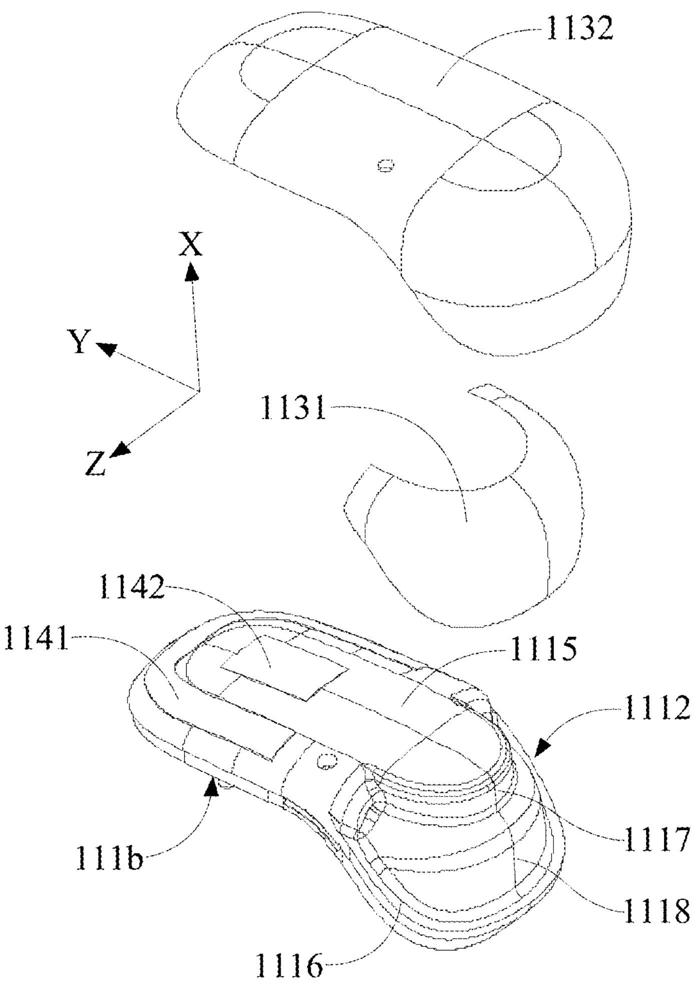
FIG. 11 is a schematic structural diagram illustrating an exemplary core housing according to some embodiments of the present disclosure.

In some embodiments, referring to FIG. 7, FIG. 9, and FIG. 11, the core module 11 may include a flexible insert 1131 disposed outside the core housing 111. A hardness of the flexible insert 1131 may be less than a hardness of the core housing 111. The core housing 111 may be a plastic part. The material of the flexible insert 1131 may be silicone, rubber, etc., and the flexible insert 1131 may be formed on a preset region of the core housing 111 by injection molding. In some embodiments, the flexible insert 1131 may at least partially cover a region of the core housing 111 corresponding to the free end FE, such that the core module 11 may at least partially abuts against the cavity of auricular concha through the flexible insert 1131. In other words, a portion of the core housing 111 that extends into the cavity of auricular concha and contacts the cavity of auricular concha may be covered by the flexible insert 1131. In this way, when the core module 11 abuts against the cavity of auricular concha (e.g., when the core module 11 and the hook structure 12 are configured to jointly clamp an ear region from front and rear sides of the ear region corresponding to the cavity of auricular concha of the ear), the flexible insert 1131 may act as a buffer between the core housing 111 and the ear (e.g., the ear region) to relieve the pressure of the earphone 10 on the ear, which is conducive to improving the comfort of the earphone 10 in the wearing state.

For example, the flexible insert 1131 may be continuously disposed on at least a portion of the core housing 111 corresponding to the rear side surface RS, the upper side surface US, and the lower side surface LS. For example, a region of the core housing 111 corresponding to the rear side surface RS may be covered by the flexible insert 1131 by more than 90%, and a region of the core housing 111 corresponding to the upper side surface US and the lower side surface LS may be covered by the flexible insert 1131 by about 30%. In this way, the comfort of the earphone 10 in the wearing state and the need to set structural parts such as the loudspeaker 112 in the core housing 111 may both be realized.

In some embodiments, when viewed along the thickness direction X, the flexible insert 1131 may be arranged in a U-shape.

In some embodiments, the portion of the flexible insert 1131 corresponding to the lower side surface LS may abut against an antitragus. A thickness of a portion of the flexible insert 1131 corresponding to the rear side surface RS may be respectively less than a thickness of a portion of the flexible insert 1131 corresponding to the upper side surface US and a thickness of a portion of the flexible insert 1131 corresponding to the lower side surface LS, such that good comfort can be obtained when the core module 11 abuts against an uneven position in the cavity of auricular concha.

In some embodiments, referring to FIG. 7 and FIG. 8, the core housing 111 may include a core inner housing 1111 and a core outer housing 1112 which are buckled with each other along the thickness direction X. The core inner housing 1111 may be closer to the ear than the core outer housing 1112 in the wearing state. A parting surface 111*b* between the core outer housing 1112 and the core inner housing 1111 may be inclined toward a side where the core inner housing 1111 is located in a direction close to the free end FE, such that the flexible insert 1131 may be arranged as much as possible in a region of the core outer housing 111 corresponding to the free end FE. For example, referring to FIG. 11, the flexible insert 1131 may be completely arranged in the region of the core outer housing 111 corresponding to the free end FE, so as to simplify the structure of the core module 11 and reduce the processing cost.

In some embodiments, referring to FIG. 7, FIG. 8, and FIG. 11, the core module 11 may include a flexible coating 1132. A hardness of the flexible coating 1132 may be less than a hardness of the core housing 111. The core housing 111 may be a plastic part. A material of the flexible coating 1132 may be silicone, rubber, etc., and the flexible coating 1132 may be formed on a preset region of the core housing 111 by injection molding, glue connection, etc. In some embodiments, the flexible coating 1132 may be integrally covered on at least a portion of an outer surface of the flexible insert 1131 and at least a portion of an outer surface of the core outer housing 1112 not covered by the flexible insert 1131, which is conducive to enhancing the consistency of the appearance of the core module 11. The flexible coating 1132 may further cover the outer surface of the core inner housing 1111. A hardness of the flexible insert 1131 may be less than the hardness of the flexible coating 1132, so as to allow the flexible insert 1131 to be sufficiently soft. In addition, the flexible coating 1132 may also improve the comfort of the earphone 10 in the wearing state, and have a certain structural strength to protect the flexible insert 1131. In some embodiments, an area of the outer surface of the flexible insert 1131 may be in a range of 126 $mm^2$ and 189 $mm^2$. If the area is too small, the comfort of the core module 11 may deteriorate in the wearing state; and if the area is too large, the volume of the core module 11 may be too large, and an area where the flexible insert 1131 does not abut against the cavity of auricular concha is too large, which deviates from the original intention of setting the flexible insert 1131. In some embodiments, a thickness of the flexible coating 1132 may be less than a thickness of the core outer housing 1112.

In some embodiments, referring to FIG. 11 and FIG. 9, the core module 11 may include a metal functional pattern such as an antenna pattern 1141 and/or a touch control pattern 1142 disposed between the core outer housing 1112 and the flexible coating 1132. The antenna pattern 1141 may be formed on an outer side of the core outer housing 1112 using laser direct structuring (LDS) technology. The touch control pattern 1142 may be formed on the outer side of the core outer housing 1112 using LDS technology, or may be a flexible touch circuit board attached to the outer side of the core outer housing 1112. In some embodiments, the core outer housing 1112 may be provided with metallized holes connected with the antenna pattern 1141 and the touch control pattern 1142, respectively. In this case, since the main control circuit board 13 is arranged in the core housing 111 (e.g., the main control circuit board 13 is connected with the core outer housing 1112), the main control circuit board 13 may contact an inner wall of the corresponding metallized hole through an elastic metal part such as pogo-PIN, a metal elastic piece, etc. For example, the antenna pattern 1141 and the touch control pattern 1142 may be respectively connected with a pogo-PIN 131 and a pogo-PIN 132 welded on the main control circuit board 13. Accordingly, the loudspeaker 112 may be located on a side of the main control circuit board 13 away from the core outer housing 1112. In this way, compared with arranging the antenna pattern 1141 and the touch control pattern 1142 respectively on an inner side of the core outer housing 1112 toward the loudspeaker 112, arranging the antenna pattern 1141 on the outer side of the core outer housing 1112 may increase a spacing between the antenna pattern 1141 and the main control circuit board 13, i.e., increase an antenna clearance region, thereby increasing the anti-interference performance of the antenna pattern 1141. Arranging the touch control pattern 1142 on the outer side of the core outer housing 1112 may shorten a spacing between the touch control pattern 1142 and an external signal trigger source (e.g., a user's finger), i.e., reduce a touch spacing, thereby increasing the sensitivity of the touch control pattern 1142 being triggered by the user.

In some embodiments, the antenna pattern 1141 may be configured to surround the periphery of the touch control pattern 1142 to fully utilize the space of the outer side of the core outer housing 1112. The antenna pattern 1141 may be arranged in a U-shape, and the touch control pattern 1142 may be arranged in a square shape.

In some embodiments, the core module 11 may include a microphone 133 welded on the main control circuit board 13. The microphone 133 may be configured to pick up a user voice and an ambient sound through a sound pickup through hole provided on the core outer housing 1112. When the main control circuit board 13 is connected with the core outer housing 1112, the microphone 133 may be pressed on the core outer housing 1112.

Figure 10:
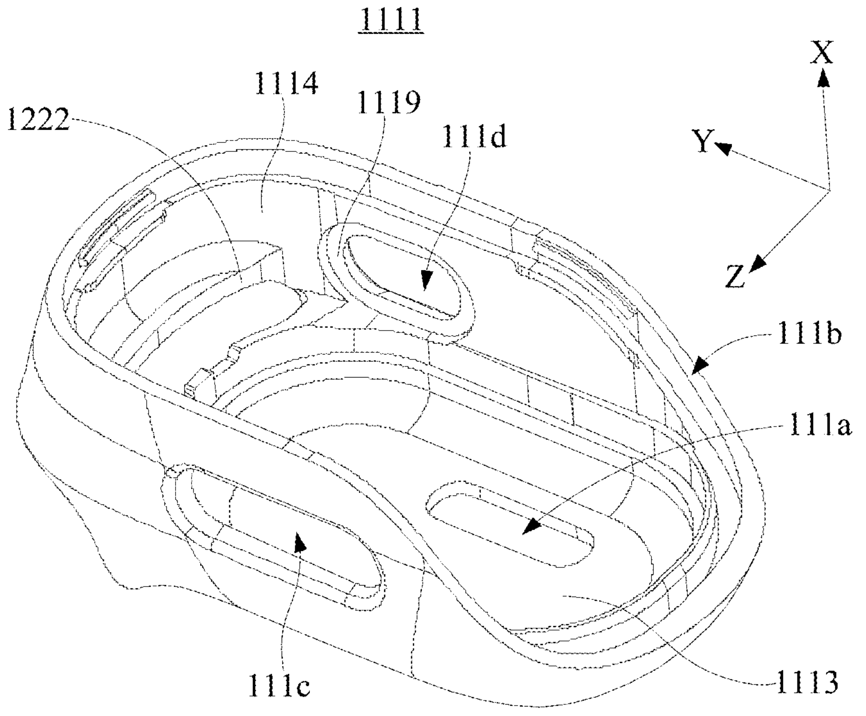
FIG. 10 is a schematic structural diagram illustrating an exemplary core housing according to some embodiments of the present disclosure.

In some embodiments, referring to FIG. 10 and FIG. 11, the core inner housing 1111 may include a bottom wall 1113 and a first side wall 1114 connected with the bottom wall 1113. The core outer housing 1112 may include a top wall 1115 and a second side wall 1116 connected with the top wall 1115. The second side wall 1116 and the first side wall 1114 may be buckled with each other along the parting surface **111*b*, and support each other. When viewed along the width direction Z, in a reference direction (e.g., an opposite direction of an arrow Y in FIG. 10 and FIG. 11) in which the connection end CE points to the free end FE, a portion of the first side wall 1114 close to the free end FE may be gradually close to the bottom wall 1113 in the thickness direction X, and a portion of the second side wall 1116 close to the free end FE may be gradually away from the top wall 1115 in the thickness direction X, such that the parting surface 111*b* may be inclined toward a side where the core inner housing 1111 is located in a direction close to the free end FE. In this case, the flexible insert 1131 may be at least partially disposed on an outer side of the second side wall 1116. In some embodiments, referring to FIG. 11 and FIG. 9, in addition to being disposed on the outer side of the second side wall 1116, the flexible insert 1131 may also be partially disposed on an outer side of the top wall 1115. Correspondingly, the sound outlet hole 111*a* may be disposed on the bottom wall 1113. In some embodiments, the sound outlet hole 111*a* may also be disposed on a side of the first side wall 1114 corresponding to the lower side surface LS, and may also be disposed at a corner between the first side wall 1114 and the bottom wall 1113. In some embodiments, the antenna pattern 1141 and the touch control pattern 1142 and the metallized holes thereof may be disposed on the top wall 1115, and the sound pickup through hole of the microphone 133 may also be disposed on the top wall 1115**.

In some embodiments, referring to FIG. 7 and FIG. 11, the core outer housing 1112 may be provided with an embedding groove that is at least partially disposed on the second side wall 1116. The flexible insert 1131 may be embedded in the embedding groove, such that an outer surface of a region of the core outer housing 1112 not covered by the flexible insert 1131 may be continuously transitioned to an outer surface of the flexible insert 1131. A region where the flexible insert 1131 is located in FIG. 7 may be regarded as the embedding groove. In this way, the flexible insert 1131 may be accumulated on the core outer housing 1112 during the injection molding process to avoid overflowing of the flexible insert 1131, and the appearance quality of the core module 11 may be improved, thereby avoiding an uneven surface of the core module 11.

In some embodiments, the second side wall 1116 may include a first sub-side wall segment 1117 and a second sub-side wall segment 1118 connected with the first sub-side wall segment 1117. The first sub-side wall segment 1117 may be closer to the top wall 1115 than the second sub-side wall segment 1118 in the thickness direction X, and the second sub-side wall segment 1118 may protrude toward the outer side of the core housing 111 compared to the first sub-side wall segment 1117. In short, the second side wall 1116 may have a stepped structure. In this way, the flexible insert 1131 may be accumulated on the core outer housing 1112 during the injection molding process to avoid overflowing of the flexible insert 1131, the core module 11 may better abut against the cavity of auricular concha through the flexible insert 1131, thereby improving the comfort of the earphone 10 in the wearing state.

In some embodiments, the main control circuit board 13 may be connected with the core outer housing 1112 (e.g., fixed on a hot melt column connected with the top wall 1115), and may partially overlap with the first sub-side wall section 1117 in the thickness direction X. The loudspeaker 112 may partially overlap with the second sub-side wall section 1118 in the thickness direction X. In this way, a sufficiently large loudspeaker 112 may be disposed in the core housing 111, thereby enhancing the sound volume produced by the earphone 10.

In some embodiments, referring to FIG. 10 and FIG. 8, the core housing 111 may be provided with the pressure relief hole 111*c*. The pressure relief hole 111*c* enables a space on a side of the loudspeaker 112 toward the main control circuit board 13 to be communicated with the external environment, i.e., the air can freely enter and exit the space. In this way, the resistance of the diaphragm of the loudspeaker 112 during a vibration process may be reduced. The pressure relief hole 111*c* may be configured to face the top of the head in the wearing state, thereby avoiding a sound wave transmitted through the pressure relief hole 111*c* from forming sound leakage (i.e., the second leakage sound) to be heard. Based on the Helmholtz resonator, an aperture of the pressure relief hole 111*c* may be as large as possible, such that a resonance frequency of the second leakage sound may be shifted to a higher frequency band (e.g., a frequency range greater than 4 kHz) as much as possible, thereby further preventing the second leakage sound from being heard.

In some embodiments, the core housing 111 may be provided with a sound adjustment hole 111*d*. The sound adjustment hole 111*d* may make the resonance frequency of the second sound leakage shift to a higher frequency band (e.g., a frequency range greater than 4 kHz) as much as possible, thereby further preventing the second leakage sound from being heard. An area of the sound adjustment hole 111*d* may be less than an area of the pressure relief hole 111*c*, such that the space on the side of the loudspeaker 112 toward the main control circuit board 13 may be more communicated with the external environment through the pressure relief hole 111*c*. In some embodiments, a spacing between the sound outlet hole 111*a* and the pressure relief hole 111*c* in the width direction Z may be greater than a spacing between the sound outlet hole 111*a* and the sound adjustment hole 111*d* in the width direction Z, so as to prevent the sound wave propagated through the sound outlet hole 111*a* and the pressure relief hole 111*c* respectively from canceling each other in opposite phases in a near field, thereby increasing the volume of the sound propagated through the sound outlet hole 111*a* heard by the user. Accordingly, the sound adjustment hole 111*d* may be closer to the connection end CE than the sound outlet hole 111*a* to increase the spacing between the sound adjustment hole 111*d* and the sound outlet hole 111*a* in the length direction Y, thereby preventing the sound wave propagated through the sound outlet hole 111*a* and the sound adjustment hole 111*c* respectively from canceling each other in opposite phases in the near field, and increasing the volume of the sound propagated through the sound outlet hole 111*a* heard by the user.

In some embodiments, referring to FIG. 10, the sound outlet hole 111*a*, the pressure relief hole 111*c*, and the sound adjustment hole 111*d* may be disposed on the core inner housing 1111. For example, the sound outlet hole 111*a* may be disposed on the bottom wall 1113 and the pressure relief hole 111*c* and the sound adjustment hole 111*d* may be respectively disposed on the first side wall 1114. The pressure relief hole 111*c* and the sound adjustment hole 111*d* may be respectively disposed on opposite sides of the first side wall 1114 along the width direction Z. In this way, since the sound outlet hole 111*a*, the pressure relief hole 111*c*, and the sound adjustment hole 111*d* are all disposed on the core inner housing 1111, the structure of the core outer housing 1112 may be simpler, which reduces the processing cost. In addition, since the pressure relief hole 111*c* and the sound adjustment hole 111*d* are respectively disposed on the opposite sides of the first side wall 1114 along the width direction Z, the parting surface 111*b* may be symmetrically arranged with respect to a reference plane perpendicular to the width direction Z, thereby improving the appearance quality of the core module 11.

In some embodiments, referring to FIG. 7 and FIG. 8, the core module 11 may include a support 115 disposed in the core housing 111. The support 115 and the loudspeaker 112 may be enclosed to form an acoustic cavity 116, such that the acoustic cavity 116 may be separated from other structures (e.g. the main control circuit board 13, etc.) in the core housing 111, thereby improving the acoustic performance of the core module 11. The core housing 111 may be provided with an acoustic hole (e.g., the acoustic hole may be at least one of the pressure relief hole 111*c* and the sound adjustment hole 111*d*), and the support 115 may be provided with an acoustic channel 1151 configured to connect the acoustic hole and the acoustic cavity 116, such that the acoustic cavity 116 may be communicated with the external environment, i.e., the air can freely enter and exit the acoustic cavity 116, thereby reducing the resistance of the diaphragm of the loudspeaker 112 during the vibration process.

In some embodiments, the support 115 may cooperate with the core housing 111 to form a first gluing groove 1171 surrounding at least a portion of the acoustic hole. The first gluing groove 1171 may be configured to accommodate a first glue for sealing an assembly gap between the support 115 and the core housing 111, i.e., waterproof sealing may be performed through the first glue, which prevents sweat, rainwater, and other liquid droplets from the outside from invading the space where the main control circuit board 13 is located in the core housing 111. In this way, based on the Helmholtz resonator, compared with the related art that a silicone sleeve is pressed on the core housing 111 by the support 115 for waterproof sealing, the present disclosure performs waterproof sealing by the first glue, which can save the silicone sleeve in the related art, and shorten a length of a portion (including the acoustic channel 1151 and the acoustic hole) of the acoustic cavity 116 communicated with the external environment, such that the resonance frequency of the leakage sound (i.e., the second leakage sound) formed by propagating through the pressure relief hole 111*c* is shifted to a higher frequency band (e.g., a frequency range greater than 4 kHz) as much as possible, thereby further preventing the second leakage sound from being heard.

It should be noted that when the acoustic hole is a pressure relief hole 111*c*, the first gluing groove 1171 may surround at least a portion of the pressure relief hole 111*c*; when the acoustic hole is the sound adjustment hole 111*d*, the first gluing groove 1171 may surround at least a portion of the sound adjustment hole 111*d*; when the acoustic holes are the pressure relief hole 111*c* and the sound adjustment hole 111*d*, the first gluing groove 1171 may surround at least a portion of the pressure relief hole 111*c* and the sound adjustment hole 111*d*, respectively. For the ease of description, referring to FIG. 8, FIG. 10, and FIG. 12, the present disclosure takes the following situation as an example for exemplary description, i.e., the acoustic holes are the pressure relief hole 111*c* and the sound adjustment hole 111*d*, and the first gluing groove 1171 surrounds at least a portion of the pressure relief hole 111*c* and the sound adjustment hole 111*d*, respectively. In some embodiments, if a gap between the support 115 and the core housing 111 (e.g., the bottom wall 1113 of the core housing 111) is large enough, or the bottom wall 1113 and the first side wall 1114 of the core housing 111 are not an integrally molded structure (i.e., the bottom wall 1113 and the first side wall 1114 are two separate structures), the first gluing groove 1171 may surround the entire acoustic hole, i.e., the first gluing groove 1171 may be a complete annular structure.

Figure 12:
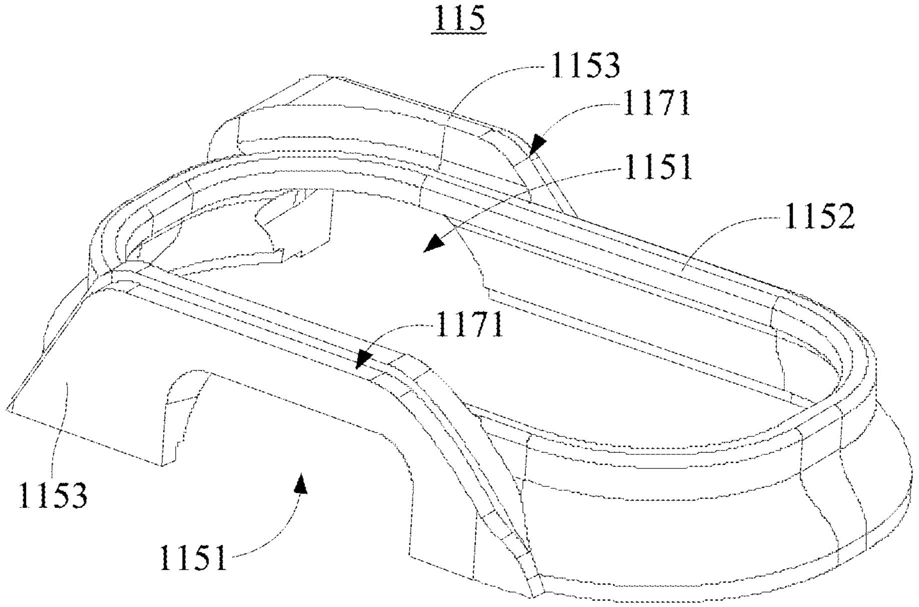
FIG. 12 is a schematic structural diagram illustrating an exemplary support according to some embodiments of the present disclosure.

In some embodiments, referring to FIG. 12 and FIG. 10, the support 115 may include an annular body portion 1152 and a docking portion 1153 connected with the annular body portion 1152. The annular body portion 1152 may sleeve a periphery of the loudspeaker 112 to form the acoustic cavity 116. The acoustic channel 1151 may penetrate through the docking portion 1153 and the annular body portion 1152. In some embodiments, the docking portion 1153 may be located between the annular body portion 1152 and the core housing 111, and surround at least a portion of the acoustic hole. The docking portion 1153 may cooperate with the core housing 111 to form the first gluing groove 1171. Since the acoustic holes may be the pressure relief hole 111*c* and the sound adjustment hole 111*d*, two docking portions 1153 may be provided, and two first gluing grooves 1171 may be provided. Correspondingly, the two docking portions 1153 may cooperate with the first side wall 1114 to form two first gluing grooves 1171. In this way, since the support 115 is arranged in a ring shape, a side of the loudspeaker 112 toward the main control circuit board 13 may be exposed, which is conducive to reducing the thickness of the core module 11 in the thickness direction X.

In some embodiments, referring to FIG. 10 and FIG. 8, a concave region 1119 may be provided on an inner side of the core housing 111. The acoustic hole may be provided at a bottom of the concave region 1119. The core module 11 may include an acoustic resistance mesh 118 provided in the concave region 1119. The docking portion 1153 may press the acoustic resistance mesh 118 on the bottom of the concave region 1119. In this way, the support 115 can be presented from scraping the acoustic resistance mesh 118 during an assembly process, assembly gaps between the support 115, the acoustic resistance mesh 118, and the core inner housing 1111 can be reduced, and the acoustic resistance mesh 118 can be prevented from shaking. The acoustic resistance mesh 118 may be pre-fixed at the bottom of the concave region 1119 by a double-sided tape or a glue. The acoustic resistance mesh 118 may also be pre-fixed on a protective steel mesh, and then the protective steel mesh may be pre-fixed at the bottom of the concave region 1119 by the double-sided tape or the glue. Correspondingly, since the acoustic holes may be the pressure relief hole 111*c* and the sound adjustment hole 111*d*, two concave regions 1119 may be provided, and two acoustic resistance meshes 118 may be provided.

In some embodiments, the first glue may be configured to seal the assembly gap between the support 115 and the acoustic resistance mesh 118 and/or the assembly gap between the acoustic resistance mesh 118 and the core housing 111 (e.g., a side wall of the concave region 1119), thereby further realizing waterproof sealing.

In some embodiments, referring to FIG. 8, FIG. 10, and FIG. 12, the docking portion 1153 may be configured to form a bottom wall and one side groove wall of the first gluing groove 1171, and the core housing 111 may be configured to form the other side wall groove of the first gluing groove 1171. The groove wall of the core housing 111 may be arranged opposite to the groove wall of the docking portion 1153, such that the first gluing groove 1171 may have a certain width and depth. In some embodiments, the docking portion 1153 may be configured to form one side groove wall of the first gluing groove 1171, and the core housing 111 may be configured to form the bottom wall and the other side groove wall of the first gluing groove 1171. In some embodiments, the docking portion 1153 may be configured to form one side groove wall and a portion of the bottom wall of the first gluing groove 1171, and the core housing 111 may be configured to form the other side groove wall and another portion of the bottom wall of the first gluing groove 1171.

Figure 13:
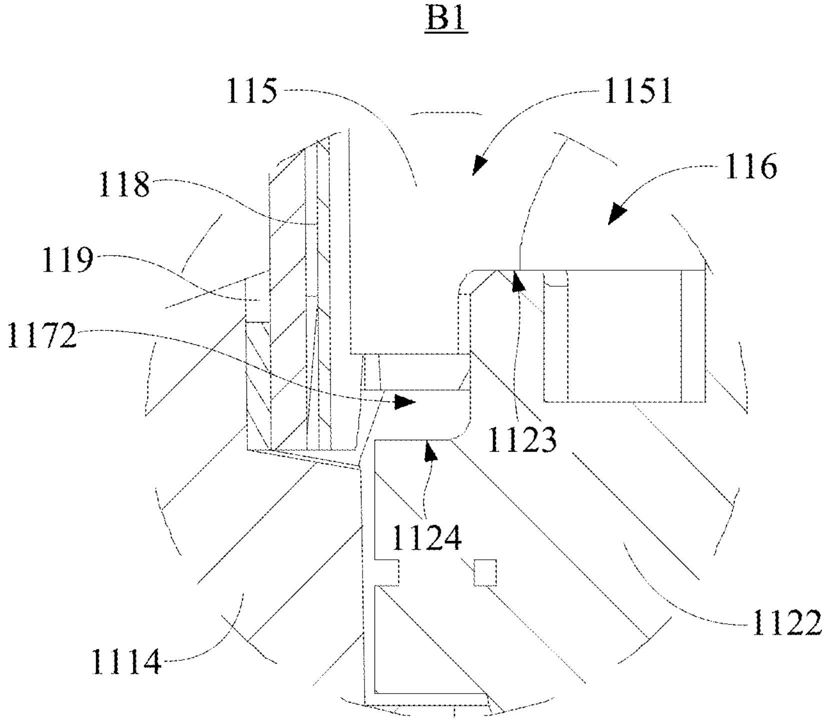
FIG. 13 is an enlarged schematic diagram illustrating a structure of the exemplary earphone in FIG. 8 in a B1 region.
Figure 14:
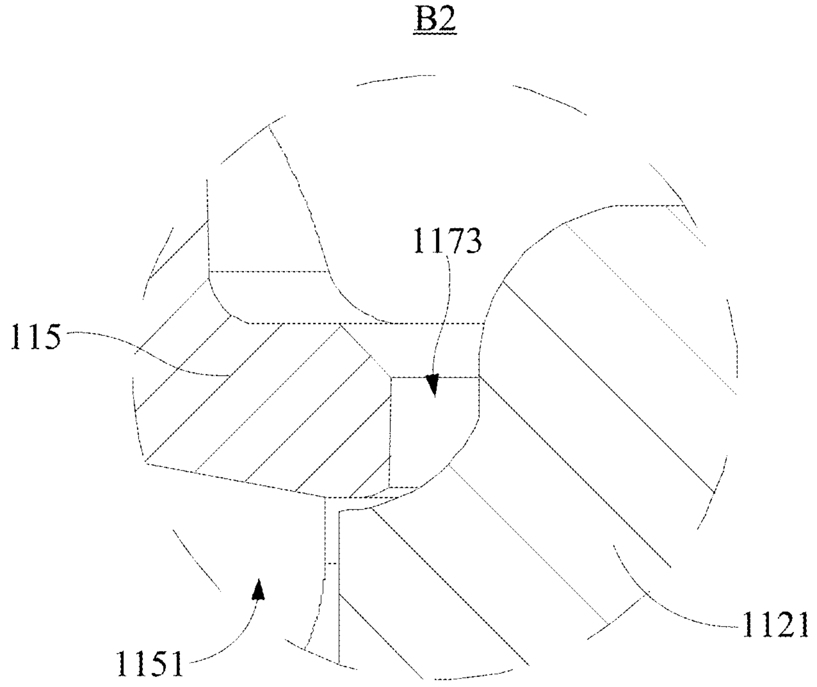
FIG. 14 is an enlarged schematic diagram illustrating a structure of the exemplary earphone in FIG. 8 in a B2 region.

In some embodiments, referring to FIGS. 12-14, the loudspeaker 112 may include a body 1121 and an annular carrier 1122 arranged along a circumferential direction of the body 1121. A lower end of the support 115 may be supported on the annular carrier 1122. The acoustic channel 1151 may be open on a side toward the annular carrier 1122. The annular carrier 1122 may be configured to block an open portion of the acoustic channel 1151. In this case, it can be simply regarded as that the first gluing groove 1171 surrounds a portion of the acoustic hole, so as to fill the glue in the first gluing groove 1171 using modes such as a glue dispensing process subsequently.

In some embodiments, the annular carrier 1122 may include a first annular platform 1123 and a second annular platform 1124 which are arranged in a stepped shape. The second annular platform 1124 may be arranged around a periphery of the first annular platform 1123. A portion of the lower end of the support 115 may be supported on the first annular platform 1123, and another portion of the lower end of the support 115 may form a spacing region with the second annular platform 1124, such that the support 115, the annular carrier 1122, and the core housing 111 may cooperate to form a second gluing groove 1172. The second gluing groove 1172 may be configured to accommodate a second glue for sealing an assembly gap between any two of the support 115, the annular carrier 1122, and the core housing 111 to realize waterproof sealing.

In some embodiments, an upper end of the support 115 may be placed on the body 1121 and cooperate with the body 1121 to form a third gluing groove 1173. The third gluing groove 1173 may be configured to accommodate a third glue for sealing an assembly gap between the support 115 and the body 1121 to realize waterproof sealing.

It should be noted that the specific assembly process of the core module 11 may include following process operations, and the order of all process operations may be adjusted as needed. The process operations include: 1) pre-fixing the acoustic resistance mesh 118 at the bottom of the concave region 1119 by the double-sided tape; 2) fixing the loudspeaker 112 on the bottom wall 1113, and dispensing the glue to an assembly gap between the loudspeaker 112 and the bottom wall 1113, the glue partially being accumulated on the second annular platform 1124 of the loudspeaker 112; 3) before the glue in the operation 2) is cured, fixing the support 115 on the loudspeaker 112, wherein the lower end of the support 115 is supported on the first annular platform 1123 of the loudspeaker 112, so that a space between the lower end of the support 115 and the second annular platform 1124 is be filled with the glue, the docking portion 1153 of the support 115 pressing the acoustic resistance mesh 118 and cooperating with the first side wall 1114 to form the first gluing groove 1171, and the upper end of the support 115 being placed on the body 1121 and cooperating with the body 1121 to form the third gluing groove 1173; and 4) dispensing the glue to the first gluing groove 1171, the third gluing groove 1173, and the assembly gaps between the lower end of the support 115 and the loudspeaker 112 and the core inner housing 1111. Since the assembly gaps between the lower end of the support 115 and the loudspeaker 112 and the core inner housing 1111 are very close to the first gluing groove 1171, the assembly gaps between the lower end of the support 115 and the loudspeaker 112 and the core inner housing 1111 may be simply regarded as a continuation of the first gluing groove 1171, i.e., the first gluing groove 1171 and the second gluing groove 1172 may be communicated.

In some embodiments, referring to FIGS. 15-18 and FIG. 7, the hook structure 12 may include an adapter housing 122 connected with the core module 11. The adapter housing 122 may form an accommodation cavity 124 in advance. The earphone 10 may include an electronic component 15 subsequently mounted in the accommodation cavity 124. A connection mode between the adapter housing 122 and the core module 11 may be snap connection, welding, glue connection, threaded connection, screw connection, or the like, or any combination thereof. In this way, compared with the electronic component 15 being arranged in the core module 11 in the related art, the present disclosure can save the space of the core module 11, making it more compact and small in structure, and simplify the structure of the core module 11, making it more efficient to assemble, and also conducive to reasonably arranging the relative positions of various structural components of the earphone 10, such that both the core module 11 and the hook structure 12 can be fully utilized.

It should be noted that the adapter housing 122 forming the accommodation cavity 124 in advance means that the accommodation cavity 124 may formed at the same time when the adapter housing 122 is molded, rather than being formed after the adapter housing 122 is molded. For example, the adapter housing 122 may be a plastic housing, and the corresponding accommodation cavity 124 may be obtained after the plastic housing is injection-molded by setting a corresponding core. Correspondingly, the electronic component 15 being mounted the accommodation cavity 124 subsequently refers to that the electronic component 15 and the adapter housing 122 are non-integrally molded structural parts. For example, the adapter housing 122 may be a plastic housing, and the electronic component 15 may not be integrally injection-molded in the plastic housing by means of an insert. Accordingly, the description of the adapter housing 122 forming a through hole 1251, a blind hole 1252, and a through hole 1253 in advance mentioned in the following is the same or similar, which is not repeated here. In some embodiments, the accommodation cavity 124 may also be obtained by a drilling process after the adapter housing 122 is formed, and the through hole 1251, the blind hole 1252, and the through hole 1253 may also be obtained by the drilling process after the adapter housing 122 is formed.

In some embodiments, referring to FIG. 7, the electronic component 15 may be coupled with the main control circuit board 13 to achieve an electrical connection between the hook structure 12 and the core module 11, and the adapter housing 122 may be plugged with the core housing 111 for fixation to achieve a structural connection between the hook structure 12 and the core module 11, which is simple and reliable. The plugged fixation refers to that one of the adapter housing 122 and the core housing 111 partially extends into the other of the adapter housing 122 and the core housing 111 along an assembly direction and then plugged and fixed with another limiting structure such as a latch. The assembly direction of the limiting structure may not be parallel to the assembly direction. The plugging fixation refers to that one of the adapter housing 122 and the core housing 111 partially extends into the other of adapter housing 122 and the core housing 111 and plugged for fixation without the limiting structure.

Figure 16:
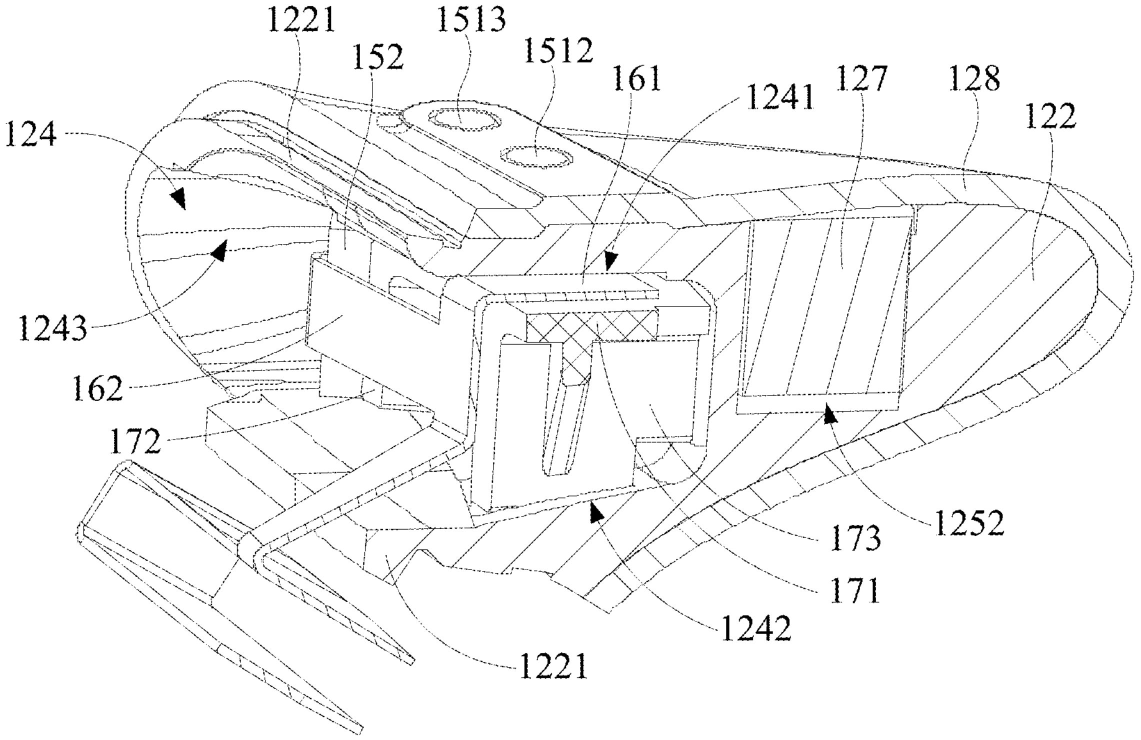
FIG. 16 is a schematic structural diagram illustrating a cross-section of the exemplary hook structure in FIG. 15 along an A3-A3 cross-sectional direction.

In some embodiments, referring to FIG. 7, FIG. 10, and FIG. 16, the adapter housing 122 may be provided with a first buckle structure 1221, and the core housing 111 may be provided with a second buckle structure 1222. The first buckle structure 1221 may extend into the core housing 111 and be buckled with the second buckle structure 1222, such that the adapter housing 122 and the core housing 111 may be buckled and fixed. The adapter housing 122 and the core housing 111 may be directly plugged and fixed without other limiting structures, which is simple and reliable. In some embodiments, two first buckle structures 1221 that are relatively spaced apart in the thickness direction X may be integrally provided on the adapter housing 122. Two second buckle structures 1222 corresponding to the two first buckle structures 1221 may be integrally provided on the core inner housing 1111.

In some embodiments, referring to FIG. 7, the earphone 10 may include a flexible circuit board 16. The flexible circuit board 16 may be at least partially disposed in the accommodation cavity 124 to connect with the electronic component 15 and extend into the core housing 111, such that the electronic component 15 may be connected with the main control circuit board 13 through the flexible circuit board 16. For example, the electronic component 15 may be welted at one end of the flexible circuit board 16 through a surface mounted technology (SMT), and the other end of the flexible circuit board 16 may be buckled with the main control circuit board 13 through a BTB connector. The loudspeaker 112 may be configured to be connected with the flexible circuit board 16 on an extension path of the flexible circuit board 16 (e.g., a lead of the loudspeaker 112 may be welded on a corresponding region of the flexible circuit board 16), such that the loudspeaker 112 may also be connected with the main control circuit board 13 through the flexible circuit board 16, and the lead of the loudspeaker 112 may not need to be extended to connect with the main control circuit board 13, thereby simplifying the wiring structure of the earphone 10 and reducing the production cost.

Figure 15:
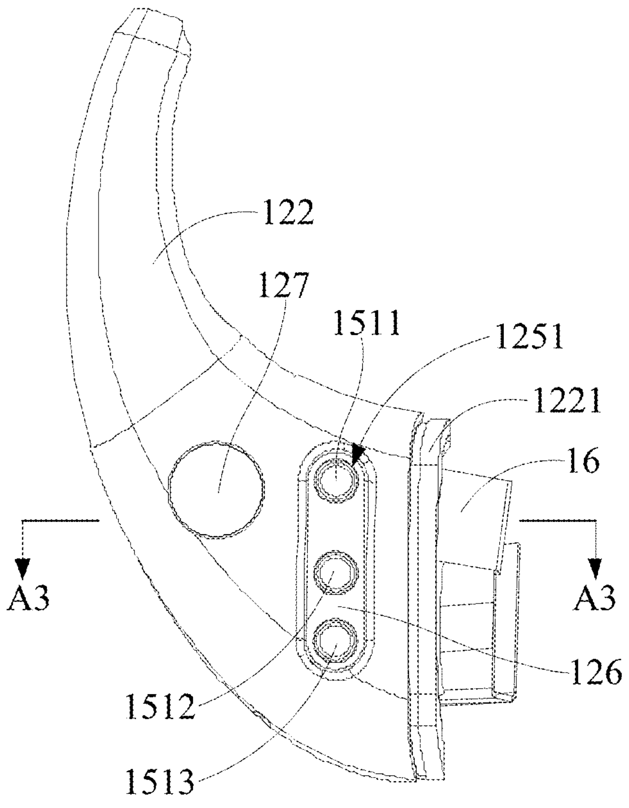
FIG. 15 is a schematic structural diagram illustrating an exemplary hook structure according to some embodiments of the present disclosure.

In some embodiments, referring to FIG. 16 and FIG. 15, the adapter housing 122 may form one or more through holes 1251 communicated with the accommodation cavity 124 in advance. The electronic component 15 may include one or more electrode terminals 151 that are at least partially disposed in the one or more through holes 1251. The electrode terminals 151 may be a retractable elastic component such as a pogo-PIN, or a non-retractable rigid component such as a metal column. An aperture of each of the one or more through holes 1251 may be greater than an outer diameter of each of the one or more electrode terminals 151 to facilitate subsequent mounting of the electrode terminals 151. In some embodiments, the electrode terminals 151 may also be integrally formed with the adapter housing 122 in the form of an insert. In some embodiments, the electrode terminals 151 may face the ear in the wearing state, such that the electrode terminals 151 is invisible in the wearing state, thereby improving the appearance quality of the earphone 10 in the wearing state.

It should be noted that when the electrode terminals 151 are configured as the retractable elastic component such as the pogo-PIN, an extension direction of the electrode terminals 151 may be a retractable direction thereof. When the electrode terminals 151 are configured as the non-retractable rigid component such as a metal column, the extension direction of the electrode terminals 151 may be a direction of an axis thereof.

In some embodiments, a plurality of electrode terminals 151 may be provided according to actual usage requirements, such as for charging, detection, etc.

In some embodiments, the one or more electrode terminals 151 may include a positive charging terminal 1511 and a negative charging terminal 1512 which are spaced apart from each other. The positive charging terminal 1511 and the negative charging terminal 1512 may be disposed in respective through holes 1251, respectively, such that the earphone 10 may be charged through the one or more electrode terminals 151. In some embodiments, only one of the positive charging terminal 1511 and the negative charging terminal 1512 may be disposed on the adapter housing 122, and the other of the positive charging terminal 1511 and the negative charging terminal 1512 may be disposed on another housing in the hook structure 12 (e.g., the battery housing 123), or on the core inner housing 1111.

In some embodiments, the one or more electrode terminals 151 may include a detection terminal 1513 spaced apart from the positive charging terminal 1511 and the negative charging terminal 1512. The detection terminal 1513 may be configured to perform detection functions such as charging detection, detection of the earphone 10 being placed in or taken out of a charging case, etc. In some embodiments, the detection terminal 1513 may also be replaced with an electronic component such as a Hall sensor.

In some embodiments, when viewed along the extension direction of the electrode terminals 151, connection lines between every two of the positive charging terminal 1511, the negative charging terminal 1512, and the detection terminal 1513 may form a triangle, such as an equilateral triangle.

In some embodiments, when viewed along the extension direction of the electrode terminals 151, the positive charging terminal 1511, the negative charging terminal 1512, and the detection terminal 1513 may be spaced apart from each other in a line segment, such as in a straight line segment. A spacing between the positive charging terminal 1511 and the negative charging terminal 1512 may be greater than a spacing between the negative charging terminal 1512 and the detection terminal 1513. For example, the negative charging terminal 1512 may be located between the positive charging terminal 1511 and the detection terminal 1513, and the spacing between the positive charging terminal 1511 and the negative charging terminal 1512 may be greater than the spacing between the negative charging terminal 1512 and the detection terminal 1513. As another example, the detection terminal 1513 may be located between the positive charging terminal 1511 and the negative charging terminal 1512. In this way, when the space for setting the electrode terminals 151 on the adapter housing 122 is limited, the spacing between the positive charging terminal 1511 and the negative charging terminal 1512 may be increased as much as possible, thereby avoiding a short circuit between the positive charging terminal 1511 and the negative charging terminal 1512.

In some embodiments, referring to FIG. 15, a boss 126 may be provided on an outer side of the adapter housing 122. The through holes 1251 may penetrate through the boss 126, such that the plurality of electrode terminals 151 may be exposed out of the boss 126. In this way, the boss 126 may make an uneven portion of the adapter housing 122 with a certain curvature become flat, so as to facilitate the arrangement of the electrode terminals 151. The positive charging terminal 1511, the negative charging terminal 1512, and the detection terminal 1513 may be arranged in sequence along a length direction of the boss 126.

Figure 17:
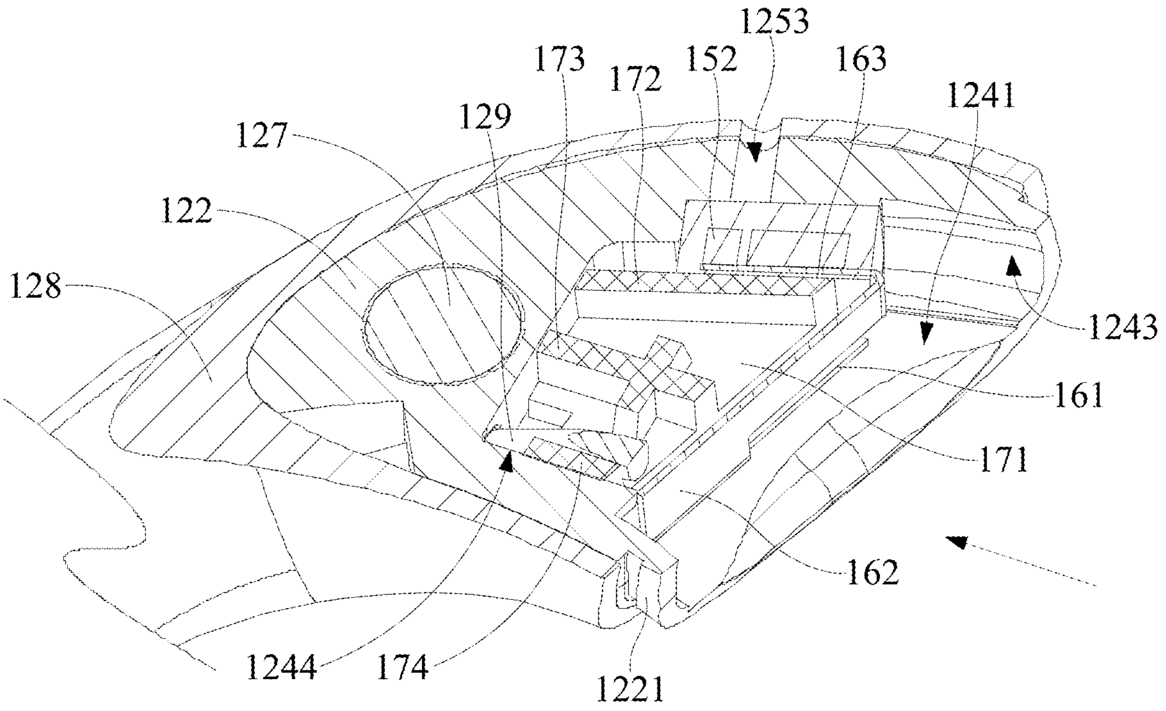
FIG. 17 is a schematic structural diagram illustrating a cross-section of the exemplary hook structure in FIG. 15 along another cross-sectional direction perpendicular to the A3-A3 cross-sectional direction.

In some embodiments, referring to FIGS. 15-17, the hook structure 12 may include a magnet 127. The magnet 127 and the electrode terminals 151 may be exposed on the same side of the adapter housing 122, i.e., the magnet 127 and the electrode terminals 151 may be visible on the same side surface of the adapter housing 122, such that the magnet 127 may be closer to the outside region to which the exposed end of the electrode terminals 151 faces, thereby shortening a distance between the magnet 127 and a magnetic suction structure configured to cooperate with the magnet 127 in a charging device such as a charging case or a distance between the magnet 127 and a Hall sensor configured to cooperate with the magnet 127, thereby improving the reliability of functions such as charging and detection. The magnet 127 and the electrode terminals 151 may be arranged adjacent to each other to allow the magnet 127 to cooperate with the magnetic suction structure in a charging device such as a charging case, such that the electrode terminals 151 may cooperate with the electrode terminals in the charging device to facilitate charging. Accordingly, the boss 126 may protrude from the adapter housing 122 that is around the magnet 127, i.e., the magnet 127 may be lower than the boss 126, such that the electrode terminals 151 may contact the electrode terminals in the charging device such as the charging case. In some embodiments, in the embodiments where the magnet 127 cooperates with the Hall sensor in the charging device such as the charging case for detection, the magnet 127 may be disposed adjacent to the electrode terminals 151, and the electrode terminals in the charging device such as the charging case that is configured to cooperate with the electrode terminals 151 may also be disposed adjacent to the Hall sensor, which reduces an area in the charging device such as the charging case that is used to carry the electrode terminals and the Hall sensor.

In some embodiments, the hook structure 12 may include a flexible coating 128. The hardness of the flexible coating 128 may be less than the hardness of the adapter housing 122. The adapter housing 122 may be a plastic part. A material of the flexible coating 128 may be silicone, rubber, etc., and the flexible coating 128 may be provided on the adapter housing 122 by injection molding, glue connection, etc. In some embodiments, the flexible coating 128 may cover the adapter housing 122 and the magnet 127, such that the magnet 127 is not exposed and the electrode terminals 151 are exposed, i.e., the magnet 127 is invisible and the electrode terminals 151 are visible. In this way, the use requirements of the electrode terminals 151 can be met, and the magnet 127 can be shielded to prevent the magnet 127 from being exposed and worn or affecting the appearance quality. In addition, the flexible coating 128 may also be conducive to improving the comfort of the earphone 10 in the wearing state. The thickness of the flexible coating 128 may be less than the thickness of the adapter housing 122.

In some embodiments, referring to FIG. 16, the adapter housing 122 may form the blind hole 1252 that is not communicated with the accommodation cavity 124 to increase the waterproof and dustproof performance of the accommodation cavity 124 in advance. The magnet 127 may be at least disposed in the blind hole 1252 and exposed through an open end of the blind hole 1252. In this way, the thickness of the adapter housing 122 in a region where the magnet 127 is located can be reduced, and the appearance quality of the earphone 10 in the region where the magnet 127 is located can be improved. In some embodiments, the blind hole 1252 may also be configured as a through hole.

In some embodiments, referring to FIG. 15, viewed along the extension direction of the electrode terminals 151, a plurality of electrode terminals 151 may be arranged at intervals to form a line segment, such as a straight line segment or a broken line segment. The magnet 127 may be located on any side of the line segment, or the magnet 127 may intersect with the line segment and may be at least partially located between any two adjacent electrode terminals 151. For example, if one magnet 127 is provided, the magnet 127 may be located on one side of the line segment as a whole, or may intersect with the line segment and may be located between any two adjacent electrode terminals 151 as a whole. As another example, if two magnets 127 are provided, one of the two magnets 127 may be located on one side of the line segment as a whole, and the of the two magnets 127 may be located on the other side of the line segment as a whole. As another example, if one magnet 127 is provided, a portion of the magnet 127 may intersect with the line segment and may be located between any two adjacent electrode terminals 151, and another portion of the magnet 127 may be located below the electrode terminals 151 in the extension direction.

In some embodiments, referring to FIG. 15, the plurality of electrode terminals 151 may include the positive charging terminal 1511, negative charging terminal 1512, and the detection terminal 1513 arranged in a straight line segment. The magnet 127 may be located on one side of the straight line segment. In some embodiments, viewed along the extension direction of the electrode terminals 151, a center of the magnet 127 may have a first distance, a second distance, and a third distance from a center of the positive charging terminal 1511, a center of the negative charging terminal 1512, and a center the detection terminal 1513, respectively. The third distance may be greater than the first distance and greater than the second distance, respectively, to prioritize the reliability of charging. It should be noted that in the embodiment in which the hook structure 12 is provided with the flexible coating 128, in order to determine the relative positional relationships between the magnet 127, the positive charging terminal 1511, the negative charging terminal 1512, and the detection terminal 1513, the flexible coating 128 may be removed first.

Figure 18:
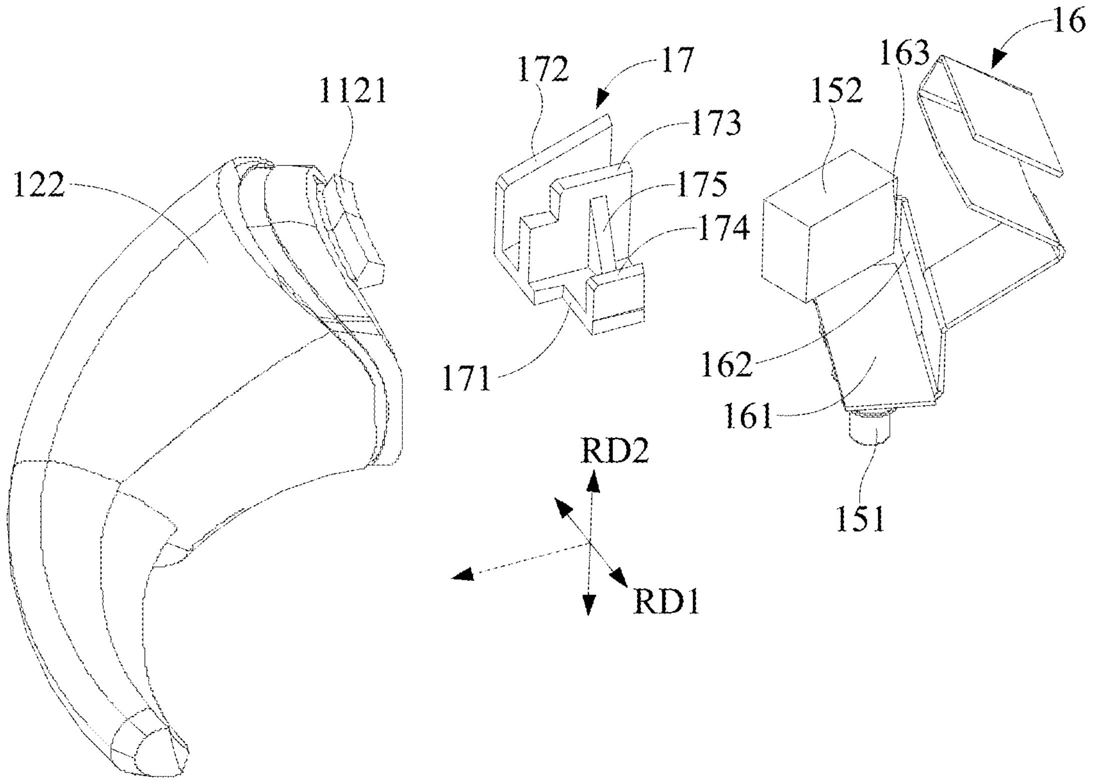
FIG. 18 is a schematic diagram illustrating decomposed structures of the exemplary hook structure in FIG. 15.

In some embodiments, referring to FIGS. 16-18, the electronic component 15 may include one or more electrode terminals 151 and a microphone 152. The adapter housing 122 may form the accommodation cavity 124 and one or more through holes 1251 and one or more through holes 1253 which are respectively communicated with the accommodation cavity 124 in advance. Due to the different functions of the electrode terminals 151 and the microphone 152, the through holes 1251 and the through holes 1253 may be located on different side walls of the adapter housing 122. Accordingly, the one or more electrode terminals 151 may be at least partially disposed in the one or more through holes 1251, and the microphone 152 may be disposed in the accommodation cavity 124, and pick up a sound (e.g., a user voice, and an environmental sound) outside the earphone 10 through the one or more through holes 1253. In this way, by reasonably arranging the relative position of the electrode terminals 151 and the microphone 152, the space of the accommodation cavity 124 may be fully utilized, and the structure of the earphone 10 may be more compact and smaller. In some embodiments, the earphone 10 may include a support assembly 17 at least partially disposed in the accommodation cavity 124. The support assembly 17 may support and fix the electrode terminals 151 and the microphone 152 on side walls corresponding to the one or more through holes 1251 and the one or more through holes 1253, respectively. In this way, the electrode terminals 151 and the microphone 152 can be prevented from being separated from the adapter housing 122, the waterproof and dustproof performance of the electronic component 15 can be enhanced, and the structure is simple and reliable.

In some embodiments, referring to FIG. 18, the flexible circuit board 16 may include a first circuit board portion 161, a second circuit board portion 162, and a third circuit board portion 163 with an integrated structure. The electrode terminals 151 may be welded on the first circuit board portion 161. The second circuit board portion 162 may be bent relative to the first circuit board portion 161. The microphone 152 may be welded on the third circuit board portion 163 and bent relative to the second circuit board portion 162. In other words, after the flexible circuit board 16 is bent twice, the first circuit board portion 161, the second circuit board portion 162, and the third circuit board portion 163 may correspond to three adjacent surfaces of a hexagonal structure. One end of the second circuit board portion 162 that is away from the third circuit board portion 163 may be connected with the first circuit board portion 161, and other portions of the second circuit board portion 162 may not be connected with the first circuit board portion 161. In this way, after the flexible circuit board 16 and the electrode terminals 151 and the microphone 152 thereon are assembled in the adapter housing 122, an operator may be allowed to first press the end of the second circuit board portion 162 connected with the first circuit board portion 161 to make the second circuit board portion 162 as flush as possible with the first circuit board portion 161 to avoid the support assembly 17 that is assembled subsequently.

In some embodiments, the adapter housing 122 may include two housings of which parting surfaces are perpendicular to the extension direction of the electrode terminals 151. The two housings may be buckled together to form the accommodation cavity 124. The support assembly 17 may be integrally formed with one of the two housings to respectively support (or press) the electrode terminals 151 and the microphone 152 when the two housings are buckled. Alternatively, in the support assembly 17, at least one of a first support member for supporting the electrode terminals 151 and a second support member for supporting the microphone 152 may be independent of the adapter housing 122 to respectively support (or press) the electrode terminals 151 and the microphone 152 when the two housings are buckled, or the support assembly 17 may be assembled after the two housings are buckled to respectively support (or press) the electrode terminals 151 and the microphone 152.

In some embodiments, at least a portion of the adapter housing 122 corresponding to the accommodation cavity 124 may be a complete housing structure. In the support assembly 17, at least one of the first support member for supporting the electrode terminals 151 and the second support member for supporting the microphone 152 may be independent of the adapter housing 122 to at least facilitate the assembly of the electrode terminals 151.

In some embodiments, referring to FIG. 18, the support assembly 17 may be independent of the adapter housing 122 and inserted into the accommodation cavity 124. In this way, since the support assembly 17, the electrode terminals 151, and the microphone 152 are independent of the adapter housing 122, respectively, the support assembly 17, the electrode terminals 151, and the microphone 152 may be assembled in a certain sequence, thereby avoiding unnecessary interference in the structure and making the assembly efficiency higher.

In some embodiments, in the support assembly 17, the first support member for supporting the electrode terminals 151 and the second support member for supporting the microphone 152 may be independent of the adapter housing 122, respectively, i.e., the first support member and the second support member may be independent of each other to respectively support (or press) the electrode terminals 151 and the microphone 152. In this way, the first support member and the second support member of the support assembly 17 may be set differently according to actual needs.

In some embodiments, the support assembly 17 may be an integrally formed structural member, i.e., in the support assembly 17, the first support member for supporting the electrode terminals 151 and the second support member for supporting the microphone 152 may be connected with each other, which simplifies the structure of the support assembly 17, and avoids the first support member and the second support member being too small to assemble. The support assembly 17 may be tightly fixed with a cavity wall of the accommodation cavity 124 after being inserted in place, i.e., the support assembly 17 may have a certain damping during an insertion or removal process, and the structure is simple and reliable. Correspondingly, the cavity wall of the accommodation cavity 124 may be provided with a guide groove and a limiting groove which cooperate with the support assembly 17. In some embodiments, the support assembly 17 may be connected with the cavity wall of the accommodation cavity 124 through a glue dispensing process.

In some embodiments, referring to FIG. 17 and FIG. 18, a size of at least a portion of the support assembly 17 and a size of at least a portion of the accommodation cavity 124 in at least one reference direction perpendicular to an insertion direction (e.g., a direction indicated by arrows in FIG. 17 and FIG. 18) of the support assembly 17 relative to the accommodation cavity 124 may be set to gradually decrease along the insertion direction, such that the support assembly 17 may extend into a spacing region between the electrode terminals 151 and the microphone 152. In other words, the size of at least a portion of the support assembly 17 in the at least one reference direction perpendicular to the insertion direction may be set to gradually decrease along the insertion direction, and the size of at least a portion of the accommodation cavity 124 in the same reference direction may be set to gradually decrease along the insertion direction, and the change trends of the sizes may be the same or similar, such that the support assembly 17 may be tightly matched and fixed with the cavity wall of the accommodation cavity 124 after being inserted in place.

In some embodiments, referring to FIGS. 16-18, the cavity wall of the accommodation cavity 124 may include a first cavity wall 1241 and a second cavity wall 1242 which are arranged side by side and spaced apart from each other, and a third cavity wall 1243 configured to connect the first cavity wall 1241 and the second cavity wall 1242. The one or more through holes 1251 may be disposed on the first cavity wall 1241, and the one or more through holes 1253 may be disposed on the third cavity wall 1243. Accordingly, the support assembly 17 may include a bottom plate 171 and a first side plate 172 connected with the bottom plate 171, such as an L-shaped structure. One side main surface of the bottom plate 171 may be arranged opposite to the first cavity wall 1241 and support the electrode terminals 151. One side main surface of the first side plate 172 may be arranged opposite to the third cavity wall 1243 and support the microphone 152. In this way, after the electrode terminals 151 and the microphone 152 are assembled in place, the support assembly 17 may be inserted into the accommodation cavity 124 along the insertion direction in place to support the electrode terminals 151 and the microphone 152, respectively, by the bottom plate 171 and the first side plate 172.

In some embodiments, an orthographic projection of the microphone 152 on the first cavity wall 1241 may cover at least a portion of the electrode terminals 151 (e.g., the microphone 152 may cover a portion of the positive charging terminal 1511), which makes the structure of each portion more compact.

In some embodiments, a size of at least a portion of the bottom plate 171 and the size of at least a portion of the accommodation cavity 124 in a first reference direction RD1 perpendicular to the insertion direction and parallel to the one side main surface of the bottom plate 171 may be set to gradually decrease along the insertion direction, i.e., one of a front end and a rear end of the bottom plate 171 in the insertion direction or a local portion between the front end and the rear end may be set to maintain the size in the first reference direction RD1 constant along the insertion direction. A size of the first side plate 172 and a size of the accommodation cavity 124 in a second reference direction RD2 perpendicular to the insertion direction and parallel to the one side main surface of the first side plate 172 may be set to maintain constant along the insertion direction.

In some embodiments, a size of at least a portion of the first side plate 172 and the size of at least a portion of the accommodation cavity 124 in the second reference direction RD2 perpendicular to the insertion direction and parallel to the one side main surface of the first side plate 172 may be set to gradually decrease along the insertion direction, i.e., one of a front end and a rear end of the first side plate 172 in the insertion direction or a location portion between the front end and the rear end may be set to maintain the size in the second reference direction RD2 constant along the insertion direction. The size of the bottom plate 171 and the size of accommodation cavity 124 in the first reference direction RD1 perpendicular to the insertion direction and parallel to the one side main surface of the bottom plate 171 may be set to maintain constant along the insertion direction.

In some embodiments, a size of at least a portion of the first side plate 172 and the size of at least a portion of the accommodation cavity 124 in the second reference direction RD2 perpendicular to the insertion direction and parallel to the one side main surface of the first side plate 172 may be set to gradually decrease along the insertion direction, and the size of at least a portion of the first side plate 172 and the size of at least a portion of the accommodation cavity 124 in the second reference direction RD2 perpendicular to the insertion direction and parallel to the one side main surface of the first side plate 172 may be set to gradually decrease along the insertion direction.

It should be noted that for the support assembly 17, the size of the bottom plate 171 in the first reference direction RD1 may be simply regarded as a width of the bottom plate 171, and the size of the first side plate 172 in the second reference direction RD2 may be simply regarded as a height of the first side plate 172.

In some embodiments, referring to FIGS. 16-18, the support assembly 17 may include a second side plate 173 connected with the bottom plate 171. The second side plate 173 and the first side plate 172 may be arranged side by side and at intervals on the same side of the bottom plate 171. The second side plate 173 may abut against a second cavity wall 1242 to provide the bottom plate 171 with a supporting force toward the electrode terminals 151, thereby improving the supporting effect of the support assembly 17 on the electrode terminals 151. In the embodiment in which the one or more electrode terminals 151 include the positive charging terminal 1511 and the negative charging terminal 1512 which are arranged at intervals along the direction perpendicular to the insertion direction, the second side plate 173 may be located between the positive charging terminal 1511 and the negative charging terminal 1512, such that each portion of the electrode terminals 151 may be subjected to a uniform force, thereby further improving the supporting effect of the support assembly 17 on the electrode terminals 151.

In some embodiments, referring to FIGS. 16-18, the cavity wall of the accommodation cavity 124 may include a fourth cavity wall 1244 configured to connect the first cavity wall 1241 and the second cavity wall 1242 and be opposite to the third cavity wall 1243. The first cavity wall 1241 and the second cavity wall 1242 may be generally arranged as a planar structure parallel to each other. The third cavity wall 1243 and the fourth cavity wall 1244 may be generally arranged as an arc surface structure expanding outward from each other, so as to expand the volume of the accommodation cavity 124 as much as possible when the volume of the adapter housing 122 is limited. Correspondingly, the support assembly 17 may include a third side plate 174 connected with the bottom plate 171. The first side plate 172 and the third side plate 174 may be respectively located at two side edges of the bottom plate 171 in the direction perpendicular to the insertion direction, and the second side plate 173 may be located between the first side plate 172 and the third side plate 174. The third side plate 174 may abut against the fourth cavity wall 1244 to provide a supporting force for the first side plate 172 toward the microphone 152, thereby improving the supporting effect of the supporting assembly 17 on the microphone 152.

In some embodiments, compared with the bottom plate 171, a height of the second side plate 173 may be greater than a height of the first side plate 172 and a height of the third side plate 174, such that the second side plate 173 may abut against the second cavity wall 1242, and the third side plate 174 may abut against the fourth cavity wall 1244. Since the second side plate 173 and the third side plate 174 do not directly contact any one of the electrode terminals 151 and the microphone 152, the second side plate 173 and the third side plate 174 may be configured for guidance during the insertion of the support assembly 17 into the accommodation cavity 124. Accordingly, since the height of the second side plate 173 is the highest relatively, the support assembly 17 may include a reinforcing rib 175 configured to connect the second side plate 173 and the bottom plate 171. The reinforcing rib 175 may be provided on opposite sides of the second side plate 173 toward the first side plate 172 and the third side plate 174.

In some embodiments, referring to FIGS. 15-17 and FIG. 9, the hook structure 12 may include the elastic metal wire 121, the adapter housing 122, the battery housing 123, and a lead 129. Two ends of the elastic metal wire 121 and two ends of the lead 129 may be connected with the adapter housing 122 and the battery housing 123, respectively, such that the lead 129 may extend along the elastic metal wire 121 and may be inserted into the adapter housing 122 and the battery housing 123. In some embodiments, the lead 129 may also be inserted into a preset threading channel after the elastic metal wire 121 is connected with the adapter housing 122 and the battery housing 123. The battery 14 may be disposed in the battery housing 123, and may be connected with the flexible circuit board 16 through the lead 129, such that the battery 14 may be connected with the main control circuit board 13 through the flexible circuit board 16, thereby simplifying the wiring structure of the earphone 10 and reducing the production cost. In other words, the components of the hook structure 12 such as the electrode terminals 151, the microphone 152, and the battery 14 may be connected with the main control circuit board 13 through the flexible circuit board 16.

In some embodiments, the flexible coating 128 may cover at least an exposed portion of the elastic metal wire 121 and the lead 129, and at least a portion of the battery 123, such that the lead 129 may be exposed, thereby improving the appearance quality of the earphone 10.

It should be noted that the adapter housing 122 may also be regarded as a portion of the structure of the core housing 111. For example, the adapter housing 122 may be integrally formed with the core inner housing 1111. As another example, a portion of the adapter housing 122 may be integrally formed with the core inner housing 1111 and a rest portion of the adapter housing 122 may be integrally formed with the core outer housing 1112. Other portions of the hook structure 12 except the adapter housing 122, such as the end of the elastic metal wire 121 away from the battery housing 123 and the battery housing 123, may be fixedly connected with the core module 11 with the adapter housing 122 at the adapter housing 122 (e.g., through plugged fixation). Correspondingly, structural components such as the electrode terminals 151, the microphone 152, and the magnet 127 may be also adjusted in position accordingly, which is not repeated here.

According to the above related description, the present disclosure provides a housing assembly. The housing assembly may include a plastic housing, a metal functional pattern, and a silicone coating. The metal functional pattern may be disposed on an outer side of the plastic housing. The silicone coating may be disposed on a side of the metal functional pattern away from the plastic housing and on the plastic housing not covered by the metal functional pattern through integral injection molding, glue connection, etc. Accordingly, compared with the metal functional pattern being disposed on an inner side of the plastic housing away from the silicone coating, the metal functional pattern may be disposed on the outer side of the plastic housing toward the silicone coating, such that the metal functional pattern may be further away from the interference of other electronic components of the housing assembly, or closer to a signal trigger source outside the housing assembly, thereby increasing the anti-interference performance and sensitivity of the metal functional pattern. The structure of the plastic housing may be the same or similar to that of the core housing 111 or the core outer housing 1112, and the structure of the silicone coating may be the same or similar to that of the flexible coating 1132, which is not repeated here.

In some embodiments, the metal functional pattern may be configured as the antenna pattern 1141 or the touch control pattern 1142. The antenna pattern 1141 may be disposed on the outer side of the plastic housing, which may increase a spacing between the antenna pattern 1141 and other electronic components of the plastic housing, i.e., increase an antenna clearance region, thereby increasing the anti-interference performance of the antenna pattern 1141. The touch control pattern 1142 may be disposed on the outer side of the plastic housing, which may shorten a spacing between the touch control pattern 1142 and an external signal trigger source (e.g., a user's finger), i.e., shorten a touch spacing, thereby increasing the sensitivity of the touch control pattern 1142 to be triggered by the user.

In some embodiments, the metal functional pattern may include the antenna pattern 1141 and the touch control pattern 1142. The antenna pattern 1141 may surround a periphery of the touch control pattern 1142 to fully utilize the space of the outer side of the plastic housing. The antenna pattern 1141 may be set in a U shape, and the touch control pattern 1142 may be set in a square shape.

In some embodiments, a thickness of the silicone coating may be less than a thickness of the plastic housing, such that the silicone coating may shield and protect the metal functional pattern while further increasing the anti-interference performance and sensitivity of the metal functional pattern and reducing the volume of the housing assembly.

In some embodiments, the housing assembly may be regarded as a core housing for accommodating the loudspeaker 112. A relative positional relationship between the plastic housing and the plastic coating may be the same or similar to that between the core housing 111 and the flexible coating 1132, which is not repeated here.

In some embodiments, in addition to being applied to the earphone 10, the housing assembly may also be applied to other electronic devices such as smart glasses. The electronic device may include a core module provided with the loudspeaker 112, and may also include the main control circuit board 13, and the loudspeaker 112 and the battery 14 are respectively coupled with the main control circuit board 13. The housing assembly may be configured to accommodate at least one of the electronic components such as the loudspeaker 112, the main control circuit board 13, and the battery 14, and may also be configured to support the loudspeaker 112 of the electronic device to be located in a corresponding wearing position. It should be noted that for electronic devices such as an earphone and the smart glasses based on the bone conduction principle, the loudspeaker 112 may be adaptively adjusted to a bone conduction loudspeaker. The basic structure of the bone conduction loudspeaker is well known to those skilled in the art, which is not repeated here.

The present disclosure provides a housing assembly. The housing assembly may include a first housing, the one or more electrode terminals 151, the magnet 127, and the flexible coating 128. The electrode terminals 151 and the magnet 127 may be exposed on the same side of the first housing. The hardness of the flexible coating 128 may be less than that of the first housing, and the flexible coating 128 may be disposed on the first housing and the magnet 127, such that the magnet 127 may not exposed and the electrode terminals 151 may be exposed. In this way, compared with the magnet 127 being disposed in the first housing, the present disclosure makes the magnet 127 closer to the outside region to which an exposed end of the electrode terminals 151 faces, thereby shortening a spacing between the magnet 127 and a magnetic suction structure used to cooperate with the magnet 127 in a charging device such as a charging case or a spacing between the magnet 127 and a Hall sensor configured to cooperate with the magnet 127, thereby improving the reliability of functions such as charging and detection. Therefore, the housing assembly may be applied to both power receiving devices (e.g., the earphone 10 and the smart glasses) and the charging device (e.g. the charging case). In other words, the electronic device may be the power receiving device or the charging device. For the ease of description, the first housing may be the adapter housing 122.

In some embodiments, the first housing may be provided with the one or more through holes 1251 and the blind hole 1252. The electrode terminals 151 may be at least partially disposed in the one or more through holes 1251. The magnet 127 may be at least partially disposed in the blind hole 1252 and exposed through an open end of the blind hole 1252. In this way, the thickness of the first housing in a region where the magnet 127 is located can be reduced, the appearance quality of the first housing in the region where the magnet 127 is located can be improved. In some embodiments, the blind hole 1252 may also be configured as a through hole.

In some embodiments, the boss 126 may be provided on an outer side of the first housing. The boss 126 may be provided adjacent to the magnet 127 and protrude from the first housing around the magnet 127. The through holes 1251 may penetrate through the boss 126, such that a plurality of electrode terminals 151 may be exposed out the boss 126. In this way, the boss 126 may make an uneven portion of the first housing with a certain curvature become flat, so as to facilitate the arrangement of the electrode terminals 151. The boss 126 may be provided in a long strip shape, which is simple and reliable in structure.

In some embodiments, the housing assembly may include the flexible circuit board 16. The electrode terminals 151 may be connected with the flexible circuit board 16 to simplify the wiring of the electrode terminals 151. The first housing may form the accommodation cavity 124. At least a portion of the flexible circuit board 16 may be disposed in the accommodation cavity 124. The through holes 1251 may be communicated with the accommodation cavity 124, and the blind hole 1252 may not be communicated with the accommodation cavity 124, so as to improve the waterproof and dustproof performance of the first housing.

In some embodiments, the housing assembly may include a second housing, the elastic metal wire 121, and the lead 129. Two ends of the elastic metal wire 121 and two ends of the lead 129 may be connected with the first housing and the second housing, respectively, such that the lead 129 may extend along the elastic metal wire 121 and may be inserted into the first housing and the second housing. For ease of description, the second housing may be the battery housing

123. In some embodiments, the battery 14 may be disposed in the second housing. The battery 14 may be connected with the flexible circuit board 16 through the lead 129, i.e., the battery 14 and the electrode terminals 151 may both be connected with the flexible circuit board 16 to simplify the wiring. Accordingly, the flexible coating 128 may be at least disposed on the elastic metal wire 121 and the lead 129, such that the lead 129 may be exposed.

In some embodiments, the housing assembly may be configured for the earphone 10 and may include a third housing for accommodating the loudspeaker 112. The third housing may be plugged with the first housing for fixation. For ease of description, the third housing may be the core housing 111.

The present disclosure provides a housing assembly. The housing assembly may include a first housing, the one or more electrode terminals 151, the microphone 152, and the support assembly 17. The first housing may be provided with the accommodation cavity 124, and the through holes 1251 and the through holes 1253 are respectively connected with the accommodation cavity 124. The through holes 1251 and the through holes 1253 may be located on different side walls of the first housing. The one or more electrode terminals 151 may be at least partially disposed in the through holes 1251. The microphone 152 may be disposed in the accommodation cavity 124, and pick up a sound outside the housing assembly through the through holes 1253. In some embodiments, the support assembly 17 may be disposed in the accommodation cavity 124, and may support and fix the electrode terminals 151 and the microphone 152 on the side walls corresponding to the through holes 1251 and the through holes 1253, respectively. In this way, the electrode terminals 151 and the microphone 152 can be prevented from being separated from the first housing, the waterproof and dustproof performance at the electrode terminals 151 and the microphone 152 can be improved, and the structure is simple and reliable. For the ease of description, the first housing may be the adapter housing 122, the core housing 111, or a housing structure in which the core housing 111 and the adapter housing 122 are integrally formed.

In some embodiments, the support assembly 17 may be independent of the first housing and inserted into the accommodation cavity 124.

In some embodiments, the support assembly 17 may be an integrally formed structure.

In some embodiments, the housing assembly may be configured for the earphone 10 and may include a third housing for accommodating the loudspeaker 112. The third housing may be plugged with the first housing for fixation. The first housing may be the adapter housing 122, and the third housing may be the core housing 111.

In some embodiments, in addition to being applied to the earphone 10, the housing assembly may also be applied to other electronic devices such as smart glasses. The electronic device may include the main control circuit board 13, and the loudspeaker 112 and the battery 14 are respectively coupled with the main control circuit board 13. The housing assembly may be configured to accommodate at least one of the electronic components such as the loudspeaker 112, the main control circuit board 13, and the battery 14, and may also be configured to support the loudspeaker 112 of the electronic device to be located in a corresponding wearing position. It should be noted that for electronic devices such as the earphone and the smart glasses based on the bone conduction principle, the loudspeaker 112 may be adaptively adjusted to a bone conduction loudspeaker. The basic structure of the bone conduction loudspeaker is well known to those skilled in art, which is not repeated here.

Figure 19:
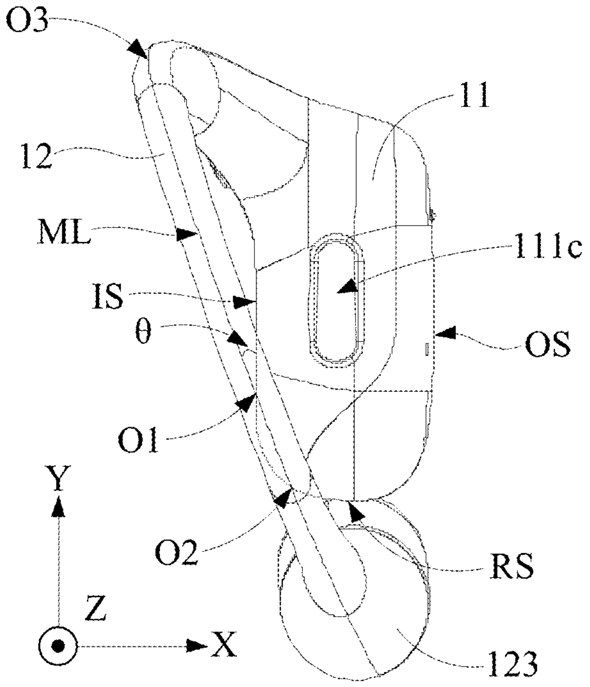
FIG. 19 is a schematic structural diagram illustrating an exemplary earphone according to some embodiments of the present disclosure.

In some embodiments, referring to FIG. 19, FIG. 4, and FIG. 3, the earphone 10 may include the core module 11 and the hook structure 12 connected with the core module 11. The core module 11 may be located on a front side of the ear in a wearing state. At least a portion of the hook structure 12 may be located on a rear side of the ear in the wearing state. The core module 11 may include the inner side surface IS toward the ear and the outer side surface OS away from the ear along the thickness direction X in the wearing state. The thickness direction X is defined as a direction in which the core module 11 is close to or away from the ear in the wearing state. In some embodiments, in a non-wearing state, and in the thickness direction X, the hook structure 12 may first extend to a side of the inner side surface IS away from the outer side surface OS, and then extend to the other side of the inner side surface IS toward the outer side surface OS. In such a configuration, since the hook structure 12 first extends to the side of the inner side surface IS away from the outer side surface OS in the thickness direction X, a portion of the hook structure 12 may be staggered with a projection of the core module 11 in a direction perpendicular to the thickness direction X, such that in the wearing state, an upper ear root of the ear may provide a less supporting force to the earphone 10, thereby improving the wearing comfort of the earphone 10. Then the hook structure 12 may extend to the other side of the inner side surface IS toward the outer side surface OS in the thickness direction X, such that another portion of the hook structure 12 may overlap with the projection of the core module 11 in the direction perpendicular to the thickness direction X, other physiological parts of the ear except the upper ear root may provide a larger supporting force to the earphone 10 in the wearing state, thereby improving the wearing stability of the earphone 10. The supporting force may include a clamping force of the earphone 10 on the ear and a friction force between the earphone 10 and the ear (and the surrounding head). In addition, for the embodiment that a free end of the core module 11 extends into a cavity of auricular concha of the ear, such configuration is also beneficial for the free end of the core module 11 to extend into the cavity of auricular concha in the wearing state.

In some embodiments, the inner side surface IS may be configured as a plane. In the non-wearing state, a plane where the inner side surface IS is located may intersect with the hook structure 12.

In some embodiments, in the wearing state, a clamping force applied by the hook structure 12 and the core module 11 on the ear in the thickness direction X (e.g., the earphone 10 may clamp the ear from left and right directions of the head) may be regarded as a portion of the clamping force of the earphone 10 on the ear. The clamping force may be measured with a dynamometer. For example, the earphone 10 may be worn on the simulator or the ear of the user, i.e., be in the wearing state; then the dynamometer (e.g., a Wedo WDF-10 digital push-pull dynamometer, which is not repeated below) is fixed on a side of the core module 11 away from the ear, then the dynamometer may be pulled and viewed; when the side of the core module 11 toward the ear of the user is just separated from the skin of the ear, a tension force displayed on the dynamometer may be obtained, and the tension force may be simply regarded as the clamping force.

In some embodiments, referring to FIG. 19 and FIG. 9, the hook structure 12 may include the elastic metal wire 121 connected with the core module 11. At least a portion of the elastic metal wire 121 may be located on the rear side of the ear in the wearing state, and the plane where the elastic metal wire 121 is located may intersect with the inner side surface IS in the non-wearing state. The elastic metal wire 121 may undergo a certain elastic deformation relative to the core module 11 in the thickness direction X, such that the elastic metal wire 121 may provide a corresponding clamping force. In this way, a portion of the hook structure 12 may be allowed to overlap with a projection of the core module 11 in a direction perpendicular to the thickness direction X, and then in the wearing state, the elastic metal wire 121 may clamp the ear together with the core module 11 and adhere to the ear due to the elastic deformation. It should be noted that when the hook structure 12 includes a coating such as the flexible coating 128, the structural components such as the elastic metal wire 121, the adapter housing 122, and the cover housing 1231 shown in FIG. 9 may not be visible in FIG. 19. In some embodiments, the hook structure 12 may not include the elastic metal wire 121. For example, a hard plastic part may be used instead of the elastic metal wire 121, and the deformation capacity of the hook structure 12 in various directions may be set according to a material, a length, a cross-sectional size, etc., of the hard plastic part, which is not repeated hereinafter.

In some embodiments, in the non-wearing state, a plane where the elastic metal wire 121 is located and the inner side surface IS may form an angle, such as an angle θ formed by a median line ML and the inner side surface IS in FIG. 19. The angle may be in a range of 15°-30°. If the angle is too small, the earphone 10 may be unstable to wear due to an insufficient clamping force on the ear. If the angle is too large, the earphone 10 may be uncomfortable to wear due to an excessive clamping force on the ear. In some embodiments, the median line refers to an axis of the elastic metal wire 121.

In some embodiments, a diameter of the elastic metal wire 121 may be in a range of 0.6 mm-0.8 mm. If the diameter is too small, the elastic metal wire 121 may provide an insufficient clamping force and insufficient structural strength. If the diameter is too large, the elastic metal wire 121 may be difficult to deform elastically and may provide an excessive clamping force.

In some embodiments, referring to FIG. 19, FIG. 9, and FIG. 7, the hook structure 12 may include the adapter housing 122 configured to connect the elastic metal wire 121 and the core module 11. At least a portion of the adapter housing 122 may be located on a front side of the ear in the wearing state. The adapter housing 122 may extend toward the inner side surface IS away from the outer side surface OS in the thickness direction X. Such configuration may allow a portion of the hook structure 12 to be staggered from the projection of the core module 11 in the direction perpendicular to the thickness direction X, such that in the wearing state, the upper ear root of the ear may provide less support for the earphone 10. It should be noted that when the hook structure 12 includes a coating such as the flexible coating 128, the adapter housing 122 shown in FIG. 9 may not be visible in FIG. 19.

In some embodiments, referring to FIG. 19 and FIG. 9, the hook structure 12 may include the battery housing 123 connected with one end of the elastic metal wire 121 away from the core module 11. The battery 14 that is coupled with the core module 11 may be disposed in the battery housing 123. In the non-wearing state, at least a portion of the battery housing 123 may be located between the inner side surface IS and the outer side surface OS in the thickness direction X. The battery housing 123 may contact the rear side of the ear and/or the head in the wearing state.

In some embodiments, referring to FIG. 19 and FIG. 2, the core module 11 may have the length direction Y and the width direction Z which are perpendicular to the thickness direction X and orthogonal to each other. The length of the core module 11 in the length direction Y may be greater than the width of the core module 11 in the width direction Z. The core module 11 may have the upper side surface US that is away from the external ear canal of the ear along the width direction Z in the wearing state, the lower side surface LS is toward the external ear canal, and the rear side surface RS is configured to connect the upper side surface US and the lower side surface LS. The rear side surface RS may be located at one end of the length direction Y toward the back of the head in the wearing state. In some embodiments, the median line ML of an orthographic projection of the hook structure 12 on a reference plane perpendicular to the width direction Z (e.g., an XY plane in FIG. 19) and an orthographic projection of the inner side surface IS on the same reference plane may form a first intersection point O1, and the median line ML and an orthographic projection of the rear side surface RS on the same reference plane may form a second intersection point O2. The median line ML may pass through a geometric center of a cross-section of any point on the hook structure 12 (e.g., the median line ML may be an axis of the elastic metal wire 121). In this way, when the orthographic projection of the core module 11 on the reference plane that is perpendicular to the thickness direction X is a non-circular structure (e.g., a rounded rectangle), the orthographic projection of the hook structure 12 along the width direction Z may fall on the upper side surface US. It should be noted that since the core module 11 and the hook structure 12 partially overlap in the width direction, dotted lines in FIG. 19 illustrate portions of the inner side surface IS and the rear side surface RS that are blocked by the hook structure 12.

In some embodiments, the first intersection point O1 and the second intersection point O2 may be connected to form a first reference line segment O1O2. The first reference line segment O1O2 may have a first component and a second component in the length direction Y and the thickness direction Z, respectively. A ratio of the length of the first component to the length of the core module 11 in the length direction Y may be in a range of 0.12 and 0.19, a ratio of the thickness of the second component to the thickness of the core module 11 in the thickness direction X may be in a range of 0.1-0.16. In this way, the hook structure 12 may be allowed to have a suitable angle (e.g., an angle θ in a range of) 15°-30° with the inner side surface IS, thereby allowing the earphone 10 to apply a suitable clamping force to the ear.

In some embodiments, a farthest point O3 of the median line ML in the thickness direction X which is farthest from the inner side surface IS may be connected with the first intersection point O1 to form a second reference line segment O1O3. The second reference line segment O1O3 may have a third component and a fourth component in the length direction Y and the thickness direction X, respectively. A ratio of the length of the third component to the length of the core module 11 in the length direction Y may be in a range of 0.43-0.66, and a ratio of the thickness of the fourth component to the thickness of the core module 11 in the thickness direction X may be in a range of 0.26-0.4. In this way, the hook structure 12 may be allowed to have a suitable angle (e.g., an angle θ in a range of) 15°-30° with the inner side surface IS, thereby allowing the earphone 10 to apply a suitable clamping force to the ear.

In some embodiments, referring to FIG. 3, the earphone 10 may include the core module 11 and the hook structure 12 connected with the core module 11. The core module 11 may be located on the front side of the ear in the wearing state, and the free end FE of the core module 11 that is not connected with the hook structure 12 may extend into the cavity of auricular concha of the ear in the wearing state. At least a portion of the hook structure 12 may be located on the rear side of the ear in the wearing state. The core module 11 and the hook structure 12 may jointly clamp an ear region from front and rear sides of the ear region corresponding to the cavity of auricular concha with a certain clamping force. If the clamping force is too small, the earphone 10 may cause instability in the wearing state; and if the clamping force is too large, the earphone 10 may cause discomfort in the wearing state.

In some embodiments, in the wearing state, a clamping force applied to the ear by the hook structure 12 and the core module 11 in a direction perpendicular to the thickness direction X (e.g., the earphone 10 may clamp the ear from front and rear directions of the head) may be regarded as a portion of the clamping force of the earphone 10 on the ear. The clamping force may be measured with a dynamometer. For example, the earphone 10 may be worn on the simulator or the ear of the user, i.e., in the wearing state; the dynamometer may be fixed to the end of the hook structure 12 that is away from the core module 11, and the dynamometer may be pulled and viewed; when a side of the hook structure 12 toward the ear of the user is just separated from the skin of the ear, a tension force displayed on the dynamometer may be obtained, and the tension force may be regarded as the clamping force.

In some embodiments, in the non-wearing state, the deformation capability of the hook structure 12 relative to the core module 11 may be reflected by a corresponding measurement mode, thereby characterizing the clamping force that the earphone 10 may apply on the ear. The measurement mode is exemplarily described below.

Figure 20:
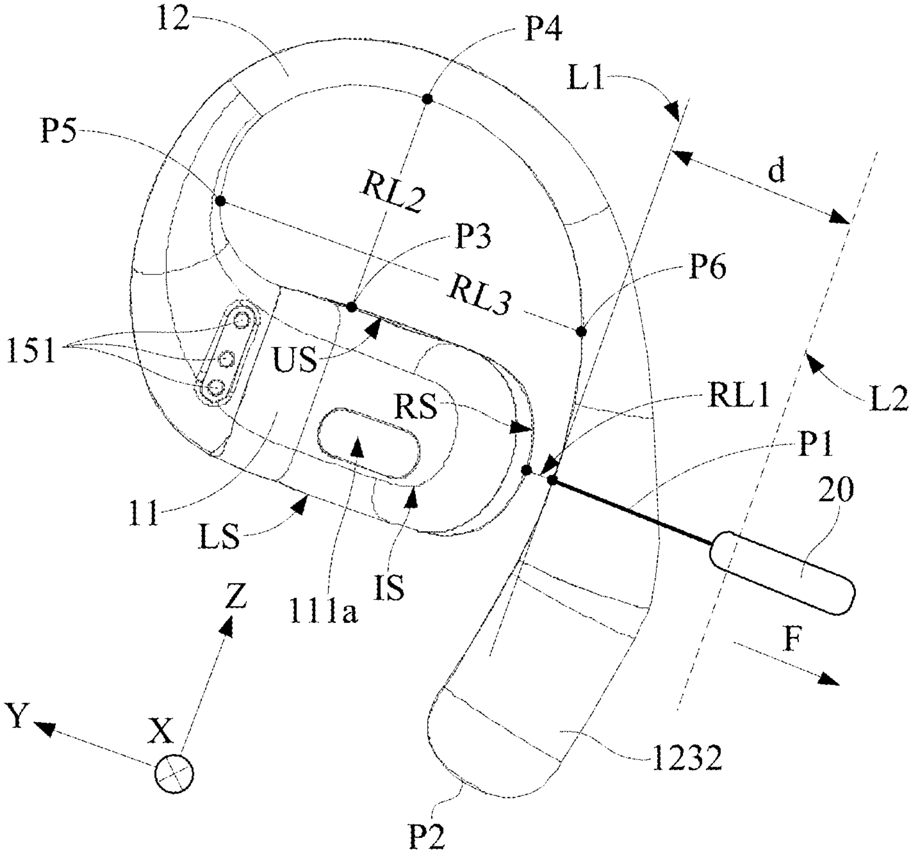
FIG. 20 is a schematic structural diagram illustrating an exemplary earphone according to some embodiments of the present disclosure.

In some embodiments, referring to FIG. 20 and FIG. 4, orthographic projections of the hook structure 12 and the core module 11 on a first reference plane (e.g., a YZ plane in FIG. 20) perpendicular to the thickness direction X may not overlap. The thickness direction X is defined as the direction in which the core module 11 is close to or away from the ear in the wearing state, so as to allow the earphone 10 to clamp the ear from the front and rear directions of the ear region. A first reference line segment RL1 with the shortest length may be provided between the orthographic projection of the hook structure 12 and the orthographic projection of the core module 11. It should be noted that the orthographic projection of the core module 11 on the reference plane perpendicular to the thickness direction X may be a rounded rectangle or an ellipse, or a circle or a rounded square. In some embodiments, after the core module 11 is fixed, the hook structure 12 may have a tension force in a range of 0.6 N-8 N after being pulled apart by a distance in a range of 5 mm-10 mm with respect to the core module 11 at a measurement fixed position P1 along a direction (e.g., as shown by an arrow F in FIG. 20) that is parallel to the first reference line segment RL1 and away from the core module 11. The measurement fixed position P1 may be defined as a position 16 mm-27 mm away from the free end (e.g., as shown by P2 in FIG. 20) of the hook structure 12 that is not connected to the core module 11 in the length direction (e.g., as shown by an arrow L in FIG. 9, which is not repeated hereinafter) of the hook structure 12. In some embodiments, after the core module 11 is fixed, the hook structure 12 may have a tension force in a range of 0.8 N-5 N after being pulled apart by the distance in the range of 5 mm-10 mm with respect to the core module 11 at the measurement fixed position P1 in the direction that is parallel to the first reference line segment RL1 and away from the core module 11.

In some embodiments, after the core module 11 is fixed, the hook structure 12 may have a tension force in a range of 0.1 N-1.96 N after being pulled apart by a distance in a range of 1 mm-5 mm with respect to the core module 11 at the measurement fixed position P1 in the direction that is parallel to the first reference line segment RL1 and away from the core module 11.

In some embodiments, in a non-wearing state, the earphone 10 may be fixed on a measurement platform. For example, the core module 11 may be fixed on a fixture of the measurement platform. In this case, the first reference line segment RL1 may be parallel to a horizontal plane, and the hook structure 12 may be in a suspended state. Accordingly, a dynamometer 20 may be fixed on the hook structure 12. For example, a hook of the dynamometer 20 may be hooked or sleeved on the measurement fixed position P1, and the measurement fixed position P1 may be shown as a straight line segment in FIG. 20. Subsequently, the measurement personnel may manually and slowly pull the dynamometer 20 (e.g., a displacement of the dynamometer 20 may be d), and the hook structure 12 may also correspondingly deform from an initial position L1 to a measurement position L2, and a tension force F under the displacement may be recorded. Accordingly, at the same measurement fixed position P1, by multiple measurements, the dynamometer 20 may produce different displacements, and the tension force F corresponding to each of the displacements may be recorded, thereby reflecting the deformation capacity of the hook structure 12 relative to the core module 11, and further representing the clamping force that the earphone 10 can apply to the ear. In some embodiments, the dynamometer 20 may also be regarded as a portion of the measurement platform. The measurement platform may make the hook structure 12 away from the core module 11 after the earphone 10 is fixed, i.e., perform automatic measurement.

In some embodiments, in the non-wearing state, the core module 11 may be pressed on an edge of a table, and the hook structure 12 may be maintained suspended as much as possible. Similarly, the hook of the dynamometer 20 may be hooked or sleeved on the measurement fixed position P1, and the measurement may be performed as described above, which is not repeated here.

The following table gives an exemplary description of a corresponding relationship between the tension force F and the distance d at different measurement fixed positions P1. The unit of the tension force F is denoted as N, and the unit of the distance d is denoted as mm. Further, in the following table, #1, #2, and #3 respectively represent the measurement fixed positions P1, which are 16 mm, 21.5 mm, and 27 mm away from the free end of the hook structure 12 that is not connected with the core module 11 in the length direction of the hook structure 12, respectively. It should be noted that in order to reduce the measurement error, each tension force F may be averaged after multiple measurements. For example, the average value may be taken after three measurements.

| | d = 1 mm | d = 3 mm | d = 5 mm | d = 7 mm | d = 10 mm |
|---|---|---|---|---|---|
| #1 | 0.1N | 0.3N | 0.6N | 0.87N | 2.5N |

-continued

| | d = 1 mm | d = 3 mm | d = 5 mm | d = 7 mm | d = 10 mm |
|---|---|---|---|---|---|
| #2 | 0.23N | 0.41N | 0.82N | 1.73N | 5N |
| #3 | 0.3N | 0.89N | 1.96N | 3.82N | 8N |

In some embodiments, a length of the first reference line segment RL1 may be in a range of 2 mm-3 mm. If the length of the first reference line segment RL1 is too small, the earphone 10 may be uncomfortable to wear; and if the length of the first reference line segment RL1 is too large, the earphone 10 may be unstable to wear.

In some embodiments, a spacing between the measurement fixed position P1 and the first reference line segment RL1 may be less than or equal to 1 mm, so as to allow the measurement fixed position P1 to be as close as possible to a preset position of the hook structure 12 that contacts the ear.

Figure 21:
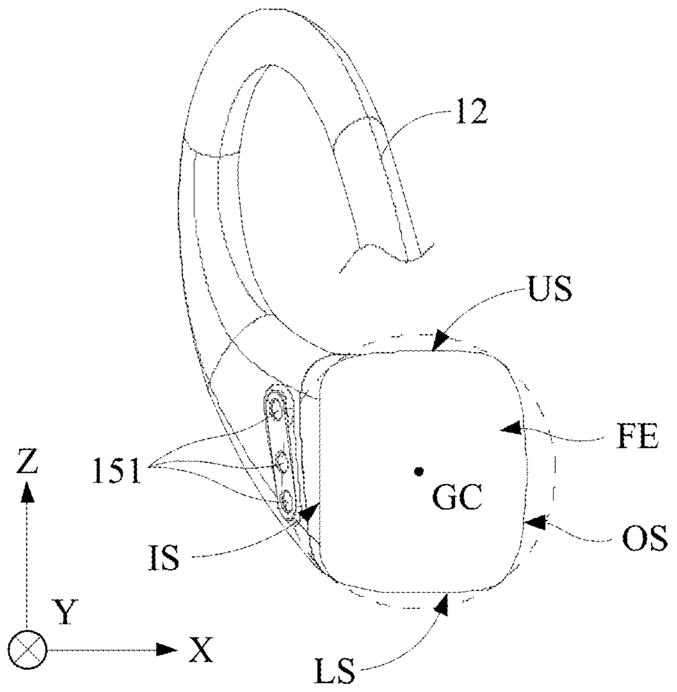
FIG. 21 is a schematic structural diagram illustrating an exemplary earphone according to some embodiments of the present disclosure.

In some embodiments, the core module 11 may have the length direction Y and the width direction Z that are perpendicular to the thickness direction X and orthogonal to each other. The length of the core module 11 in the length direction Y may be greater than the width of the core module 11 in the width direction Z. In some embodiments, referring to FIG. 21 and FIG. 20, an orthographic projection of the free end FE of the core module 11 on a second reference plane that is perpendicular to the length direction Y (e.g., an XZ plane in FIG. 21) may have a geometric center GC. For example, the geometric center may be a center of a circumscribed circle of the orthographic projection. A spacing between the measurement fixed position P1 and an extension line passing through the geometric center GC and parallel to the first reference line segment RL1 may be less than or equal to 1 mm. Such configuration may allow the measurement fixed position P1 to be as close as possible to the preset position of the hook structure 12 that contacts the ear. For example, the core module 11 may have the inner side surface IS toward the ear and the outer side surface OS away from the ear along the thickness direction X in the wearing state, and the upper side surface US away from the external ear canal of the ear and the lower side surface LS toward the external ear canal along the width direction Z. The inner side surface IS, the outer side surface OS, the upper side surface US, and the lower side surface LS may form a geometric figure on the second reference plane. The geometric center GC may be defined as the center of the circumscribed circle of the geometric figure.

In some embodiments, referring to FIG. 20, the core module 11 may have the length direction Y and the width direction Z that are perpendicular to the thickness direction X and orthogonal to each other. The length of the core module 11 in the length direction Y may be greater than the width of the core module 11 in the width direction Z. The core module 11 may have the upper side surface US away from the external ear canal of the ear along the width direction Z in the wearing state and the lower side surface LS toward the external ear canal. In some embodiments, the second reference line segment RL2 with the longest length parallel to the width direction Z may be provided between the orthographic projection of the hook structure 12 and the orthographic projection of the core module 11. A length of the second reference line segment RL2 may be in a range of 13 mm-20 mm. If the length of the second reference line segment RL2 is too small, the free end FE of the core module 11 may be unable to extend into the cavity of auricular concha, and the sound outlet hole 111*a* disposed on the core module 11 may be too far away from the external ear canal. If the length of the second reference line segment RL2 is too large, the free end FE may be unable to extend into the cavity of auricular concha, and the external ear canal may be excessively blocked by the core module 11. In other words, such configuration may allow the free end FE of the core module 11 to extend into the cavity of auricular concha, and the sound outlet hole 111*a* disposed on the core module 11 may have a suitable distance from the external ear canal, such that the user can receive more sound waves generated by the core module 11 without blocking the external ear canal.

In some embodiments, a direction of the first reference line segment RL1 may be parallel to the length direction Y. In other words, when an orthographic projection of the core module 11 on a reference plane perpendicular to the thickness direction X is set to a rounded rectangle, a spacing between the orthographic projection of the hook structure 12 and the orthographic projection of the core module 11 in the length direction Y may be minimum.

In some embodiments, a point P3 where the second reference line segment RL2 intersects with the orthographic projection of the core module 11 may be regarded as a starting point of the second reference line segment RL2, and a point P4 where the second reference line segment RL2 intersects with the orthographic projection of the hook structure 12 may be regarded as an end point of the second reference line segment RL2. The third reference line segment RL3 passing through ¼ of the second reference line segment RL2 and parallel to the length direction Y may intersect with the hook structure 12 at a first intersection point P5 and a second intersection point P6. The first intersection point P5 may be closer to the core module 11 than the second intersection point P6 in the length direction of the hook structure 12. In some embodiments, a distance between the first intersection point P5 and the starting point of the second reference line segment RL2 may be in a range of 9 mm-15 mm, and a distance between the second intersection point P6 and the starting point of the second reference line segment RL2 may be in a range of 12 mm-19 mm. With such configuration, when the free end FE of the core module 11 extends into the cavity of auricular concha and the sound outlet 111*a* disposed on the core module 11 has a suitable distance from the external ear canal, the hook structure 12 and the core module 11 may apply a suitable clamping force on the ear.

In some embodiments, referring to FIG. 20 and FIG. 9, the hook structure 12 may include the elastic metal wire 121 connected with the core module 11 and the battery housing 123 connected with one end of the elastic metal wire 121 away from the core module 11. The battery 14 coupled with the core module 11 may be disposed in the battery housing 123. An extension line of the first reference line segment RL1 may pass through the battery housing 123. In this way, since a portion of the hook structure 12 corresponding to the battery housing 123 is thicker than a portion of the hook structure 12 corresponding to the elastic metal wire 121, the hook structure 12 may clamp the ear together with the core module 11 and the battery housing 123, thereby improving the wearing comfort of the earphone 10. The elastic metal wire 121 may undergo a certain elastic deformation relative to the core module 11 in a direction perpendicular to the thickness direction X, so as to provide a corresponding clamping force. It should be noted that when the hook structure 12 includes a coating such as the flexible coating 128, structural components such as the elastic metal wire 121, the adapter housing 122, and the cover housing 1231 shown in FIG. 9 are not visible in FIG. 20.

In some embodiments, the battery housing 123 may include the cover housing 1231 connected with the elastic metal wire 121 and the battery compartment 1232 connected with the cover housing 1231. The battery compartment 1232 may cooperate with the cover housing 1231 to form a cavity structure for accommodating the battery 14. The hook structure 12 may include the flexible coating 128 that at least covers the elastic metal wire 121 and the cover housing 1231. The hardness of the flexible coating 128 may be less than a hardness of the cover housing 1231. In some embodiments, the extension line of the first reference line segment RL1 may pass through a section where the flexible coating 128 overlaps with the cover housing 1231. In this way, the hook structure 12 may further clamp the ear together with the core module 11 through the flexible coating 128 disposed on the cover housing 1231, thereby further improving the wearing comfort of the earphone 10.

In some embodiments, one end of the battery compartment 1232 in the length direction of the hook structure 12 may has an open end, and the cover housing 1231 may be partially embedded in the open end of the battery compartment 1232. An area of an outer surface of the cover housing 1231 on a reference cross-section perpendicular to the length direction of the hook structure 12 may be less than an area of an outer surface of the battery compartment 1232 on the reference cross-section perpendicular to the length direction of the hook structure 12, i.e., an outer diameter of the cover housing 1231 may be less than an outer diameter of the battery compartment 1232. In some embodiments, the flexible coating 128 may not cover the battery compartment 1232, and each of the outer surface of the flexible coating 128 and the outer surface of the battery compartment 1232 may have a smooth transition to improve the appearance quality of the earphone 10 in a non-wearing state. In this case, the measurement fixed position P1 may be located at a junction between the flexible coating 128 and the battery compartment 1232. Such configuration may allow the measurement fixed position P1 to be as close as possible to a preset position of the hook structure 12 that contacts the ear.

In some embodiments, referring to FIG. 3 and FIG. 9, the earphone 10 may include the core module 11 and the hook structure 12 connected with the core module 11. The hook structure 12 may include the battery housing 123. The battery 14 coupled with the core module 11 may be disposed in the battery housing 123. The core module 11 may be located on a front side of an ear in a wearing state, and the free end FE of the core module 11 that is not connected with the hook structure 12 may extend into the cavity of auricular concha of the ear in the wearing state. At least a portion of the hook structure 12 may be located at a rear side of the ear in the wearing state. In some embodiments, the core module 11 and the battery housing 123 may jointly clamp an ear region from the front and rear sides of the ear region corresponding to the cavity of auricular concha, so as to allow the earphone 10 to be stably and comfortably worn on the ear. The battery housing 123 may also contact the head skin outside the ear, thereby increasing the contact area between the battery housing 123 and the user's skin. When the user wears the earphone 10 stably and comfortably, the user is aware of wearing the earphone 10, providing the user with a sense of stability, and improving the wearing experience for the user. In addition, since the contact area between the earphone 10 and the user's skin is increased, the risk of the earphone 10 slipping off the ear when the user lowers, raises, or shakes the head can be reduced.

In some embodiments, the maximum area of an outer surface of the battery housing 123 on a reference cross-section perpendicular to the length direction of the hook structure 12 may be in a range of 60 $mm^2$-100 $mm^2$. If the maximum area is too small, the battery housing 123 may be difficult to contact the head skin outside the ear, and the capacity of the battery 14 is insufficient to meet the endurance requirements of the earphone 10; and if the maximum area is too large, the battery housing 123 may be seen too much from the front side of the ear, which affects the appearance quality of the earphone 10 in the wearing state.

In some embodiments, referring to FIG. 9, the battery housing 123 may include the cover housing 1231 and the battery compartment 1232 connected with the cover housing 1231. One end of the battery compartment 1232 in the length direction of the hook structure 12 may has an open end, and the cover housing 1231 may be partially embedded in the open end of the battery compartment 1232 to cooperate with the battery compartment to form a cavity structure for accommodating the battery 14. An area of an outer surface of the cover housing 1231 on the reference cross-section perpendicular to the length direction of the hook structure 12 may gradually increase in a positive direction which is along the length direction of the hook structure 12 and points from the cover housing 1231 to the battery compartment 1232, i.e., the hook structure 12 may be set to a tapered structure at the cover housing 1231, thereby alleviating an outer diameter difference between the battery compartment 1232 and other parts (e.g., the elastic metal wire 121) of the hook structure 12, such that the hook structure 12 may be smoother and more symmetrical in overall appearance. In some embodiments, the cover housing 1231 may contact the ear region to clamp the ear with the core module 11. The battery compartment 1232 may contact the head skin outside the ear to increase the contact area between the battery housing 123 and the user's skin. In other words, different parts of the battery housing 123 contact the skin at different physiological positions.

In some embodiments, a contact area between the cover housing 1231 and the head skin around the ear may be less than a contact area between the battery compartment 1232 and the head skin around the ear, such that when the cover housing 1231 and the core module 11 clamp the ear, the cover housing 1231 does not need to consider the contact between the battery housing 123 and the head skin around the ear. In other words, different portions of the battery housing 123 may have different set intentions. Accordingly, the cover housing 1231 may not contact the head skin around the ear.

In some embodiments, the hook structure 12 may include the elastic metal wire 121 configured to connect the core module 11 and the cover housing 1231 and the flexible coating 128 covering at least the elastic metal wire 121 and the cover housing 1231. The cover housing 1231 may contact the ear region through the flexible coating 128 to improve the wearing comfort of the earphone 10. The flexible coating 128 may not cover the battery compartment 1232, which reduces the risk of the hook structure 12 being too thick at the battery compartment 1232 and being exposed too much from the front side of the ear, thereby improving the appearance quality of the earphone 10 in the wearing state. In some embodiments, the outer surface of the flexible coating 128 may be smoothly transitioned to the outer surface of the battery compartment 1232 to improve the appearance quality of the earphone 10 in the non-wearing state.

In some embodiments, the core module 11 may have the inner side surface IS toward the ear and the outer side surface OS away from the ear along the thickness direction X in the wearing state. The thickness direction X is defined as a direction in which the core module 11 is close to or away from the ear in the wearing state. In the non-wearing state, at least a portion of the battery housing 123 may be located between the inner side surface IS and the outer side surface OS in the thickness direction X, such that a clamping force of the earphone 10 on the ear is mainly manifested as a positive pressure, which improves the wearing comfort of the earphone 10. In some embodiments, the core module 11 may have the length direction Y and the width direction Z which are perpendicular to the thickness direction X and orthogonal to each other. The length of the core module 11 in the length direction Y may be greater than the width of the core module 11 in the width direction Z. An orthographic projection of the cover housing 1231 along the length direction Y may at least partially overlap with an orthographic projection of the core module 11 along the length direction Y, and an orthographic projection of the battery compartment 1232 along the length direction Y may at least partially not overlap with an orthographic projection of the core module 11 along the length direction Y, so as to allow the hook structure 12 to mainly clamp the ear together with the core module 11 at the cover housing 1231.

Figure 22:
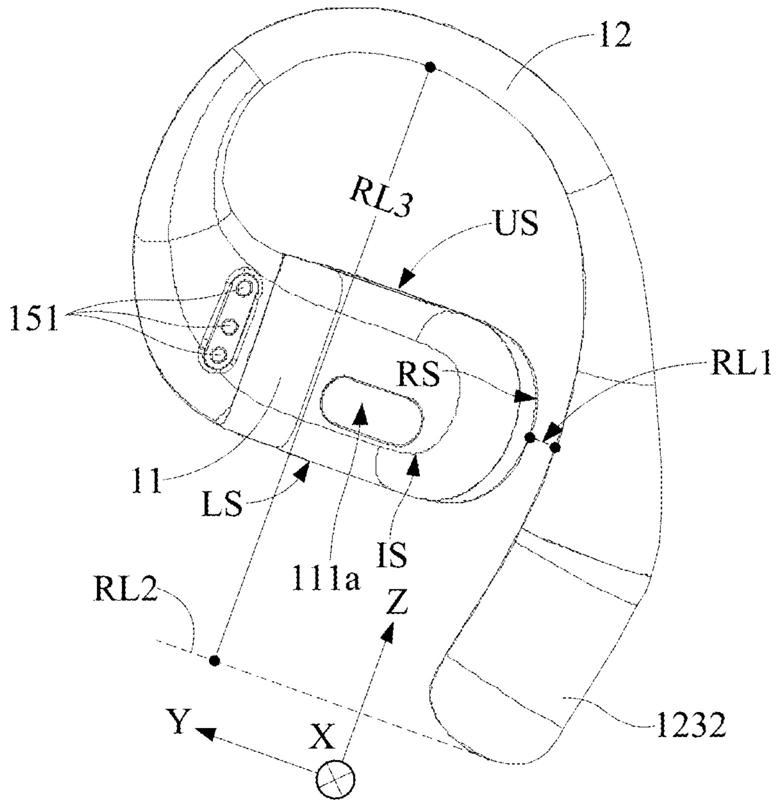
FIG. 22 is a schematic structural diagram illustrating an exemplary earphone according to some embodiments of the present disclosure.

In some embodiments, referring to FIGS. 22, 9 and 3, the earphone 10 may include the core module 11 and the hook structure 12 connected with the core module 11. The core module 11 may be disposed on the front side of the ear in the wearing state. At least a portion of the hook structure 12 may be disposed on the rear side of the ear in the wearing state. Orthographic projections of the hook structure 12 and the core module 11 on a reference plane (e.g., a YZ plane in FIG. 22) perpendicular to the thickness direction X may not overlap. The thickness direction X is defined as a direction in which the core module 11 is close to or away from the ear in the wearing state. In some embodiments, the hook structure 12 may include the battery housing 123 and the flexible coating 128. The battery 14 coupled with the core module 11 may be disposed in the battery housing 123. The battery housing 123 may include the cover housing 1231 and the battery compartment 1232 connected with the cover housing 1231. The flexible coating 128 may cover the cover housing 1231. A first reference line segment RL1 with the shortest length may be provided between an orthographic projection of the hook structure 12 and an orthographic projection of the core module 11. A point where the first reference line segment RL1 intersects with the orthographic projection of the hook structure 12 may be located in the section where the flexible coating 128 and the cover housing 1231 overlap. In other words, the hook structure 12 may contact the rear side of the ear through the cover housing 1231 and the flexible coating 128 thereon, and then clamp the ear together with the core module 11, thereby improving the wearing comfort of the earphone 10. It should be noted that the orthographic projection of the core module 11 on the reference plane that is perpendicular to the thickness direction X may be a rounded rectangle or an ellipse, or a circle or a rounded square.

In some embodiments, in the wearing state, a clamping force applied by the hook structure 12 and the core module 11 on the ear in the thickness direction X (e.g., the earphone 10 clamps the ear from left and right directions of the head) may serve as a portion of the clamping force of the earphone 10 on the ear.

In some embodiments, in the wearing state, a clamping force applied by the hook structure 12 and the core module 11 on the ear in the direction that is perpendicular to the thickness direction X (e.g., the earphone 10 clamps the ear from front and rear directions of the head) may serve as a portion of the clamping force of the earphone 10 on the ear.

In some embodiments, in a non-wearing state, the earphone 10 may have a second reference line RL2 parallel to the first reference line segment RL1 on the reference plane (e.g., the YZ plane in FIG. 22) perpendicular to the thickness direction X. The second reference line RL2 may intersect with an orthographic projection of the battery housing 123 and may be farthest away from the first reference line segment RL1. Accordingly, an edge of one side of the orthographic projection of the hook structure 12 toward the core module 11 may have a maximum distance to the second reference line RL2, such as a length of a third reference line segment RL3 in FIG. 22. The maximum distance may be in a range of 34 mm-52 mm. If the maximum distance is too small, the capacity of the battery 14 may be insufficient to meet the endurance requirements of the earphone 10; if the maximum distance is too large, the hook structure 12 may be seen too much from the front side of the ear due to the battery housing 123 being too long, which affects the appearance quality of the earphone 10 in the wearing state, and the hook structure 12 may interfere with an earlobe or earrings worn by the user on the ear (especially for female users), which affects the use experience of the user.

In some embodiments, in the wearing state, a distance (e.g., as shown by V1 in FIG. 3) between a free end of the hook structure 12 that is not connected with the core module 11 and an upper ear root of the ear on a vertical axis of a human body may be in a range of 37 mm-56 mm. If the distance is too small, the capacity of the battery 14 may be insufficient to meet the battery life requirements of the earphone 10; if the distance is too large, the hook structure 12 may be seen too much from the front side of the ear due to the battery housing 123 being too long, which affects the appearance quality of the earphone 10 in the wearing state, and the hook structure 12 may interfere with the earlobe or the earrings worn by the user on the ear (especially for female users), which affects the use experience of the user.

In some embodiments, in the wearing state, a distance (e.g., as shown by V2 in FIG. 3) between the free end of the hook structure 12 that is not connected with the core module 11 and an edge of the earlobe on the vertical axis of the human body may be less than or equal to 10 mm. If the distance is too large, the capacity of the battery 14 may be insufficient to meet the endurance requirements of the earphone 10.

In some embodiments, a length of the battery compartment 1232 in the length direction of the hook structure 12 may be in a range of 10 mm-20 mm. Such configuration may realize both the battery life of the earphone 10 and the appearance quality in the wearing state.

In some embodiments, the battery compartment 1232 may be provided in a hollow cylindrical shape, and an area of an outer surface of the battery compartment 1232 on a reference cross-section perpendicular to the length direction of the hook structure 12 may be in a range of 60 $mm^2$ and 100 $mm^2$. If the area is too small, the capacity of the battery 14 may be insufficient to meet the endurance requirements of the earphone 10; if the area is too large, the battery housing 123 may be seen too much from the front side of the ear, which affects the appearance quality of the earphone 10 in the wearing state.

In some embodiments, referring to FIG. 3 and FIG. 1, the earphone 10 may include the core module 11 and the hook structure 12 connected with the core module 11. The core module 11 may be disposed on the front side of the ear in the wearing state, and the free end FE of the core module 11 that is not connected with the hook structure 12 may extend into the cavity of auricular concha of the ear in the wearing state. At least a portion of the hook structure 12 may be disposed at the rear side of the ear in the wearing state. The core module 11 may have the thickness direction X, the length direction Y, and the width direction Z that are orthogonal to each other. The thickness direction X is defined as a direction in which the core module 11 is close to or away from the ear in the wearing state, and the length of the core module 11 in the length direction Y may be greater than the width of the core module 11 in the width direction Z. In some embodiments, the length (e.g., as shown by L in FIG. 3) of the core module 11 in the length direction Y may be in a range of 22 mm-35 mm. If the length of the core module 11 is too small, the free end FE of the core module 11 may be difficult to extend into the cavity of auricular concha, and may also be difficult to further clamp the ear with the hook structure 12; if the length of the core module 11 is too large, the free end FE of the core module 11 may be difficult to extend into the cavity of auricular concha, which even affects the wearing of the earphone 10. In some embodiments, the hook structure 12 may include a transition portion 12*a* connected with the core module 11. The transition portion 12*a* may be disposed on the front side of the ear in the wearing state. An area of an outer surface of the transition portion 12*a* on a reference cross-section perpendicular to the length direction of the hook structure 12 may gradually decrease in a positive direction that is along the length direction of the hook structure 12 and points away from the core module 11, i.e., the transition portion 12*a* may be set as a tapered structure, such that the earphone 10 may be smoother and more symmetrical in overall appearance. Accordingly, in the wearing state and viewed along a direction of the coronal axis of the human body, compared with the free end FE of the core module 11 that is not connected with the hook structure 12, the connection end CE of the core module 11 connected with the hook structure 12 may be closer to the top of the head of the user. An angle (e.g., as shown by θ in FIG. 3) between the length direction Y and a direction of the sagittal axis of the human body may be in a range of 15°-60°, such that the transition portion 12*a* may pass over a concave region 109 between the helix and the tragus of the ear as much as possible, which reduces the risk of the transition portion 12*a* interfering too much with the skin of the user, thereby improving the wearing comfort of the earphone 10.

In some embodiments, as shown in FIG. 7, the hook structure 12 and the core module 11 may be plugged and fixed in a direction perpendicular to the width direction Z. Accordingly, the length of the core module 11 in the length direction Y may be measured after the core module 11 and the hook structure 12 are disassembled.

In some embodiments, the width (e.g., as shown by W in FIG. 3) of the core module 11 in the width direction Z may be in a range of 10 mm-16 mm. If the width of the core module 11 is too small, a contact area between the core module 11 and the ear may be too small, which may cause wearing discomfort; if the width of the core module 11 is too large, the core module 11 may block the external ear canal too much.

Figure 23:
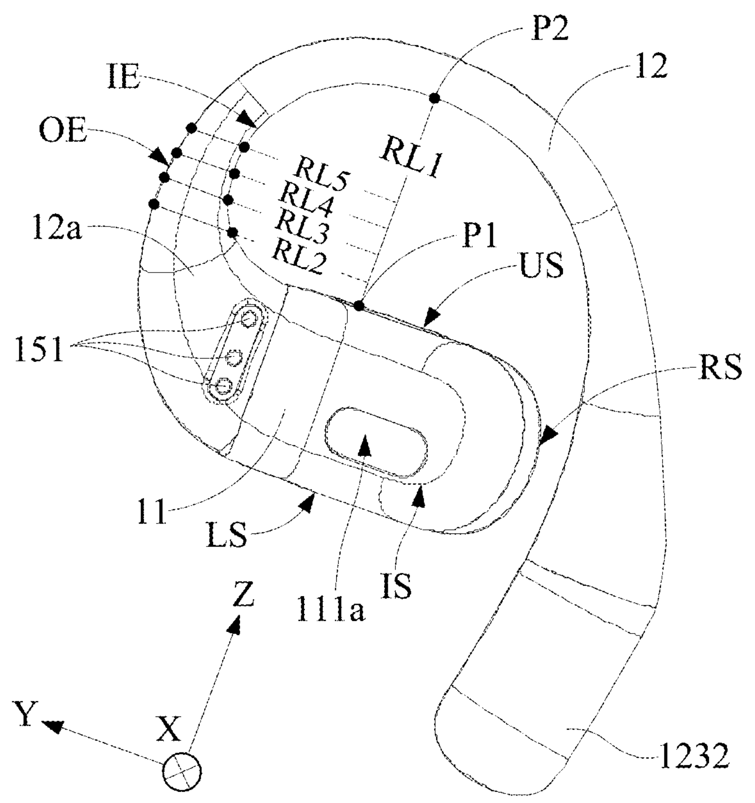
FIG. 23 is a schematic structural diagram illustrating an exemplary earphone according to some embodiments of the present disclosure.

In some embodiments, referring to FIG. 23, a first reference line segment RL1 which is parallel to the width direction Z and has the longest length is disposed between an edge of one side of an orthographic projection of the hook structure 12 on a reference plane (e.g., a YZ plane in FIG. 23) that is perpendicular to the thickness direction X and is toward the core module 11 and an orthographic projection of the core module 11 on the same reference plane. A point P1 where the first reference line segment RL1 intersects with the orthographic projection of the core module 11 may be regarded as a starting point of the first reference line segment RL1, and a point P2 where the first reference line segment RL1 intersects with the orthographic projection of the hook structure 12 may be regarded as an end point of the first reference line segment RL1. In some embodiments, an orthographic projection of the transition portion 12*a* may have an inner edge IE and an outer edge OE that are respectively a continuous arc transition. The outer edge OE may be farther away from the first reference line segment RL1 than the inner edge IE in the length direction Y. An overall curvature of the inner edge IE may be greater than an overall curvature of the outer edge OE, such that the transition portion 12*a* may be smoother and more symmetrical in overall appearance.

In some embodiments, the orthographic projection of the transition portion 12*a* may have a second reference line segment RL2, a third reference line segment RL3, a fourth reference line segment RL4, and a fifth reference line segment RL5 which are parallel to the length direction Y and spaced in sequence. The second reference line segment RL2, the third reference line segment RL3, the fourth reference line segment RL4, and the fifth reference line segment RL5 may be successively farther away from the orthographic projection of the core module 11 in the width direction Z. In some embodiments, the starting point and the end point of each of the second reference line segment RL2, the third reference line segment RL3, the fourth reference line segment RL4, and the fifth reference line segment RL5 may fall on the inner edge IE and the outer edge OE, respectively. The length of the second reference line segment RL2 may be in a range of 5 mm-8 mm, and an extension line of the second reference line segment RL2 may pass through ⅛ of the first reference line segment RL1. The length of the third reference line segment RL3 may be in a range of 4 mm-6.3 mm, and an extension line of the third reference line segment RL3 may pass through ¼ of the first reference line segment RL1. The length of the fourth reference line segment RL4 may be in a range of 3.5 mm-5.4 mm, and an extension line of the fourth reference line segment RL4 may pass through ⅜ of the first reference line segment RL1. The length of the fifth reference line segment RL5 may be in a range of 3 mm-5 mm, and an extension line of the fifth reference line segment RL5 may pass through ½ of the first reference line segment RL1.

In some embodiments, the length of the first reference line segment RL1 may be in a range of 13 mm-20 mm. If the length of the first reference line segment RL1 is too small, the free end FE of the core module 11 may be unable to extend into the cavity of auricular concha, and the sound outlet hole 111*a* disposed on the core module 11 may be too far away from the external ear canal. If the length of the first reference line segment RL1 is too large, the free end FE may be unable to extend into the cavity of auricular concha, and the external ear canal may be excessively blocked by the core module 11. In other words, such configuration may allow the free end FE of the core module 11 to extend into the cavity of auricular concha and the sound outlet hole 111*a* disposed on the core module 11 may have a suitable distance from the external ear canal, such that a user can receive more sound waves generated by the core module 11 without blocking the external ear canal.

In some embodiments, the hook structure 12 may include the adapter housing 122 connected with the core module 11 and the elastic metal wire 121 connected with the adapter housing 122. At least a portion of the adapter housing 122 may be disposed on the front side of the ear in the wearing state, and at least a portion of the elastic metal wire 121 may be disposed on the rear side of the ear in the wearing state. In other words, the portion of the adapter housing 122 disposed on the front side of the ear in the wearing state may be regarded as a portion of the transition portion 12*a* or the entirety of the transition portion 12*a*. The core module 11 may have the inner side surface IS toward the ear along the thickness direction X and the outer side surface OS away from the ear in the wearing state. An area of an outer surface of the adapter housing 122 on a reference cross-section perpendicular to the length direction of the hook structure 12 may gradually decrease in a positive direction that is along the length direction of the hook structure 12 and points away from the core module 11, so as to allow the transition portion 12*a* to be set as a tapered structure. In some embodiments, the adapter housing 122 may extend to a side of the inner side surface IS away from the outer side surface OS in the thickness direction X, so as to allow a portion of the hook structure 12 to be staggered with a projection of the core module 11 in a direction perpendicular to the thickness direction X, and thus in the wearing state, the upper ear root of the ear may provide a less supporting force to the earphone 10. A plane where the elastic metal wire 121 is located and the inner side surface IS may intersect in a non-wearing state, so as to allow a portion of the hook structure 12 to overlap with the projection of the core module 11 in the direction perpendicular to the thickness direction X, and thus in the wearing state, the elastic metal wire 121 may clamp the ear and adhere to the ear together with the core module 11 due to elastic deformation.

In some embodiments, referring to FIG. 7 and FIG. 3, the earphone 10 may include the core module 11 and the hook structure 12 connected with the core module 11. The core module 11 may be disposed on the front side of the ear in the wearing state, and the free end FE of the core module 11 that is not connected with the hook structure 12 may extend into the cavity of auricular concha of the ear in the wearing state. At least a portion of the hook structure 12 may be located on the rear side of the ear in the wearing state. The core module 11 may have a first inner side surface IS1 toward the ear along the thickness direction X in the wearing state and an outer side surface OS away from the ear. The thickness direction X is defined as the direction in which the core module 11 is close to or away from the ear in the wearing state. The hook structure 12 may have a transition portion 12*a* connected with the core module 11. The transition portion 12*a* may be disposed on the front side of the ear in the wearing state, and may have a second inner side surface IS2 toward the ear along the thickness direction X in the wearing state. In some embodiments, the first inner side surface IS1 may cover at least a portion of the tragus of the ear in the wearing state. The second inner side surface IS2 may be bent relative to the first inner side surface IS1 in the thickness direction X and toward a direction away from the outer side surface OS. For example, a portion of the hook structure 12 disposed on the front side of the ear in the wearing state may be bent relative to the core module 11. In this way, even if the earphone 10 needs to cross the tragus, a space for accommodating the tragus may be formed between the hook structure 12 and the core module 11, i.e., the earphone 10 may avoid the tragus, which reduces the risk of the earphone 10 pressing the tragus, thereby improving the comfort of the earphone 10 in the wearing state.

In some embodiments, an angle between the second inner side surface IS2 and the first inner side surface IS1 may be in a range of 119°-170°. If the angle is too small, the original intention of the earphone 10 to avoid the tragus may be violated; if the angle is too large, the fit degree between the earphone 10 and the skin of the user in the wearing state may be reduced.

In some embodiments, a distance between an end of the second inner side surface IS2 that is away from the core module 11 and the first inner side surface IS1 in the thickness direction X may be in a range of 1.6 mm-2.4 mm. If the distance is too small, the original intention of the earphone 10 to avoid the tragus may be violated; if the angle is too large, the fit between the earphone 10 and the skin of the user in the wearing state may be reduced.

In some embodiments, the transition portion 12*a* may include the adapter housing 122 connected with the core module 11. At least a portion of the adapter housing 122 may be disposed on the front side of the ear in the wearing state. In other words, the portion of the adapter housing 122 located on the front side of the ear in the wearing state may be regarded as a portion of the transition portion 12*a* or the entirety of the transition portion 12*a*. The adapter housing 122 may be configured as a tapered structure. For example, an area of an outer surface of the adapter housing 122 on a reference cross-section perpendicular to the length direction of the hook structure 12 may gradually decrease in a positive direction that is along the length direction of the hook structure 12 and points away from the core module 11. With such configuration, the transition portion 12*a* may also be configured as a tapered structure to make the earphone 10 smoother and more symmetrical in overall appearance.

In some embodiments, the adapter housing 122 may extend toward a side of the first inner side surface IS1 away from the outer side surface OS in the thickness direction X, so as to allow the earphone 10 to avoid the tragus in the wearing state, and allow a portion of the hook structure 12 to be staggered with a projection of the core module 11 in a direction that is perpendicular to the thickness direction X, such that in the wearing state, the upper ear root of the ear may provide a less supporting force to the earphone 10.

In some embodiments, in the non-wearing state, the elastic metal wire 121 may pass through a plane where the first inner side surface IS1 is located to allow a portion of the hook structure 12 to overlap with the projection of the core module 11 in the direction perpendicular to the thickness direction X, and then in the wearing state, the elastic metal wire 121 may clamp the ear and adhere to the ear together with the core module 11 due to elastic deformation.

In some embodiments, in the non-wearing state, the plane where the elastic metal wire 121 is located may intersect with the first inner side surface IS1, so as to allow a portion of the hook structure 12 to overlap with the projection of the core module 11 in the direction perpendicular to the thickness direction X, and then in the wearing state, the elastic metal wire 121 may clamp the ear and adhere to the ear together with the core module 11 due to elastic deformation. In the non-wearing state, an angle between the elastic metal wire 121 and the first inner side surface IS1 may be in a range of 15°-30°.

In some embodiments, the core housing 111 may include the core inner housing 1111 and the core outer housing 1112 connected with the core inner housing 1111. For example, the core inner housing 1111 and the core outer housing 1112 may be buckled in the thickness direction X. The core inner housing 1111 may be closer to the ear than the core outer housing 1112 in the wearing state, and the sound outlet 111*a* may be provided on the core inner housing 1111. In some embodiments, at least one of the core inner housing 1111 and the core outer housing 1112 may be plugged with the adapter housing 122 for fixation. For example, the core inner housing 1111 and the adapter housing 122 shown in FIG. 7 may be plugged for fixation.

In some embodiments, the core housing 111 may include the core inner housing 1111 and the core outer housing 1112 connected with the core inner housing 1111. For example, the core inner housing 1111 and the core outer housing 1112 may be buckled in the thickness direction X. The core inner housing 1111 may be closer to the ear than the core outer housing 1112 in the wearing state. The sound outlet 111*a* may be provided on the core inner housing 1111. In some embodiments, one of the core inner housing 1111 and the core outer housing 1112 may be provided as an integrally formed structural member with the adapter housing 122, and the other of the core inner housing 1111 and the core outer housing 1112 may be fixedly connected with the integrally formed structural member. Accordingly, for the integrally formed structural member, a region corresponding to the loudspeaker 112 may be regarded as the core inner housing 1111, and a region provided in a tapered structure or a region corresponding to the electronic component 15 may be regarded as the adapter housing 122.

In some embodiments, referring to FIG. 7 and FIG. 3, the earphone 10 may include the core module 11 and the hook structure 12 connected with the core module 11. The core module 11 may be located on the front side of the ear in the wearing state. At least a portion of the hook structure 12 may be located at the rear side of the ear in the wearing state. The core module 11 may include the core housing 111 and the loudspeaker 112 disposed in the core housing 111. The hook structure 12 may include the adapter housing 122 that is connected with the core housing 111. At least a portion of the adapter housing 122 may be located on the front side of the ear in the wearing state. In some embodiments, referring to FIG. 24, FIG. 15, and FIG. 16, the adapter housing 122 may form the accommodation cavity 124 and the one or more through holes 1251 communicated with the accommodation cavity 124. The earphone 10 may include the one or more electrode terminals 151 at least partially disposed in the one or more through holes 1251. Since the accommodation cavity 124 is formed in the adapter housing 122, a plurality of components may be accommodated in the accommodation cavity 124, which saves space in the core module 11, and allows the volume of the loudspeaker 112 to be as large as possible. In addition, the electrode terminals 151 may be disposed on the adapter housing 122, which shortens a distance between the electrode terminals 151 and the loudspeaker 112 in the length direction of the hook structure 12, so as to make full use of a magnetic suction force between a magnetic circuit system (including a magnet) of the loudspeaker 112 and a magnetic suction structure in a charging case, such that the electrode terminals 151 can more reliably contact the electrode terminals in the charging case.

In some embodiments, the electrode terminals 151 may face the front side of the ear in the wearing state, such that the electrode terminals 151 may be closer to the loudspeaker 112, which further shortens the distance between the electrode terminals 151 and the loudspeaker 112 in the length direction of the hook structure 12.

In some embodiments, the one or more electrode terminals 151 may include the positive charging terminal 1514 and the negative charging terminal 1515 which are spaced apart from each other. The positive charging terminal 1514 and the negative charging terminal 1515 may be respectively disposed in the respective through holes 1251 to facilitate charging of the earphone 10 through the electrode terminals 151.

In some embodiments, the one or more electrode terminals 151 may include a communication terminal 1516 spaced apart from the positive charging terminal 1514 and the negative charging terminal 1515. The communication terminal 1516 may be correspondingly disposed in the corresponding through hole 1251 to facilitate communication connection between the earphone 10 and the charging device such as the charging case.

Figure 24:
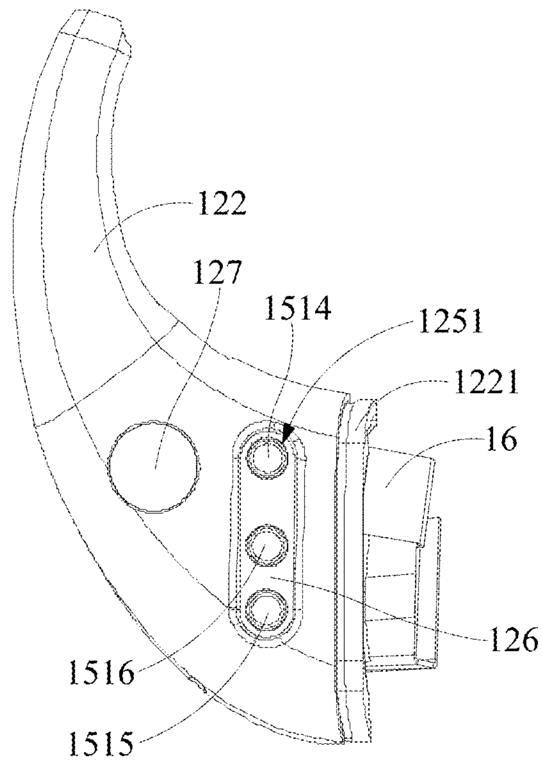
FIG. 24 is a schematic structural diagram illustrating an exemplary hook structure according to some embodiments of the present disclosure.

In some embodiments, referring to FIG. 24, a spacing between the positive charging terminal 1514 and the negative charging terminal 1515 may be greater than a spacing between the positive charging terminal 1514 and the communication terminal 1516, and a spacing between the positive charging terminal 1514 and the communication terminal 1516 may be greater than a spacing between the communication terminal 1516 and the negative charging terminal 1515. The potential of the positive charging terminal 1514 is generally higher than the potential of the communication terminal 1516, and the communication terminal 1516 is generally more easily damaged by a high voltage. In order to avoid or reduce the probability of damage to the communication terminal 1516 due to conduction between the positive charging terminal 1514 and the communication terminal 1516 within a limited space, the spacing between the positive charging terminal 1514 and the communication terminal 1516 may be greater than the spacing between the communication terminal 1516 and the negative charging terminal 1515. In some embodiments, in order to avoid or reduce the probability of damage to the earphone 10 caused by a short circuit between the positive charging terminal 1514 and the negative charging terminal 1515, the spacing between the positive charging terminal 1514 and the negative charging terminal 1515 may be greater than the spacing between the communication terminal 1516 and the negative charging terminal 1515. In some embodiments, the spacing between the positive charging terminal 1514 and the negative charging terminal 1515 may be greater than the spacing between the positive charging terminal 1514 and the communication terminal 1516, such that the electrode terminals 151 may be arranged as concentrated as possible to reduce the space occupied by the electrode terminals 151, the risk of short circuit of the electrode terminals 151 is reduced as much as possible, and the degree of damage to the earphone 10 is minimized.

In some embodiments, when viewed along the extension direction of the electrode terminals 151, a connection line between every two of the positive charging terminal 1514, the negative charging terminal 1515, and the communication terminal 1516 may form an unequal-sided triangle.

In some embodiments, when viewed along the extension direction of the electrode terminals 151, the positive charging terminal 1514, the communication terminal 1516, and the negative charging terminal 1515 may be spaced apart from each other in a straight line segment. When viewed along the extension direction of the electrode terminals 151, the magnet 127 and the core module 11 may be located on both sides of the straight line segment, respectively. In this way, when the earphone 10 is placed in the charging case, the magnetic circuit system of the loudspeaker 112 may form a first magnetic suction pair with a permanent magnet or a soft magnet in the charging case, and the magnet 127 may form a second magnetic suction pair with another permanent magnet or soft magnet in the charging case. Therefore, the electrode terminals 151 may be located between the first magnetic suction pair and the second magnetic suction pair to more reliably contact the electrode terminals in the charging case. In some embodiments, an area of an outer surface of the adapter housing 122 on a reference cross-section perpendicular to the length direction of the hook structure 12 may gradually decrease in a positive direction that is along the length direction of the hook structure 12 and points away from the core module 11, i.e., the adapter housing 122 may be set to a tapered structure to allow the transition portion 12*a* of the hook structure 12 to be set to a tapered structure, such that the overall appearance of the earphone 10 may be smoother and more symmetrical. A center of the magnet 127 may have a first distance, a second distance, and a third distance from a center of the positive charging terminal 1514, a center of the communication terminal 1516, and a center of the negative charging terminal 1515, respectively. The third distance may be greater than the first distance and greater than the second distance, respectively, which reduces the risk of the adapter housing 122 having too small a wall thickness due to the magnet 127 being too close to the negative charging terminal 1515, thereby increasing the structural strength of the adapter housing 122.

In some embodiments, referring to FIG. 7 and FIG. 24, the core housing 111 may have the first inner side surface IS1 toward the ear along the thickness direction X and the outer side surface OS away from the ear in the wearing state. The thickness direction X is defined as a direction in which the core module 11 is close to or away from the ear in the wearing state. The adapter housing 122 may have a second inner side surface (e.g., the second inner side surface IS2 of the transition portion 12*a*) toward the ear along the thickness direction X in the wearing state. The second inner side surface IS2 may be bent relative to the first inner side surface IS 1 in the thickness direction X and toward a direction away from the outer side surface OS. For example, the adapter housing 122 may be bent relative to the core module 11. In some embodiments, the electrode terminals 151 may be exposed on the second inner side surface IS2 to facilitate contact with the electrode terminals in the charging case. The extension direction of the electrode terminals 151 may intersect with a winding direction (e.g., as shown by C1 in FIG. 25) of a coil (i.e., the voice coil described above) of the loudspeaker 112. Such configuration may allow a suction direction of the first magnetic suction pair to intersect with a suction direction of the second magnetic suction pair, which reduces the risk of the earphone 10 shaking in the charging case, and the electrode terminals 151 can more reliably contact the electrode terminals in the charging case.

In some embodiments, the core module 11 may include the main control circuit board 13 disposed in the core housing 111 and coupled with the loudspeaker 112. The main control circuit board 13 and the loudspeaker 112 may be stacked in the thickness direction X and the main control circuit board 13 may be located on a side of the loudspeaker 112 facing the outer side surface OS. In this way, when the size of the core housing 111 on the reference cross-section perpendicular to the thickness direction X is limited, the area of the loudspeaker 112 may be increased, and the loudspeaker 112 is closer to the permanent magnet or the soft magnet in the charging case, such that the suction force of the first magnetic attraction pair can be increased, and the electrode terminals 151 can more reliably contact the electrode terminals in the charging case.

According to the above description, the earphone 10 may include the positive charging terminal 1514, the negative charging terminal 1515, and the communication terminal 1516 which are spaced apart from each other. The positive charging terminal 1514, the negative charging terminal 1515, and the communication terminal 1516 may be located on the same side of the ear in the wearing state. For example, the positive charging terminal 1514, the negative charging terminal 1515, and the communication terminal 1516 may be located on the front side of the ear. A spacing between the positive charging terminal 1514 and the negative charging terminal 1515 may be greater than a spacing between the positive charging terminal 1514 and the communication terminal 1516, and a spacing between the positive charging terminal 1514 and the communication terminal 1516 may be greater than a spacing between the communication terminal 1516 and the negative charging terminal 1515. The potential of the positive charging terminal 1514 is generally higher than the potential of the communication terminal 1516, and the communication terminal 1516 is generally more easily damaged by high voltage. In order to avoid or reduce the probability of damaging the communication terminal 1516 due to the conduction between the positive charging terminal 1514 and the communication terminal 1516 within a limited space, the spacing between the positive charging terminal 1514 and the communication terminal 1516 may be greater than the spacing between the communication terminal 1516 and the negative charging terminal 1515. In addition, in order to avoid or reduce the probability of damaging the earphone 10 due to a short circuit between the positive charging terminal 1514 and the negative charging terminal 1515, the spacing between the positive charging terminal 1514 and the negative charging terminal 1515 may be greater than the spacing between the communication terminal 1516 and the negative charging terminal 1515. In some embodiments, the spacing between the positive charging terminal 1514 and the negative charging terminal 1515 may be greater than the spacing between the positive charging terminal 1514 and the communication terminal 1516, such that the electrode terminals 151 can be arranged as concentrated as possible to reduce the space occupied by the electrode terminals 151, while minimizing the risk of short circuit of the electrode terminals 151 and minimizing the damage to the earphone 10.

In some embodiments, at least one of the positive charging terminal 1514, the negative charging terminal 1515, and the communication terminal 1516 may be disposed at the adapter housing 122. For example, the positive charging terminal 1514, the negative charging terminal 1515, and the communication terminal 1516 may be disposed at the adapter housing 122. As another example, the positive charging terminal 1514, the negative charging terminal 1515, and the communication terminal 1516 may be disposed at the battery housing 123.

In some embodiments, at least one of the positive charging terminal 1514, the negative charging terminal 1515, and the communication terminal 1516 may be disposed at the core housing 111. For example, one of the positive charging terminal 1514, the negative charging terminal 1515, and the communication terminal 1516 may be disposed at the core housing 111 and the remaining two of the positive charging terminal 1514, the negative charging terminal 1515, and the communication terminal 1516 may be disposed at the adapter housing 122.

Figure 25:
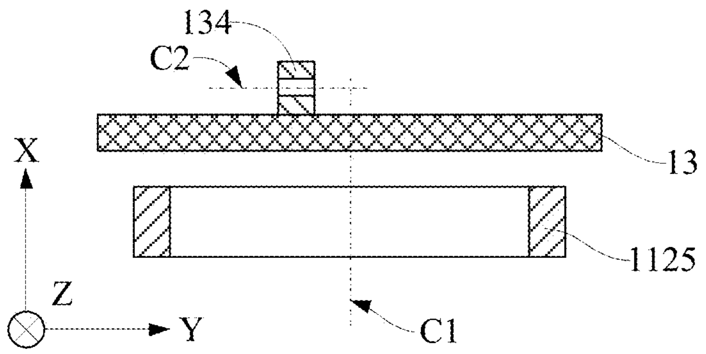
FIG. 25 is a schematic structural diagram illustrating an exemplary relative position of a first coil and a second coil according to some embodiments of the present disclosure.

In some embodiments, referring to FIG. 25 and FIG. 7, the core module 11 may include the core housing 111, and the loudspeaker 112 and the main control circuit board 13 that are disposed in the core housing 111. The loudspeaker 112 may be electrically connected with the main control circuit board 13. The main control circuit board 13 may be configured to perform signal processing and transmit a processed electrical signal to the loudspeaker 112. The loudspeaker 112 may be configured to convert the received electrical signal into a mechanical vibration. The loudspeaker 112 may include a first coil 1125 (i.e., the voice coil described above) coupled with the main control circuit board 13. The first coil 1125 may extend into a magnetic circuit system of the loudspeaker 112. A second coil 134 may be disposed on the main control circuit board 13. In some embodiments, a winding axis (e.g., as shown by C2 in FIG. 25) of the second coil 134 and a winding axis (e.g., as shown by C1 in FIG. 25) of the first coil 1125 may be intersected. In this way, the mutual inductive coupling between the second coil 134 and the first coil 1125 can be weakened, thereby reducing the mutual influence between the second coil 134 and the first coil 1125, for example, reducing the risk of the current change of the second coil 134 causing noises such as “rustling” and “squeaking” in the loudspeaker 112 through mutual inductance. In addition, since the mutual inductive coupling between the first coil 1125 and the second coil 134 is reduced, the main control circuit board 13 can be closer to the loudspeaker 112, which makes the core module 11 more compact in structure.

In some embodiments, the main control circuit board 13 and the loudspeaker 112 may be stacked on the winding axis of the first coil 1125. In this way, a larger loudspeaker 112 may be disposed in the core housing 111 when the volume of the core housing 111 is constant, thereby increasing the sensitivity and the maximum volume of the earphone 10. The winding axis of the second coil 134 and the winding axis of the first coil 1125 may be orthogonal. For example, the winding axis of the second coil 134 and the winding axis of the first coil 1125 may be respectively parallel to the length direction Y and the thickness direction X, so as to further weaken the mutual inductive coupling between the second coil 134 and the first coil 1125. In some embodiments, due to the weakening of the mutual inductive coupling between the second coil 134 and the first coil 1125, a spacing between the main control circuit board 13 and the loudspeaker 112 in the winding axis of the first coil 1125 may be further reduced, causing the core module 11 to be more compactly arranged in the thickness direction X, and reducing the volume of the core module 11. In some embodiments, the spacing between the main control circuit board 13 and the loudspeaker 112 in the winding axis of the first coil 1125 may be less than or equal to 3 mm. The second coil 134 may be disposed on a side of the main control circuit board 13 away from the loudspeaker 112 or on the other side toward the loudspeaker 112. For example, the second coil 134 may be disposed on aside of the main control circuit board 13 away from the loudspeaker 112, and the spacing between the main control circuit board 13 and the loudspeaker 112 in the winding axis of the first coil 1125 may be less than or equal to 1 mm. As another example, the second coil 134 may be disposed on the other side of the main circuit board 13 toward the loudspeaker 112, and the spacing between the main circuit board 13 and the loudspeaker 112 in the winding axis of the first coil 1125 may be less than or equal to 2 mm.

In the present disclosure, the core module 11 may include an inductor or a transceiver coil or other components. The inductor or the transceiver coil may include a second coil 134. In some embodiments, the core module 11 may include a switching power supply. The switching power supply may be configured to achieve voltage conversion. The switching power supply may be disposed on the main control circuit board 13 and electrically connected with the main control circuit board 13. An inductor of the switching power supply may be the second coil 134, which is configured to achieve energy storage, filtering, etc. In some embodiments, the core module 11 may include a communication device. The communication device may be configured to achieve the cooperative use of the earphone 10 with terminal devices such as a mobile phone and computer. The communication device may be disposed on the main control circuit board 13 and electrically connected with the main control circuit board 13. The communication device may include a transceiver coil to achieve signal transmission and reception. The transceiver coil of the communication device may be the second coil 134.

Figure 26:
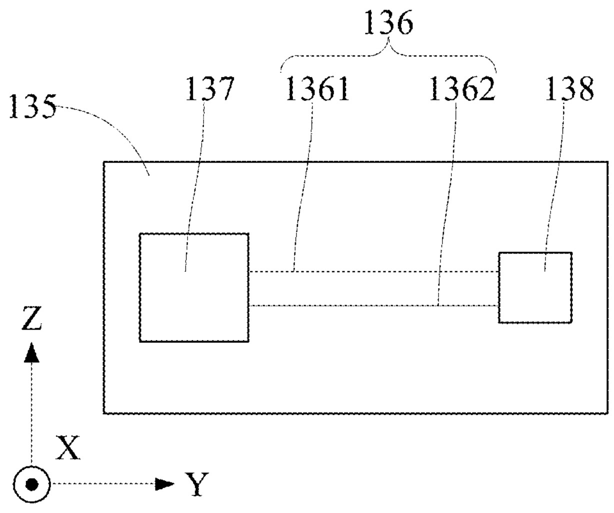
FIG. 26 is a schematic structural diagram illustrating an exemplary main control circuit board according to some embodiments of the present disclosure.

In some embodiments, referring to FIG. 26 and FIG. 7, the main control circuit board 13 may include a substrate 135, a metal wiring 136 formed on the substrate 135, and a load 137 disposed on the substrate 135. The substrate 135 may have electrical insulation. The metal wiring 136 may be printed on the substrate 135 by means of copper etching and other techniques. The load 137 may be welded on the substrate 135 by means of surface mounting and other techniques, and connected with the metal wiring 136. The main control circuit board 13 may use any one of a single-sided board, a double-sided board, and a multi-layer board as required. The metal wiring 136 may include a power wiring 1361 and a loop wiring 1362 for connecting the load 137 to an external power supply (e.g., the battery 14). The power wiring 1361 and the loop wiring 1362 may be disposed side by side. A current direction of the power wiring 1361 may be opposite to a current direction of the loop trace 1362, so as to form a circuit loop between the load 137 and the external power supply. In some embodiments, a ratio of an absolute value of a difference between a width and a mean width of any one of the power wiring 1361 and the loop wiring 1362 to the mean width may be less than or equal to 20%. In some embodiments, the ratio may be less than or equal to 15%. In some embodiments, the ratio may be less than or equal to 10%. The mean width is defined as an average value of the widths of the power wiring 1361 and the loop wiring 1362. In short, the ratio may be used to measure the degree to which the width of each of the power wiring 1361 and the loop wiring 1362 deviates from the mean width of the power wiring 1361 and the loop wiring 1362. Therefore, the smaller the ratio, the closer the width of the power wiring 1361 and the width of the loop wiring 1362 are. With such configuration, since the current direction of the power wiring 1361 is opposite to the current direction of the loop wiring 1362, a magnetic field generated by the power wiring 1361 and a magnetic field generated by the loop wiring 1362 can cancel each other when vectors are superimposed in a three-dimensional space. Since the difference between the width of the power wiring 1361 and the width of the loop wiring 1362 is small, a total magnetic field intensity of the magnetic field generated by the power wiring 1361 and the magnetic field generated by the loop wiring 1362 after the vector superposition in the three-dimensional space may be small, thereby reducing the electromagnetic interference of the metal wiring 136 on the main control circuit board 13 to other electronic components, for example, reducing the risk of the loudspeaker 112 producing noises such as "rustling" and "squeaking" due to the magnetic field generated by the metal wiring 136 on the main control circuit board 13.

In some embodiments, an extension direction of the power wiring 1361 and an extension direction of the loop wiring 1362 may be set in parallel, such that the magnetic field generated by the power wiring 1361 and the magnetic field generated by the loop wiring 1362 may cancel each other. A thickness of the power wiring 1361 and wiring thickness of the loop wiring 1362 may be equal, thereby simplifying the molding process of the metal wiring 136. The width of the power wiring 1361 may be equal to the width of the loop wiring 1362, such that the magnetic field generated by the power wiring 1361 and the magnetic field generated by the loop wiring 1362 may cancel each other. In some embodiments, a length of the power wiring 1361 may be equal to a length of the loop wiring 1362, such that the magnetic field generated by the power wiring 1361 and the magnetic field generated by the loop wiring 1362 may cancel each other. It should be noted that the thickness of the loop wiring 1362 refers to a size of the loop wiring 1362 in a thickness direction (e.g., parallel to the thickness direction X) of the main control circuit board 13.

In some embodiments, the power wiring 1361 and the loop wiring 1362 may be disposed on the same layer on the substrate 135.

In some embodiments, the power wiring 1361 and the loop wiring 1362 may be disposed on different layers on the substrate 135, and orthographic projections of the power wiring 1361 and the loop wiring 1362 in the thickness direction of the main control circuit board 13 may at least partially overlap.

In some implementations, the load 137 may be a component such as a main control chip or a communication chip.

In some embodiments, the main control circuit board 13 may include a connector 138. The connector 138 may be disposed on the substrate 135 by means of surface mounting or other technologies. One end of the power wiring 1361 and one end of the loop wiring 1362 may be respectively connected with the connector 138, and the other end of the power wiring 1361 and the other end of the loop wiring 1362 may be respectively connected with the load 137, such that the load 137 may be connected with the external power supply. For example, the battery 14 may be regarded as the external power supply, the battery 14 may be connected with one end of the flexible circuit board 16 through the lead 129, and the other end of the flexible circuit board 16 may be buckled with the connector 138, such that the battery 14 may be connected with the main control circuit board 13.

The specific embodiments recorded in the present disclosure are only exemplary, and one or more technical features in the specific embodiments are optional or additional, and do not constitute necessary technical features of the inventive concept of the present disclosure. In other words, the protection scope of the present disclosure covers and is far greater than the specific embodiments. Moreover, the specific embodiments recorded in the present disclosure are only exemplary, and do not limit the protection scope of the present disclosure. Any equivalent device or equivalent process transformation made using the contents of the specification and drawings of the present disclosure, or directly or indirectly used in other related technical fields, are also included in the patent protection scope of the present disclosure.

What is claimed is:

1. An earphone, comprising a core module and a hook structure connected with the core module, wherein the core module is disposed at a front side of an ear in a wearing state, at least a portion of the hook structure is disposed at a rear side of the ear in the wearing state, and an orthographic projection of the hook structure and an orthographic projection of the core module on a reference plane perpendicular to a thickness direction do not overlap, the thickness direction being a direction in which the core module is close to or away from the ear in the wearing state, and the hook structure includes a battery housing and a flexible coating, a battery coupled with the core module is disposed in the battery housing, the battery housing includes a cover housing and a battery compartment connected with the cover housing, and the flexible coating covers the cover housing, a first reference line segment with the shortest length being provided between the orthographic projection of the hook structure and the orthographic projection of the core module, and a point at which the first reference line segment intersects with the orthographic projection of the hook structure being located in a section where the flexible coating overlaps with the cover housing.

2. The earphone of claim 1, wherein the earphone has a second reference line parallel to the first reference line segment on the reference plane, the second reference line intersects with an orthographic projection of the battery housing and is farthest from the first reference line segment, and an edge of one side of the orthographic projection of the hook structure toward the core module has a maximum distance to the second reference line, the maximum distance being in a range of 34 mm-52 mm.

3. The earphone of claim 2, wherein a length of the battery compartment in a length direction of the hook structure is in a range of 10 mm-20 mm.

4. The earphone of claim 1, wherein in the wearing state, a spacing between a free end of the hook structure not connected with the core module and an upper ear root of the ear on a vertical axis of a human body is in a range of 37 mm-56 mm.

5. The earphone of claim 1, wherein in the wearing state, a spacing between a free end of the hook structure not connected with the core module and an edge of an earlobe of the ear on a vertical axis of a human body is less than or equal to 10 mm.

6. The earphone of claim 1, wherein one end of the battery compartment in a length direction of the hook structure has an open end, the cover housing is partially embedded in the open end of the battery compartment to cooperate with the battery compartment to form a cavity structure for accommodating the battery, an area of an outer surface of the cover housing on a reference cross-section perpendicular to the length direction of the hook structure is less than an area of an outer surface of the battery compartment on the reference cross-section.

7. The earphone of claim 6, wherein the hook structure includes an elastic metal wire configured to connect the core module and the cover housing, and the area of the outer surface of the cover housing on the reference cross-section is between a cross-sectional area of the elastic metal wire and the area of the outer surface of the battery compartment on the reference cross-section, and the area of the outer surface of the cover housing gradually increases in a positive direction which is along the length direction of the hook structure and points from the cover housing to the battery compartment.

8. The earphone of claim 7, wherein a shape of the battery compartment is a hollow cylinder, and the area of the outer surface of the battery compartment on the reference cross-section is in a range of 60 $mm^2$-100 $mm^2$.

9. The earphone of claim 7, wherein a diameter of the elastic metal wire is in a range of 0.6 mm-0.8 mm.

10. The earphone of claim 6, wherein a free end of the core module not connected with the hook structure extends into a cavity of auricular concha of the ear in the wearing state, and the cover housing and the core module jointly clamp an ear region corresponding to the cavity of auricular concha from a front side and a rear side of the ear region through the flexible coating.

11. The earphone of claim 10, wherein the core module includes an inner side surface facing the ear and an outer side surface away from the ear along the thickness direction in the wearing state, and in a non-wearing state, at least a portion of the battery housing is disposed between the inner side surface and the outer side surface in the thickness direction.

12. The earphone of claim 10, wherein the core module includes a core housing connected with the hook structure and a loudspeaker disposed in the core housing, one side of the core housing facing the ear in the wearing state is provided with a sound outlet hole, a sound wave generated by the loudspeaker is transmitted out through the sound outlet hole, the core module cooperates with the cavity of auricular concha to form an auxiliary cavity communicated with an external ear canal of the ear in the wearing state, and the sound outlet hole is at least partially disposed in the auxiliary cavity.

13. The earphone of claim 12, wherein the auxiliary cavity is semi-open.

14. The earphone of claim 6, wherein the flexible coating does not cover the battery compartment.

15. The earphone of claim 1, wherein the core module has a length direction and a width direction which are orthogonal to the thickness direction and to each other, a length of the core module is greater than a width of the core module, and the length of the core module is in a range of 22 mm-35 mm.

16. The earphone of claim 15, wherein in the wearing state, the core module includes an upper side surface away from an external ear canal of the ear along the width direction, a lower side surface facing the external ear canal, and a rear side surface configured to connect the upper side surface and the lower side surface.

17. The earphone of claim 1, further comprising a main control circuit board disposed in the core module, and the battery is disposed at an end of the hook structure away from the core module.

18. The earphone of claim 1, wherein the hook structure includes an adapter housing connected with the core module and an elastic metal wire connected with the adapter housing, at least a portion of the adapter housing being disposed at the front side of the ear in the wearing state, and at least a portion of the elastic metal wire being disposed at the rear side of the ear in the wearing state.

19. The earphone of claim 18, wherein the adapter housing forms an accommodation cavity and includes one or more through holes communicated with the accommodation cavity, and the earphone comprises one or more electrode terminals at least partially disposed in the one or more through holes.

20. The earphone of claim 19, wherein the one or more electrode terminals include a positive charging terminal, a negative charging terminal, and a communication terminal which are spaced apart from each other and located on the same side of the ear in the wearing state.

* * * * *